(12) United States Patent
Shukla et al.

(10) Patent No.: US 12,509,559 B2
(45) Date of Patent: Dec. 30, 2025

(54) BACTERIAL BETA-LACTAMASE RESPONSIVE HYDROGELS

(71) Applicant: Brown University, Providence, RI (US)

(72) Inventors: Anita Shukla, East Greenwich, RI (US); Dahlia Alkekhia, Providence, RI (US); Akram Abbasi, Providence, RI (US)

(73) Assignee: Brown University, Providence, RI (US)

( * ) Notice: Subject to any disclaimer, the term of this patent is extended or adjusted under 35 U.S.C. 154(b) by 833 days.

(21) Appl. No.: 17/772,466

(22) PCT Filed: Oct. 28, 2020

(86) PCT No.: PCT/US2020/057799
§ 371 (c)(1),
(2) Date: Apr. 27, 2022

(87) PCT Pub. No.: WO2021/087008
PCT Pub. Date: May 6, 2021

(65) Prior Publication Data
US 2023/0029034 A1    Jan. 26, 2023

Related U.S. Application Data

(60) Provisional application No. 62/926,957, filed on Oct. 28, 2019.

(51) Int. Cl.
*C08J 3/075* (2006.01)
*A61K 47/69* (2017.01)
*C12Q 1/04* (2006.01)

(52) U.S. Cl.
CPC .......... *C08J 3/075* (2013.01); *A61K 47/6903* (2017.08); *C12Q 1/04* (2013.01); *C08J 2300/208* (2013.01);
(Continued)

(58) Field of Classification Search
CPC .................................................. A61K 47/6903
See application file for complete search history.

(56) References Cited

U.S. PATENT DOCUMENTS 4,535,156 A    8/1985  Blumbach et al.
4,883,868 A   11/1989  Nakagawa et al.
(Continued)

FOREIGN PATENT DOCUMENTS

AU    5735500 A    1/2001
CN    1969830 A    5/2007
(Continued)

OTHER PUBLICATIONS

Roemer, et al., "Antifungal Drug Development: Challenges, Unmet Clinical Needs, and New Approaches", Cold Spring Harbor Perspectives in Medicine, vol. 4, Issue a019703, 2014, pp. 1-14.
(Continued)

*Primary Examiner* — Benjamin J Packard
(74) *Attorney, Agent, or Firm* — Banner & Witcoff, Ltd.

(57) ABSTRACT

The invention provides a "host-guest" supramolecular hydrogel. The hydrogel contains an AAm/NVP interpenetrating polymer network (IPN) with supramolecular crosslinkers assembled from β-lactam/adamantane-containing guest molecule with host polymeric cyclodextrin (PCD). An advantage of this hydrogel is that because of the molecular association of polymeric cyclodextrin and adamantane, the supramolecular hydrogels self-heal without any external stimuli after the hydrogels are severed. The invention also provides methods of making the hydrogel, methods of making the synthesis intermediates, and methods of diagnosis or treatment of β-lactamase-containing bacteria.

9 Claims, 11 Drawing Sheets

(52) U.S. Cl.
CPC ........ *C08J 2333/26* (2013.01); *C08J 2405/16* (2013.01)

(56) References Cited

U.S. PATENT DOCUMENTS

| | | | |
|---|---|---|---|
| 5,233,035 A | 8/1993 | Hara et al. |
| 5,571,666 A | 11/1996 | Floyd et al. |
| 5,626,863 A | 5/1997 | Hubbell et al. |
| 5,965,156 A | 10/1999 | Proffitt et al. |
| 6,153,252 A | 11/2000 | Hossainy et al. |
| 6,514,535 B2 | 2/2003 | Marchant |
| 6,641,831 B1 | 11/2003 | Schierholz |
| 6,787,179 B2 | 9/2004 | Timm et al. |
| 6,818,018 B1 | 11/2004 | Sawhney |
| 7,323,303 B2 | 1/2008 | Wong et al. |
| 7,396,926 B2 | 7/2008 | Tsien et al. |
| 7,541,048 B2 | 6/2009 | Dewitt et al. |
| 7,632,657 B2 | 12/2009 | Rambach et al. |
| 7,914,841 B2 | 3/2011 | Eells et al. |
| 8,092,784 B2 | 1/2012 | Mao et al. |
| 8,097,434 B2 | 1/2012 | Yang-Woytowitz et al. |
| 8,209,992 B2 | 7/2012 | Alden |
| 8,389,234 B2 | 3/2013 | Yang-Woytowitz et al. |
| 8,414,909 B2 | 4/2013 | Wang |
| 8,586,325 B2 | 11/2013 | Mao et al. |
| 8,679,520 B2 | 3/2014 | Horres et al. |
| 8,778,627 B2 | 7/2014 | Mao et al. |
| 8,784,862 B2 | 7/2014 | Horres et al. |
| 8,802,387 B2 | 8/2014 | Xing et al. |
| 8,883,772 B2 | 11/2014 | Sutton et al. |
| 8,916,227 B2 | 12/2014 | Horres et al. |
| 8,986,781 B2 | 3/2015 | Chen et al. |
| 9,012,167 B2 | 4/2015 | Dallenne et al. |
| 9,085,794 B2 | 7/2015 | Yang-Woytowitz et al. |
| 9,138,490 B2 | 9/2015 | Cirillo et al. |
| 9,192,697 B2 | 11/2015 | Hoffmann et al. |
| 9,283,194 B2 | 3/2016 | Tang et al. |
| 9,441,261 B2 | 9/2016 | Cirillo et al. |
| 9,453,032 B2 | 9/2016 | Sutton et al. |
| 9,476,087 B2 | 10/2016 | Xing et al. |
| 9,504,643 B2 | 11/2016 | Tice et al. |
| 9,539,273 B2 | 1/2017 | Meehan et al. |
| 9,566,247 B2 | 2/2017 | Koo et al. |
| 9,592,299 B2 | 3/2017 | Sershen et al. |
| 9,597,407 B2 | 3/2017 | Eckert et al. |
| 9,603,883 B2 | 3/2017 | Huang et al. |
| 9,670,476 B2 | 6/2017 | Mao et al. |
| 9,677,112 B2 | 6/2017 | Rao et al. |
| 9,689,021 B2 | 6/2017 | Brans et al. |
| 9,694,081 B2 | 7/2017 | Burdick et al. |
| 9,809,605 B1 | 11/2017 | Sutton et al. |
| 9,828,622 B2 | 11/2017 | Hasan et al. |
| 9,834,681 B2 | 12/2017 | Rao et al. |
| 9,862,729 B2 | 1/2018 | Sutton et al. |
| 9,874,568 B2 | 1/2018 | Charretier et al. |
| 9,902,989 B2 | 2/2018 | Yang-Woytowitz et al. |
| 9,956,252 B2 | 5/2018 | Tseng et al. |
| 10,000,491 B2 | 6/2018 | Abe et al. |
| 10,000,492 B2 | 6/2018 | Abe et al. |
| 10,000,509 B2 | 6/2018 | Sutton et al. |
| 10,041,105 B2 | 8/2018 | Li |
| 10,175,239 B2 | 1/2019 | Cirillo et al. |
| 10,239,890 B2 | 3/2019 | Sutton et al. |
| 10,293,085 B2 | 5/2019 | Orlowski |
| 2003/0040501 A1 | 2/2003 | Newman et al. |
| 2004/0022853 A1 | 2/2004 | Ashton et al. |
| 2005/0013854 A1 | 1/2005 | Mannino et al. |
| 2008/0255498 A1 | 10/2008 | Houle |
| 2008/0261960 A1 | 10/2008 | Brown et al. |
| 2009/0238867 A1 | 9/2009 | Jenkins et al. |
| 2010/0129432 A1 | 5/2010 | Chen et al. |
| 2010/0147763 A1 | 6/2010 | Tsou et al. |
| 2011/0076319 A1 | 3/2011 | Orlowski et al. |
| 2011/0150961 A1 | 6/2011 | Perry et al. |
| 2012/0009834 A1 | 1/2012 | Augustyniak et al. |
| 2013/0003061 A1 | 1/2013 | Amin et al. |
| 2013/0103139 A1 | 4/2013 | Hoffmann et al. |
| 2014/0199241 A1 | 7/2014 | Yedgar |
| 2014/0219917 A1 | 8/2014 | Murthy et al. |
| 2014/0349886 A1 | 11/2014 | Lee et al. |
| 2016/0058864 A1 | 3/2016 | Meehan et al. |
| 2016/0082159 A1 | 3/2016 | Orlowski |
| 2016/0199351 A1 | 7/2016 | Rappleye et al. |
| 2016/0333027 A1 | 11/2016 | Rao et al. |
| 2016/0376629 A1 | 12/2016 | Cirillo et al. |
| 2017/0189392 A1 | 7/2017 | Tong et al. |
| 2017/0354741 A1 | 12/2017 | Ofner, III et al. |
| 2018/0094139 A1 | 4/2018 | Rao et al. |
| 2018/0094292 A1 | 4/2018 | Hasan et al. |
| 2018/0105862 A1 | 4/2018 | Dequaire-Rochelet et al. |
| 2018/0156796 A1 | 6/2018 | Geisberg |
| 2018/0186939 A1 | 7/2018 | Blanchemain et al. |
| 2018/0282778 A1 | 10/2018 | Nordmann et al. |
| 2018/0334701 A1 | 11/2018 | Yang-Woytowitz et al. |
| 2019/0101538 A1 | 4/2019 | Cirillo et al. |
| 2019/0307904 A1 | 10/2019 | Ballamy |
| 2019/0321520 A1 | 10/2019 | Weaver et al. |
| 2022/0229065 A1 | 7/2022 | Rai et al. |
| 2023/0190761 A1 | 6/2023 | Brader et al. |

FOREIGN PATENT DOCUMENTS

| | | |
|---|---|---|
| CN | 110613686 A | 12/2019 |
| CN | 110694136 A | 1/2020 |
| CN | 109580575 B | 7/2020 |
| CN | 112697766 B | 4/2022 |
| CN | 217542886 U | 10/2022 |
| CN | 113075193 B | 12/2022 |
| CN | 113912626 B | 3/2023 |
| DE | 102004046244 A1 | 3/2006 |
| DE | 102005039126 A1 | 2/2007 |
| EP | 0034759 B1 | 1/1986 |
| EP | 0745390 A2 | 12/1996 |
| EP | 2285381 B1 | 12/2015 |
| EP | 3058958 B1 | 9/2018 |
| EP | 3442612 A1 | 2/2019 |
| EP | 3380825 B1 | 9/2020 |
| JP | 2007118003 A | 5/2007 |
| WO | 0100247 A9 | 8/2002 |
| WO | 2009005798 A2 | 1/2009 |
| WO | 2014008875 A1 | 1/2014 |
| WO | 2014122152 A1 | 8/2014 |
| WO | 2016066718 A1 | 5/2016 |
| WO | 2016154319 A1 | 9/2016 |
| WO | 2017021023 A1 | 2/2017 |
| WO | 2017037232 A1 | 3/2017 |
| WO | 2017053778 A1 | 3/2017 |
| WO | 2017147049 A1 | 8/2017 |
| WO | 2018204782 A1 | 11/2018 |
| WO | 2018213352 A1 | 11/2018 |
| WO | 2020131192 A2 | 6/2020 |
| WO | 2020146514 A1 | 7/2020 |
| WO | 2021130242 A1 | 7/2021 |
| WO | 2022056299 A1 | 3/2022 |

OTHER PUBLICATIONS

Khetan, et al., "Degradation-mediated Cellular Traction Directs Stem Cell Fate in Covalently Crosslinked Three-dimensional hydrogels", Nat Mater, vol. 12, No. 5, May 2013, pp. 458-465.

Khetan, et al., "Sequential Crosslinking to Control Cellular Spreading in 3-dimensional Hydrogels", Soft Matter, vol. 5, 2009, pp. 1601-1606.

Kischkel, et al., "Therapies and Vaccines Based on Nanoparticles for the Treatment of Systemic Fungal Infections", Front Cell Infect Microbiol., vol. 10, 2020, 25 pages.

Knofler, "Critical Growth Factors and Signalling Pathways Controlling Human Trophoblast Invasion", The International Journal of Developmental Biology, vol. 54, Issue 2-3, 2010, pp. 269-280.

Korkes, et al., "Lipidomic Assessment of Plasma and Placenta of Women with Early-Onset Preeclampsia", PLoS One, vol. 9, Issue 10, e110747, 2014, pp. 1-8.

(56) References Cited

OTHER PUBLICATIONS

Korobova, et al., "The Application of Selective Chromogenic Agar for Detecting Enterobacteria with Production of Beta-Lactamases", Klin Lab Diagn, vol. 60, No. 11, 2015, pp. 53-57.

Koutsopoulos, et al., "Controlled Release of Functional Proteins Through Designer Self-Assembling Peptide Nanofiber Hydrogel Scaffold", Proceedings of the National Academy of Sciences, vol. 106, No. 12, Mar. 24, 2009, pp. 4623-4628.

Lee, et al., "Antifungal Drug Resistance: Molecular Mechanisms in Candida albicans and Beyond", Chem Rev., vol. 121, 2021, pp. 3390-3411.

Lee, et al., "Placenta-on-a-Chip: A Novel Platform to Study the Biology of the Human Placenta", Journal of Maternal-Fetal and Neonatal Medicine, vol. 29, Issue 7, 2016, pp. 1046-1054.

Lewis, et al., "Partial Characterization of an Immortalized Human Trophoblast Cell-Line, TCL-1, which Possesses a CSF-1 Autocrine Loop", Placenta, vol. 17, 1996, pp. 136-146.

Li, et al., "Using Galleria Mellonella-Candida Albicans Infection Model to Evaluate Antifungal Agents", Biological and Pharmaceutical Bulletin, vol. 36, No. 9, 2013, pp. 1482-1487.

Liang, et al., "Functional Hydrogels as Wound Dressing to Enhance Wound Healing", ACS Nano, vol. 15, 2021, pp. 12687-12722.

Lim Dong-Jin, "Methylene Blue-Based Nano and Microparticles: Fabrication and Applications in Photodynamic Therapy", Polymers, vol. 13, No. 22, Article No. 3955, Nov. 16, 2021, pp. 1-15.

Liu, et al., "Auranofin Releasing Antibacterial and Antibiofilm Polyurethane Intravascular Catheter Coatings", Frontier in Cellular and Infection Microbiology, vol. 9, No. 37, Feb. 28, 2019, pp. 1-13.

Livermore, et al., "Evaluation of the chromogenic Cia-Beta-Test for detecing extended-spectrum, AmpC and metallo-Beta-lactamases", Journal of Antimicrobial Chemotherapy, vol. 60, No. 6,, 2007, pp. 1375-1379.

Lockhart, et al., "Simultaneous Emergence of Multidrug-Resistant Candida Auris on 3 Continents Confirmed by Whole-Genome Sequencing and Epidemiological Analyses", Clinical Infectious Diseases : An Official Publication of the Infectious Diseases Society of America, vol. 64, 2017, pp. 134-140.

Lockhart, et al., "Species Identification and Antifungal Susceptibility Testing of Candida Bloodstream Isolates From Population-Based Surveillance Studies in Two U.S. Cities from 2008 to 2011", J Clin Microbiol., vol. 50, No. 11, Nov. 2012, pp. 3435-3442.

Magill, et al., "Multistate Point-Prevalence Survey of Health Care-Associated Infections", The New England Journal of Medicine, vol. 370, No. 13, 2014, pp. 1198-1208.

Majcher, et al., "Hydrogel Synthesis and Design", in Functional Biopolymers, Polymers and Polymeric Composites: A Reference Series, 2018, 41 pages.

Maki, et al., "The Risk of Bloodstream Infection in Adults with Different Intravascular Devices: A Systematic Review of 200 Published Prospective Studies", Mayo Clinic Proceedings, vol. 81, No. 9, Sep. 2006, pp. 1159-1171.

Masungi, et al., "Parallel Artificial Membrane Permeability Assay (PAMPA) Combined with a 10-Day Multiscreen Caco-2 Cell Culture as a Tool for Assessing New Drug Candidates", Pharmazie, vol. 63, Issue 3, 2008, pp. 194-199.

Melchels, et al., "5.542.3.3.2.—Printing Cell-laden 3d Hydrogel Constructs", Chapter-5.542—Organ Printing, Comprehensive Biomaterials, vol. 5, 2011, p. 601.

Messerlian, et al., "Urinary Concentrations of Phthalate Metabolites in Relation to Pregnancy Loss among Women Conceiving with Medically Assisted Reproduction", Epidemiology, vol. 27, Issue 6, Nov. 2016, pp. 879-888.

Mishra, et al., "Pathogenicity and Drug Resistance in Candida Albicans and Other Yeast Species—A Review", Acta Microbiol Immunol Hung, vol. 54, No. 3, Sep. 2007, pp. 201-235.

Moore, et al., "AmBisome: Liposomal Formulation, Structure, Mechanism of Action and Pre-clinical Experience", Journal of Antimicrobial Chemotherapy, vol. 49, Suppl 1, Feb. 2002, pp. 21-30.

Morandi, et al., "Nanomolar inhibitors of AmpC Beta-lactamase", J. Am. Chem. Soc., vol. 125, 2003, pp. 685-695.

Morgan, et al., "Excess Mortality, Hospital Stay, and Cost Due to Candidemia: a Case-control Study Using Data From Population-based Candidemia Surveillance", Infection Control and Hospital Epidemiology, vol. 26, No. 6, Jun. 2005, pp. 540-547.

Muoth, et al., "A 3D Co-Culture Microtissue Model of the Human Placenta for Nanotoxicity Assessment", Nanoscale, vol. 8,Issue 39, 2016, pp. 17322-17332.

Mura, et al., "Development of a novel chromogenic method, Penta-well test, for rapid predictoin of Beta-lactamase classes provuded in clinical Enterobacteriaceae isolates.", Diagnostic Microbiology and Infectious Disease, vol. 83, 2015, pp. 25-29.

Odds, et al., "Antifungal Agents: Mechanisms of Action", Trends Microbiology, vol. 11, Issue 6, Jun. 2003, pp. 272-279.

Orendi, et al., "Placental and Trophoblastic in Vitro Models to Study Preventive and Therapeutic Agents for Preeclampsia", Placenta, vol. 32 Supplement 1, Feb. 2011, pp. S49-S54.

Orendi, et al., "The Choriocarcinoma Cell Line Bewo: Syncytial Fusion and Expression of Syncytium-specific Proteins", Reproduction, vol. 140, 2010, pp. 759-766.

Page, et al., "Mechanism of β-lactam Ring Opening in Cephalosporins", Journal of the American Chemical Society, vol. 106, 1984, pp. 3820-3825.

Paglia, et al., "The Use of Oral Antidiabetic Medications in Gestational Diabetes Mellitus", Current Diabetes Reports, vol. 9, Issue 4, Aug. 2009, pp. 287-290.

Park, Seong-Cheol, et al., "Targeting and Synergistic Action of an Antifungal Peptide in an Antibiotic Drug-Delivery System", Journal of Controlled Release, vol. 256, 2017, pp. 46-55.

Pasca, et al., "The Placenta: The Lost Neuroendocrine Organ", NeoReviews, vol. 11, No. 2, Feb. 2010, pp. e64-e77.

Perlin, David S, "Echinocandin Resistance in Candida", CID, vol. 61, Suppl. 6, 2015, pp. S612-S617.

Pfaller, et al., "Epidemiology of Invasive Candidiasis: A Persistent Public Health Problem", Clinical Microbiology Reviews, vol. 20, No. 1, Jan. 2007, pp. 133-163.

Piazza, et al., "Environmental Toxins and the Impact of Other Endocrine Disrupting Chemicals in Women's Reproductive Health", JBRA Assisted Reproduction, vol. 23, Issue 2, 2019, pp. 154-164.

Pichler, et al., "Modification of Membrane Lipid Compositions in Single-Celled Organisms—From Basics to Applications", Methods, vol. 147, Sep. 1, 2018, pp. 50-65.

Pilmis, et al., "Antifungal Drugs During Pregnancy: An Updated Review", Journal of Antimicrobial Chemotherapy, vol. 70,Issue 1, 2015, pp. 14-22.

Pilmis, et al., "Extended-spectrum Beta-lactamase-producing Enterobacteriaceae (Esbl-pe) Infections: Are Carbapenem Alternatives Achievable In Daily Practice?", International Journal of Infectious Diseases, vol. 39, 2015, pp. 62-67.

Pivetta Dong-Jin, et al., "Liposomes Encapsulating Methylene Blue and Acridine Orange: An Approach for Phototherapy of Skin Cancer", Colloids and Surfaces B: Biointerfaces, vol. 220, No. 112901, Dec. 2022, 7 pages.

Plou, et al., "Nanocomposite Scaffolds for Monitoring of Drug Diffusion in Three-Dimensional Cell Environments by Surface-Enhanced Raman Spectroscopy", Nano Letters, vol. 21, Oct. 6, 2021, pp. 8785-8793.

Rappsilber, et al., "Stop and Go Extraction Tips for Matrix-Assisted Laser Desorption/Ionization, Nanoelectrospray, and LC/MS Sample Pretreatment in Proteomics", Analytical Chemistry, vol. 75, No. 3, 2003, 1 page.

Richards, et al., "Nosocomial infections in coronary care units in the United States", The America Journal of Cardiology, vol. 82, Sep. 15, 1998, pp. 789-793.

Richardson, et al., "Special Issue: Mucosal Fungal Infections", Journal of Fungi, vol. 4, Issue 43, 2018, pp. 1-3.

Richter, et al., "Following the Formation of Supported Lipid Bilayers on Mica: A Study Combining AFM, QCM-D, and Ellipsometry", Biophysical Journal, vol. 88, Issue 5, May 2005, pp. 3422-3433.

(56) References Cited

OTHER PUBLICATIONS

Rothstein, et al., "Anticandida Activity is Retained in P-113, A 12-Amino-Acid Fragment of Histatin 5", Antimicrobial Agents and Chemotherapy, vol. 45, No. 5, 2001, pp. 1367-1373.
"19th WHO Model List of Essential Medicines", 19th Edition, Apr. 2015, 53 pages.
"Antibiotic / Antimicrobial Resistance (AR / AMR)", (Sep. 19, 2017). Retrieved Jan. 15, 2018, from https://www.cdc.gov/drugresistance/about.html., 3 pages.
"Antibiotic Resistance Threats in the United States", U.S. Department Health & Human Services, Center for Disease Control and Prevention, 2013, 114 pages.
"Control of the Leishmaniases: Report of a meeting of the WHO Expert Committee on the Control of Leishmaniases", WHO technical Report series-949, Mar. 22-26, 2010, 202 pages.
"Identification of Candida auris", Retrieved on Apr. 11, 2024 from https://www.cdc.gov/fungal/candida-auris/identification.html, 6 pages.
"International Search Report and Written Opinion received for PCT Patent Application No. PCTUS2019041884, mailed on Nov. 15, 2019", 11 pages.
"Treating for Two: Medicine and Pregnancy", Centers for Disease Control and Prevention (CDC), Retreived form "https://www.cdc.gov/pregnancy/meds/treatingfortwo/index.html", 2020, 2 pages.
Abhishek, et al., "In Vitro Toxicity Evaluation of Low Doses of Pesticides in Individual and Mixed Condition on Human Keratinocyte Cell Line", Bioinformation, vol. 10, No. 12, Dec. 31, 2014, pp. 716-720.
Aengenheister, et al., "An Advanced Human in Vitro Coculture Model For Translocation Studies Across The Placental Barrier", Scientific Reports, vol. 8, Article No. 5388, Mar. 29, 2018, 12 pages.
Alberts, et al., "The Lipid Bilayer", Molecular Biology of the Cell. 4th edition. New York: Garland Science, 2002, 8 pages.
Alexander, et al., "Increasing Echinocandin Resistance in Candida G/Abrata: Clinical Failure Correlates With Presence of FKS Mutations and Elevated Minimum Inhibitory Concentrations", Clinical Infectious Diseases, vol. 56, No. 12, Jun. 2013, pp. 1724-1732.
Ali, et al., "Preparation, Characterization, and Transport of Dexamethasone-Loaded Polymeric Nanoparticles Across a Human Placental in Vitro Model", International Journal of Pharmaceutics, vol. 454, No. 1, Sep. 15, 2013, pp. 149-157.
Almeida, et al., "Recent Progress in Bioconjugation Strategies for Liposome-Mediated Drug Delivery", Molecules, vol. 25, 2020, p. 5672.
Ambati, et al., "Dectin-1-targeted antifungal liposomes exhibit enhanced efficacy", mSphere, vol. 4, No. 1, e00025-19, Jan./Feb. 2019, 15 pages.
Ambati, et al., "Dectin-2-Targeted Antifungal Liposomes Exhibit Enhanced Efficacy", mSphere, vol. 4, 2019, pp. e00715-e00719.
Atta, et al., "Solution-Based Ultra-Sensitive Surface-Enhanced Raman Scattering Detection of the Toxin Bacterial Biomarker Pyocyanin in Biological Fluids Using Sharp-Branched Gold Nanostars", Analytical chemistry, vol. 95, Jan. 24, 2023, pp. 2690-2697.
Avrahami, et al., "A New Group of Antifungal and Antibacterial Lipopeptides Derived from Non-membrane Active Peptides Conjugated to Palmitic Acid", The Journal of Biological Chemistry, vol. 279, Issue 13, Jan. 6, 2004, pp. 12277-12285.
Azzopardi, et al., "The enhanced permeability retention effect: a new paradigm for drug targeting in infection", J Antimicrob Chemother., vol. 68, 2013, pp. 257-274.
Baddley, et al., "Association of Fluconazole Pharmacodynamics With Mortality in Patients With Candidemia", Antimicrobial Agents and Chemotherapy, vol. 52, No. 9, Sep. 2008, pp. 3022-3028.
Bae, et al., "Injectable Biodegradable Hydrogels: Progress and Challenges", Journal of Materials Chemistry B, vol. 1, 2013, pp. 5371-5388.
Bahney, et al., "Visible Light Photoinitiation of Mesenchymal Stem Cell-Laden Bioresponsive Hydrogels", European Cells & Materials, vol. 22, 2011, 24 pages.
Baig, et al., "Lipidomic Analysis of Human Placental Syncytiotrophoblast Microvesicles in Adverse Pregnancy Outcomes", Placenta, vol. 34, May 2013, pp. 436-432.
Bailey, et al., "Effects of Flow and Bulk Vesicle Concentration on Supported Lipid Bilayer Formation", Langmuir, vol. 33, Issue 43, Oct. 31, 2017, pp. 11986-11997.
Bapat, et al., "Photodynamic Therapy is Effective Against Candida auris Biofilms", Frontiers in Cellular and Infection Microbiology, vol. 11, Article 713092, Sep. 2021, 15 pages.
Barenholz, et al., "A Simple Method for the Preparation of Homogeneous Phospholipid Vesicles", Biochemistry, vol. 16, No. 12, Jun. 14, 1977, pp. 2806-2810.
Barret, David, "From Natural Products to Clinically Useful Antifungals", Biochimica et Biophysica Acta, vol. 1587, 2002, pp. 224-233.
Bebrone, et al., "CENTA as a Chromogenic Substrate for Studying beta-Lactamases", Antimicrobial Agents and Chemotherapy. vol. 45, No. 6, 2001, pp. 1868-1871.
Belov, et al., "Zeptomole-Sensitivity Electrospray Ionization-Fourier Transform Ion Cyclotron Resonance Mass Spectrometry of Proteins", Analytical Chemistry, vol. 72, 2000, pp. 2271-2279.
Berben, et al., "Drug Permeability Profiling Using Cell-Free Permeation Tools: Overview and Applications", European Journal of Pharmaceutical Sciences, vol. 119, Jul. 1, 2018, pp. 219-233.
Bermejo, et al., "PAMPA—a Drug Absorption in Vitro Model 7. Comparing Rat in Situ, Caco-2, and PAMPA Permeability of Fluoroquinolones", European Journal of Pharmaceutical Sciences, vol. 21, No. 4, Mar. 2004, pp. 429-441.
Bernabeau, et al., "Evaluation of the Beta-CARBA test, a colorimentric test for the rapid detection of carbapenemase activity in Gram-negative bacilli", Journal of Antimicrobial Chemotherapy, vol. 72, No. 6, Jun. 2017, pp. 1646-1658.
Bligh, et al., "A Rapid Method of Total Lipid Extraction and Purification", Canadian Journal of Biochemistry and Physiology, vol. 37, No. 8, Aug. 1959, pp. 911-917.
Blundell, et al., "Placental Drug Transport-on-a-Chip: a Microengineered in Vitro Model of Transporter-Mediated Drug Efflux in the Human Placental Barrier", Advanced Healthcare Materials, vol. 7, No. 2, Jan. 2018, pp. 1-9.
Boccalini, et al., "Methylene Blue-Containing Liposomes as New Photodynamic Anti-Bacterial Agents", Journal of Material Chemistry, vol. 5, 2017, pp. 2788-2797.
Bode, et al., "In Vitro Models for Studying Trophoblast Transcellular Transport", Methods In Molecular Medicine, vol. 122, 2006, pp. 225-239.
Bodelon, et al., "Surface-Enhanced Raman Scattering Spectroscopy for Label-Free Analysis of P. aeruginosa Quorum Sensing", Frontiers in Cellular and Infection Microbiology, vol. 8, Article 143, May 2018, 17 pages.
Braga, et al., "Screening of Yeasts From Brazilian Amazon Rain Forest for Extracellular Proteinases Production", Systematic and Applied Microbiology, vol. 21, 1998, pp. 353-359.
Brown, et al., "A Lipidomic Analysis of Placenta in Preeclampsia: Evidence for Lipid Storage", PLoS One. vol. 11, No. 9, e0163972, Sep. 29, 2016, pp. 1-13.
Brown, Gordon D., "Dectin-1: a signalling non-TLR pattern-recognition receptor", Nat Rev Immunol., vol. 6, 2006, pp. 33-43.
Brown, et al., "Mass Spectrometry Tools and Metabolite-Specific Databases for Molecular Identification in Metabolomics", Analyst, vol. 134, Issue 7, Apr. 9, 2009, pp. 1322-1332.
Brown, et al., "Structure of the Fungal B-glucan-binding Immune Receptor Dectin-1: Implications for Function", Protein Science, vol. 16, 2007, pp. 1042-1052.
Cao, et al., "Placental Microbiome and Its Role in Preterm Birth", NeoReviews, vol. 15, No. 12, Dec. 2014, pp. e537-e545.
Casadevall, et al., "On the Emergence of Candida auris: Climate Change, Azoles, Swamps, and Birds", mBio, vol. 10, Issue 4, 2019, 7 pages.
Cho, et al., "Alpha-helical Peptide-Induced Vesicle Rupture Revealing New Insight Into the Vesicle Fusion Process as Monitored in Situ by Quartz Crystal Microbalance-Dissipation and Reflectometry", Analytical Chemistry, vol. 81, No. 12, Jun. 15, 2009, pp. 4752-4761.

(56) References Cited

OTHER PUBLICATIONS

Cho, et al., "Employing an Amphipathic Viral Peptide to Create a Lipid Bilayer on Au and TiO2", Journal of the American Chemical Society, vol. 129, No. 33, Sep. 2007, pp. 10050-10051.

Cho, et al., "Mechanism of an Amphipathic Alpha-helical Peptide's Antiviral Activity Involves Size-dependent Virus Particle Lysis", ACS Chemical Biology, vol. 4, No. 12, Dec. 18, 2009, pp. 1061-1067.

Chou, et al., "Characterization of Photocrosslinked Alginate Hydrogels for Nucleus Pulposus Cell Encapsulation", J Biomed Mater Res A, vol. 91, Sep. 11, 2008, pp. 187-194.

Ciloglu, "Drug-Resistant *Staphylococcus aureus* Bacteria Detection by Combining Surface-Enhanced Raman Spectroscopy (SERS) and Deep Learning Techniques", Scientific Reports, vol. 11, No. 18444, 2021, 12 pages.

Coin, et al., "Solid-Phase Peptide Synthesis: From Standard Procedures to the Synthesis of Difficult Sequences", Nature Protocols, vol. 2, No. 12, 2007, pp. 3247-3256.

Costa, et al., "Freeze-Anneal-Thaw Cycling of Unilamellar Liposomes: Effect on Encapsulation Efficiency", Pharmaceutical Research, vol. 31, 2014, pp. 97-103.

Dehghani, et al., "Biomaterials for Implants and Scaffolds", 2016, pp. 422.

Ducheyene, et al., "Comprehensive Biomaterials", vol. 1, 2015, pp. 601.

Ashley, et al., "Hydrogel Drug Delivery System With Predictable and Tunable Drug Release and Degradation Rates", PNAS, vol. vol. 110, No. 6, Feb. 5, 2013, pp. 2318-2323.

Borelli, et al., "X-ray Structures of Sap1 and Sap5: Structural Comparison of the Secreted Aspartic Proteinases From Candida Albicans", Proteins: Structure, Function, and Bioinformatics, vol. 72, 2008, pp. 1308-1319.

Fusek, et al., "Extracellular Aspartic Proteinases From *Candida albicans*, *Candida tropicalis*, and *Candida parapsilosis* Yeasts Differ Substantially in Their Specificities", Biochemistry, vol. 33, 1994, pp. 9791-9799.

Gow, et al., "Candida Albicans Morphogenesis and Host Defence: Discriminating Invasion From Colonization", Nat Rev Microbiol. vol. 10, No. 2, 2012, pp. 112-122.

Kim, et al., "Engineering Peptide-targeted Liposomal Nanoparticles Optimized for Improved Selectivity for HER2-positive Breast Cancer Cells to Achieve Enhanced in Vivo Efficacy", Journal of Controlled Release, vol. 322, 2020, pp. 530-541.

Lamastro, et al., "Antifungal Liposomes: Lipid Saturation and Cholesterol Concentration Impact Interaction With Fungal and Mammalian Cells", Journal of Biomedical Materials Research Part A, vol. 111, 2023, pp. 644-659.

Schaller, et al., "Hydrolytic Enzymes as Virulence Factors of Candida Albicans", Mycoses, vol. 48, 2005, pp. 365-377.

Schneider, et al., "Influence of Ph on Wound-healing: a New Perspective for Wound-therapy?", Arch Dermatol Res, vol. 298, 2007, pp. 413-420.

Kendrick, et al., "Online Size-Exclusion High-Performance Liquid Chromatography Light Scattering and Differential Refractometry Methods to Determine Degree of Polymer Conjugation to Proteins and Protein-Protein or Protein-Ligand Association States", Analytical Biochemistry, vol. 299, No. 2, 2001, pp. 136-146.

Czamara, et al., "Raman Spectroscopy of Lipids: A Review", Journal of Raman Spectroscopy, vol. 46, Issue 1, Jan. 2015, pp. 4-20.

Danese, Paul N., "Antibiofilm Approaches: Prevention of Catheter Colonization", Chemistry & Biology, vol. 9, Aug. 2002, pp. 873-880.

Dehghani, et al., "14.3.6—Injectable Hydrogels for in Vivo Cartilage Formation", Chapter—Challenges for Cartilage Regeneration, Biomaterials for Implants and Scaffolds, 2016, p. 422.

Díez-Martínez, et al., "Auranofin-Loaded Nanoparticles as a New Therapeutic Tool to Fight Streptococcal Infections", Scientific Reports, vol. 6, Jan. 18, 2016, pp. 1-12.

Drummond, et al., "The Role of Dectin-1 in the Host Defence Against Fungal Infections", Current Opinion in Microbiology, vol. 14, 2011, pp. 392-399.

Durst, et al., "Flexural Characterization of Cell Encapsulated PEGDA Hydrogels With Applications for Tissue Engineered Heart Valves", Acta Biomaterialia, vol. 7, No. 6, Jun. 2011, 22 pages.

Eggimann, et al., "Epidemiology of *Candida* Species Infections in Critically Ill Non-Immunosuppressed Patients", Lancet Infect Dis., vol. 3, No. 11, Nov. 2003, pp. 685-702.

Federman, et al., "Targeting Liposomes Toward Novel Pediatric Anticancer Therapeutics", Pediatric Research, vol. 67, No. 5, 2010, pp. 514-519.

Filgueiras, "Adsorption Study of Antibiotics on Silver Nanoparticle Surfaces By Surface-Enhanced Raman Scattering Spectroscopy", Spectrochimica Acta Part A: Molecular and Biomolecular Spectroscopy, vol. 136, Part B, Feb. 5, 2015, pp. 979-985.

Franco, et al., "Development and Optimization of a Dual-Photoinitiator, Emulsion-Based Technique for Rapid Generation of Cell-Laden Hydrogel Microspheres", Acta Biomaterialia, vol. 7, No. 9, 2011, pp. 3267-3276.

Franssen, et al., "A Novel Preparation Method for Polymeric Microparticles Without the Use of Organic Solvents", International Journal of Pharmaceutics, vol. 168, No. 1, 1998, 1 page.

Fuchs, et al., "Inhibition of Bacterial and Fungal Pathogens by the Orphaned Drug Auranofin", Future Medicinal Chemistry, vol. 8, Issue 2, 2016, pp. 117-132.

Gabriella, et al., "Efficacy of a Central Venous Catheter (Hydrocath®) Loaded with Teicoplanin in Preventing Subcutaneous Staphylococcal Infection in the Mouse", Zentralblatt Fur Bakteriol, vol. 279, 1993, pp. 426-433.

Galvan, et al., "Surface-Enhanced Raman Scattering for Rapid Detection and Characterization of Antibiotic-Resistant Bacteria", Advanced Healthcare Materials, vol. 7, Issue 13, 2018, pp. 1-27.

Germaine, et al., "Proteolytic Activity of Candida Albicans: Action on Human Salivary Proteins", Infection and Immunity, vol. 22, No. 3, Dec. 1978, pp. 861-866.

Gong, et al., "Translocation of cell-penetrating peptidesintoCandidafungal pathogens", Protein Science. vol. 26, No. 9, 2017, pp. 1687-1892.

Graham, et al., "Establishment and Characterization of First Trimester Human Trophoblast Cells with Extended Life-Span", Experimental Cell Research, vol. 206, 1993, pp. 204-211.

Grubb, et al., "Candida albicans-Endothelial Cell Interactions: a Key Step in the Pathogenesis of Systemic Candidiasis", Infection and Immunity, vol. 76, No. 10, Oct. 2008, pp. 4370-4377.

Guttmacher, et al., "The Human Placenta Project: Placental Structure, Development, and Function in Real Time", Placenta, vol. 35, Issue 5, May 2014, pp. 303-304.

Hamley, Ian W, "Lipopeptides: From Self-assembly to Bioactivity", Chemical Communications—Royal Society of Chemistry, vol. 51, 2015, pp. 8574-8583.

Hanaki, et al., "Characterization of HMRZ-86: a novel chromogenic cephalosporin for the detection of extended-spectrum beta-lacatamases,", Journal of Antimicrobial Chemotherapy, vol. 53, No. 5, May 2004, pp. 888-889.

Hanaki, et al., "The Synthesis of 7-Substituted-3-dinitrostyryl Cephalosporins and Their Ability for Detecting Extended Spectrum Beta-Lactamases (ESBLs).", The Journal of Antibiotics, vol. 58, 2005, pp. 69-73.

Harbut, et al., "Auranofin Exerts Broad-spectrum Bactericidal Activities by Targeting Thiol-redox Homeostasis", Proceedings of the National Academy of Sciences, U S A., vol. 112, Issue 14, Apr. 7, 2015, pp. 4453-4458.

Hardy, et al., "Biomimetic Supported Lipid Bilayers With High Cholesterol Content Formed by α-Helical Peptide-Induced Vesicle Fusion", Journal of Materials Chemistry, vol. 22, Issue 37, Aug. 28, 2012, pp. 19506-19513.

Hardy, et al., "Model cell membranes: Techniques to Form Complex Biomimetic Supported Lipid Bilayers via Vesicle Usion", Current Opinion in Colloid & Interface Science, vol. 18, Issue 5, Oct. 1, 2013, pp. 448-458.

Hashimoto, et al., "Micafungin: A Sulfated Echinocandin", The Journal of Antibiotics, vol. 62, Issue 1, 2009, pp. 27-35.

(56) References Cited

OTHER PUBLICATIONS

Hassanain, et al., "Recent Advances in Antibiotic Resistance Diagnosis Using SERS: Focus on the "Big 5" Challenges", The Royal Society of Chemistry, vol. 147, Sep. 13, 2022, pp. 4674-4700.
Hay, "Placental Transport of Nutrients to the Fetus.", Hormone Research, vol. 42, Issue 4-5, 1994, pp. 215-222.
Hilton, et al., "Phenotypically Distinguishing ESBL-Producing Pathogens Using Paper-Based Surface Enhanced Raman Sensors", Analytica Chimica Acta, vol. 1127, Aug. 29, 2020, pp. 207-216.
Hoffman, Paul S., "Antibacterial Discovery: 21st Century Challenges", Antibiotics, vol. 9, No. 5, 2020, 10 pages.
Horn, et al., "Epidemiology and Outcomes of Candidemia in 2019 Patients: Data From the Prospective Antifungal Therapy Alliance Registry", Clinical Infectious Diseases, vol. 48, No. 12, Jun. 15, 2009, pp. 1695-1703.
Hsu, et al., "Prognostic Factors for Patients With Culture-Positive Candida Infection Undergoing Abdominal Surgery", J. Microbial. Immunol. Infect., vol. 42, No. 5, Oct. 2009, 1 page.
Huang, et al., "Increased Placental Phospholipid Levels in Pre-Eclamptic Pregnancies", International Journal of Molecular Sciences, vol. 14, No. 2, 2013, pp. 3487-3499.
Hubatsch, et al., "Determination of Drug Permeability and Prediction of Drug Absorption in Caco-2 Monolayers", Nature Protocols, vol. 2, Issue 9, 2007, pp. 2111-2119.
Hube, et al., "Expression of Seven Members of the Gene Family Encoding Secretory Aspartyl Proteinases in Candida Albicans", Molecular Microbiology, vol. 14, No. 1, 1994, 1 page.
Illsley, et al., "Lipid Domain Structure Correlated with Membrane Protein Function in Placental Microvillus Vesicles", Biochemistry, vol. 26, 1987, pp. 446-454.
Jang, Woong Sik, et al., "The P-113 Fragment of Histatin 5 Requires a Specific Peptide Sequence for Intracellular Translocation in Candida albicans, which is Independent of Cell Wall Binding", Antimicrobial Agents and Chemotherapy, vol. 52, No. 2, Feb. 2008, pp. 497-504.
Jarvis, et al., "Predominant Pathogens in Hospital Infections", J Antimicrob Chemother., vol. 29, Apr. 1992, 1 page.
Jiang, et al., "Clearance of Intracellular Klebsiella Pneumoniae Infection Using Gentamicinloaded Nanoparticles", Journal of Controlled Release, vol. 279, 2018, pp. 316-325.
Jones, et al., "In vitro evaluation of CENTA, a new beta-lactamase-susceptible chromogenic cephalosporin reagent.", Journal of Clinical Microbiology, vol. 15, No. 5, 2015, pp. 954-958.
Jones, et al., "Regulation of Placental Nutrient Transport—A Review.", Placenta, vol. 28, Issue 8-9, 2007, pp. 763-774.
Kabir, et al., "Candida albicans: A Model Organism for Studying Fungal Pathogens", International Scholarly Research Network, vol. 2012, Article ID 538694, 2012, pp. 1-15.
Kaiser, "Gearing Up for a Closer Look at the Human Placenta", Science, vol. 344, Issue 6188, Jun. 6, 2014, pp. 1073.
Kalkunte, et al., "In Vitro and In Vivo Evidence for Lack of Endovascular Remodeling by Third Trimester Trophoblasts", Placenta, vol. 29, Oct. 2008, pp. 871-878.
Kaminski, et al., "Recent Progress in the Study of the Interactions of Amphotericin B with Cholesterol and Ergosterol in Lipid Environments", European Biophysics Journal, vol. 43, Issue 10-11, 2014, pp. 453-467.
Kargar Dong-Jin, et al., "Application Potential of Liposomal Delivery Systems Prepared by Lipids Extracted from *E. coli* Cultures", Annual Research & Review in Biology, vol. 4, No. 8, Jan. 2014, pp. 1319-1329.
Karger, "HPLC: Early and Recent Perspectives", Journal of Chemical Education, vol. 74, Issue 1, 1997, pp. 45.
Keller, et al., "Surface Specific Kinetics of Lipid Vesicle Adsorption Measured with a Quartz Crystal Microbalance", Biophysical Journal, vol. 75, Issue 3, Sep. 1998, pp. 1397-1402.
Khan, et al., "Rapid optical determination of β-lactamase and antibiotic activity", BMC Microbiol., vol. 14, 2014, 14 pages.
"International Search Report and Written Opinion received for PCT Patent Application No. PCT/US2020/057799, dated Jan. 29, 2021", 8 pages.
Alkekhia, et al., "β Lactamase-Responsive Hydrogel Drug Delivery Platform for Bacteria-Triggered Cargo Release", CS Applied Materials & Interfaces, vol. 14, No. 24, Jun. 8, 2022, pp. 27538-27550.
Chan, et al., "Unique Fluorescent Imaging Probe for Bacterial Surface Localization and Resistant Enzyme Imaging", ACS Chemical Biology, vol. 13, 2018, pp. 1890-1896.
Drawz, et al., "Three Decades of β-Lactamase Inhibitors", Clinical Microbiology Reviews, vol. 23, No. 1, 2010, pp. 160-201.
Fang, et al., "Robust Self-Healing Hydrogels Assisted by Cross-Linked Nanofiber Networks", Scientific Reports, vol. 3, No. 2811, Oct. 3, 2013, pp. 1-7.
Li, et al., "Enzyme-Responsive Polymeric Vesicles for Bacterial-Strain-Selective Delivery of Antimicrobial Agents", Angewandte Chemie International Edition, vol. 55, No. 5, 2016, pp. 1760-1764.
Xiao, et al., "Novel Fluorescent Cephalosporins: Synthesis, Antimicrobial Activity and Photodynamic Inactivation of Antibiotic Resistant Bacteria", European Journal of Medicinal Chemistry, vol. 59, 2013, pp. 150-159.
Yang, et al., "Using β-Lactamase to Trigger Supramolecular Hydrogelation", Journal of the American Chemical Society, vol. 129, No. 2, 2007, pp. 266-267.
Yu, et al., "β-Lactamase Responsive Supramolecular Hydrogels with Host-Guest Self-Healing Capability", ACS Applied Polymer Materials, 2019, pp. 55-65.
Zheng, et al., "Exploiting a Bacterial Drug-Resistance Mechanism: A Light-Activated Construct for the Destruction of MRSA", Angewandte Chemie International Edition, vol. 48, 2009, pp. 2148-2151.
Zhou, et al., "In Vivo Anti-Biofilm and Anti-Bacterial Non-Leachable Coating Thermally Polymerized on Cylindrical Catheter", ACS Applied Materials and Interfaces, vol. 9, 2017, pp. 36269-36280.
Samek, et al., "The Potential of SERS as an AST Methodology in Clinical Settings", Nanophotonics, vol. 10, No. 10, Jul. 5, 2021, pp. 2537-2561.
Satoh, et al., "*Candida auris* Sp. Nov., a Novel Ascomycetous Yeast Isolated From the External Ear Canal of an Inpatient in a Japanese Hospital", Microbial Immunol, vol. 53, 2009, pp. 41-44.
Schettler, "Human Exposure to Phthalates via Consumer Products", International Journal of Andrology, vol. 29, 2006, pp. 134-139.
Schmidt, et al., "Only Humans Have Human Placentas: Molecular Differences Between Mice and Humans", American Journal of Reproductive Immunology, vol. 108, Apr. 2015, pp. 65-71.
Schreiber, et al., "Proteolytic Activity of Candida Albicans and Other Yeasts", Diagnostic Microbiology and Infectious Disease, vol. 3, No. 1, 1985, 1 page.
Sercombe, et al., "Advances and Challenges of Liposome Assisted Drug Delivery", Front Pharmacol., vol. 6, 2015, 13 pages.
Shaikh, et al., "Antibiotic resistance and extended spectrum beta-lactamases: Types, epidemiology and treatment.", Saudi Journal of Biological Sciences, vol. 22, 2015, pp. 90-101.
Shao, et al., "Enzyme responsive luminescent ruthenium(II) cephalosporin probe for intracellular imaging and photoinactivation of antibiotics resistant bacteria", Chemical Communications, vol. 48, 2012, pp. 1739-1741.
Sharma, et al., "Drug Discovery of Antimicrobial Photosensitizers Using Animal Models", Current Pharmaceutical Design, vol. 17, No. 13, 2011, pp. 1303-1319.
Shockcor, et al., "Combined HPLC, NMR Spectroscopy, and Ion-Trap Mass Spectrometry with Application to the Detection and Characterization of Xenobiotic and Endogenous Metabolites in Human Urine", Analytical Chemistry, vol. 68, Issue 24, 1996, pp. 4431-4435.
Sibley, "Knowledge Needed About the Exchange Physiology of the Placenta", Placenta, vol. 64 Supplement 1, Apr. 2018, pp. S9-S15.
Simner, et al., "Carbapenesmase Detection among Carbapenem-Resistant Glucose-Nonfermenting Gram-Negative Bacilli", J Clin Microbiol., vol. 55, 2017, pp. 2858-2864.
Souza, et al., "Distal and Lateral Toenail Onychomycosis Caused by Trichophyton rubrum: Treatment with Photodynamic Therapy Based on Methylene Blue Dye", Anais Brasileiros de Dermatologia, vol. 89, No. 1, 2014, pp. 184-186.

(56) References Cited

OTHER PUBLICATIONS

Stacey, Kevin, "Germ-Fighting Catheter Coating May Help Prevent Infections", News from Brown Available at <https://news.brown.edu/articles/2019/03/coating>, Mar. 7, 2019, 3 pages.

Stair, et al., "Sensor Materials for the Detection of Proteases", Biosensors and Bioelectronics, vol. 24, No. 7, 2009, 1 page.

Stefánek, et al., "Photodynamic Inactivation Effectively Eradicates Candida auris Biofilm despite Its Interference with the Upregulation of CDR1 and MDR1 Efflux Genes", Journal of Fungi, vol. 8, No. 1137, Oct. 27, 2022, pp. 1-10.

Takao, et al., "Isolation and Characterization of Human Trophoblast Side-Population (SP) Cells in Primary Villous Cytotrophoblasts and HTR-8/SVneo Cell Line", PLoS One, vol. 6, Issue 7, e21990, Jul. 2011, pp. 1-14.

Tang, et al., "Pathway Confirmation and Flux Analysis of Central Metabolic Pathways in Desulfovibrio Vulgaris Hildenborough Using Gas Chromatography-Mass Spectrometry and Fourier Transform-Ion Cyclotron Resonance Mass Spectrometry", Journal of Bacteriology, vol. 189, No. 3, Feb. 2007, pp. 940-949.

Tooke, et al., "Beta-Lactamases and Beta-Lactamase Inhibitors in the 21st Century", J Mol Biol., vol. 431, 2019, pp. 3472-3500.

Tsai, et al., "Galleria Mellonella Infection Models for the Study of Bacterial Diseases and for Antimicrobial Drug Testing", Virulence, vol. 7, Issue 3, Apr. 2016, pp. 214-229.

Turco, et al., "Trophoblast Organoids as a Model for Maternal-fetal Interactions During Human Placentation", Nature, vol. 564, Dec. 13, 2018, pp. 263-267.

Vallabhaneni, et al., "Epidemiology and Risk Factors for Echinocandin Nonsusceptible Candida Glabrata Bloodstream Infections: Data From a Large Multisite Population-Based Candidemia Surveillance Program", Open Forum Infectious Diseases, vol. 2, No. 4, 2015, pp. 1-7.

Vallabhaneni, et al., "Investigation of the First Seven Reported Cases of Candida Auris, A Globally Emerging Invasive, Multidrug-Resistant Fungus-Fungus", American Journal of Transplantation, vol. 17, 2017, pp. 296-299.

Van Berkel, et al., "Assay platform for clinically relevant metallo-β-lactamases,", J. Med. Chem., vol. 56, 2013, pp. 6945-6953.

Van Meer, et al., "Membrane Lipids: Where They Are and How They Behave", Nature Reviews Molecular Cell Biology, vol. 9, Issue 2, Feb. 2008, pp. 112-124.

Vazquez, et al., "Anidulafungin: A Novel Echinocandin", Reviews of Anti-infective Agents, CID, vol. 43, Issue 215, Jul. 15, 2006, pp. 215-222.

Ventola, C Lee, "The Antibiotic Resistance Crisis: Part 1: Causes and Threats", Pharmacy and Therapeutics, vol. 40, No. 4, 2015, pp. 277-283.

Von Dadelszen, et al., "Antihypertensive Medications in Management of Gestational Hypertension-Preeclampsia", Clinical Obstetrics and Gynecology, vol. 48, No. 2, Jun. 2005, pp. 441-459.

Vrioni, et al., "Performal of the Beta LACTA test for rapid detection of expanded-spectrum cephalosporin-non-susceptible Enterobacteriaceae.", Journal of Global Antimicrobial Resistance, vol. 10,, 2017, pp. 285-288.

Waglewska, et al., "Antimicrobial Phyto-Photodynamic Activity Inducing by Polyphenol-Supported Methylene Blue Co-Loaded into Multifunctional Bilosomes: Advanced Hybrid Nanoplatform in the Skin Infections Treatment?", Journal of Photochemistry and Photobiology B: Biology, vol. 240, No. 112650, Mar. 2023, 7 pages.

Walker, et al., "The Viscoelastic Properties of the Fungal Cell Wall Allow Traffic of AmBisome as Intact Liposome Vesicles", American Society For Microbiology, vol. 9, Issue 1, Jan./Feb. 2018, 15 pages.

Wang, et al., "Detection and Characterization of Antibiotic-Resistant Bacteria Using Surface-Enhanced Raman Spectroscopy", Nanomaterials, vol. 8, No. 762, Sep. 26, 2018, pp. 1-21.

Wang, et al., "Plasmonic Microneedle Arrays for Rapid Extraction, SERS Detection, and Inactivation of Bacteria", Chemical Engineering Journal, vol. 442, Part 1, Article 136140, Aug. 15, 2022, 8 pages.

Wassef, et al., "Chromgenic Cica-Beta Testing for Detection of Extended-Spectrum and AmpC Beta-Lactamases Among Cefoxitin-Resistant Isolates", Laboratory Medicine, vol. 44, No. 1,, 2013, pp. 25-28.

Wishart, et al., "HMDB 4.0: The Human Metabolome Database for 2018", Nucleic Acids Research, vol. 46, Issue D1, Jan. 4, 2018, pp. D608-D617.

Wu Dong-Jin, et al., "Methylene-Blue-Encapsulated Liposomes as Photodynamic Therapy Nano Agents for Breast Cancer Cells", Nanomaterials, vol. 9, No. 14, 2019, pp. 1-12.

Xin, et al., "Identification of a Monoacid-Based, Cell Permeable, Selective Inhibitor of Protein Tyrosine Phosphatase 1B", Bioorganic and Medicinal Chemistry Letters. vol. 13, 2003, pp. 3947-3950.

Xu, et al., "Bioorthogonally Cross-Linked Hydrogel Network with Precisely Controlled Disintegration Time over a Broad Range", J. Am. Chem. Soc, vol. 136, 2014, pp. 4105-4108.

Xu, et al., "Photoactive Silver Nanoagents for Backgroundless Monitoring and Precision Killing of Multidrug-Resistant Bacteria", Nanotheranostics, vol. 5, No. 4, Jun. 1, 2021, pp. 472-487.

Yu, et al., "A chromogenic cephalosporin for Beta-lactamese inhibitor screening assays", Analytical Biochemistry, vol. 428, No. 2, 2012, pp. 96-98.

Yu, et al., "Site-Specific Photoconjugation of Beta-Lactamase Fragments to Monoclonal Antibodies Enables sensitive Analyte Deteciton via Split-Enzyme Complementation", Biotechnology Journal, vol. 13, 2018, 9 pages.

Zaidi, et al., "Total Protein Profile and Drug Resistance in Candida Albicans Isolated From Clinical Samples", Molecular Biology International, Article ID 4982131, 2016, 8 pages.

Zampieri, et al., "Frontiers of High-Throughput Metabolomics", Current Opinion in Chemical Biology, vol. 36, Feb. 2017, pp. 15-23.

Zan, et al., "AH Peptide-mediated Formation of Charged Planar Lipid Bilayers", The Journal of Physical Chemistry B, vol. 118, Issue 13, Apr. 3, 2014, pp. 3616-3621.

Zan, et al., "Rupture of Zwitterionic Lipid Vesicles by an Amphipathic, α-Helical Peptide: Indirect Effects of Sensor Surface and Implications for Experimental Analysis", Colloids and Surfaces B: Biointerfaces, vol. 121, Sep. 1, 2014, pp. 340-346.

Zeng, et al., "Developments of a Fully Automated Parallel HPLC/Mass Spectrometry System for the Analytical Characterization and Preparative Purification of Combinatorial Libraries", Analytical Chemistry, vol. 70, Issue 20, 1998, pp. 4380-4388.

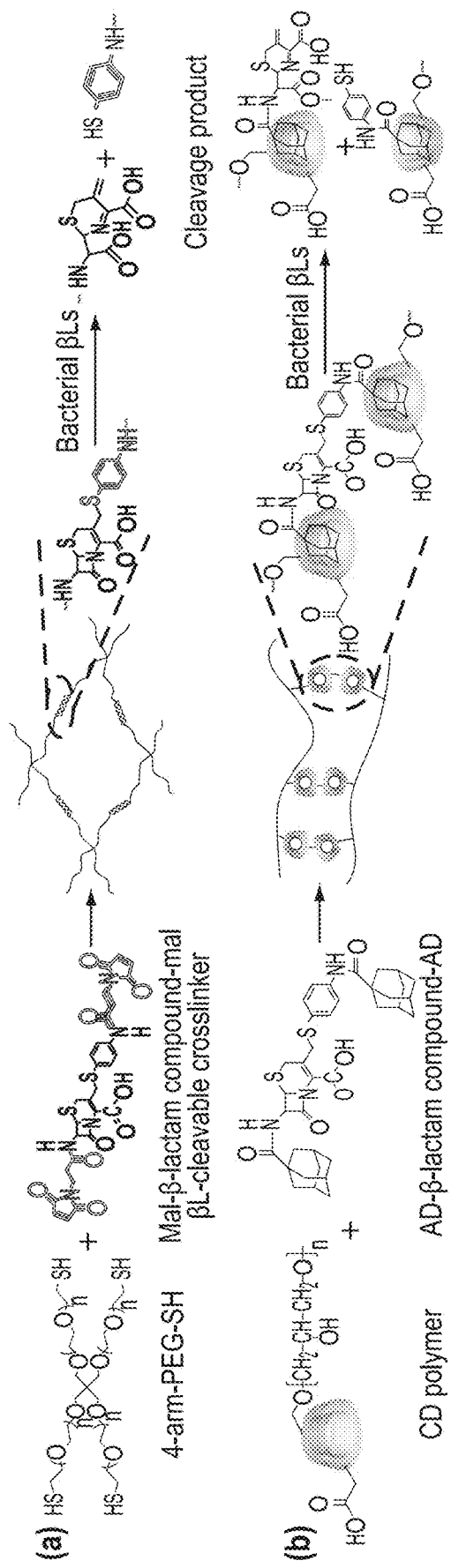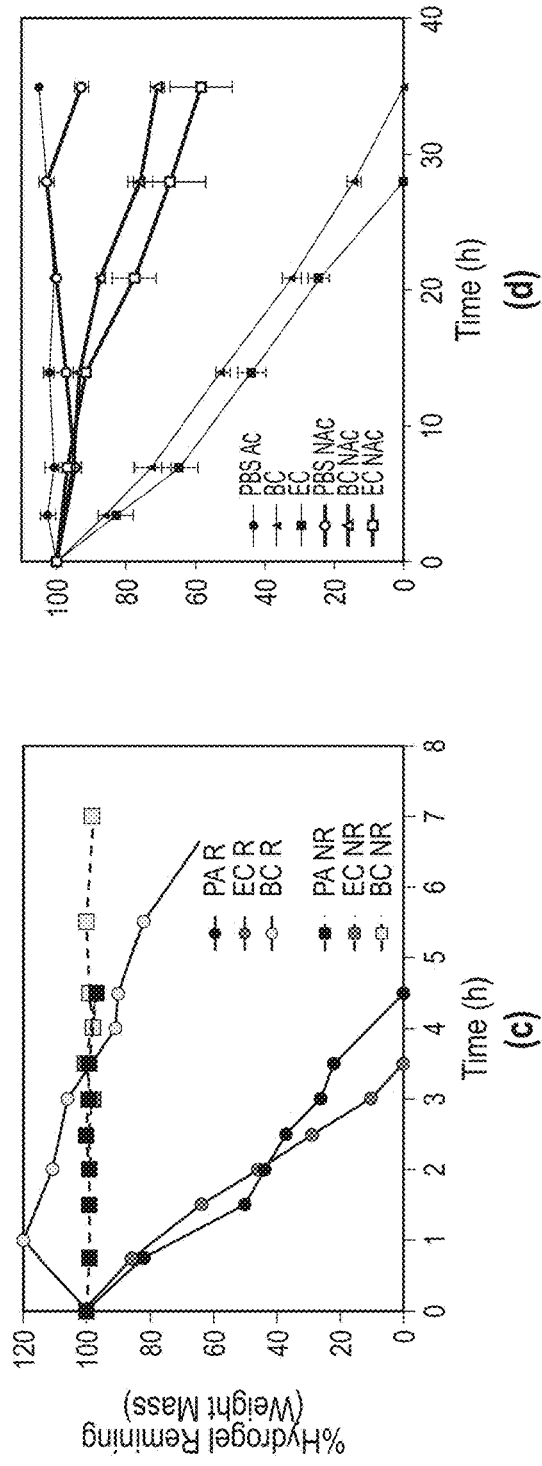
FIG. 2

FIG. 3 (Scheme 1)

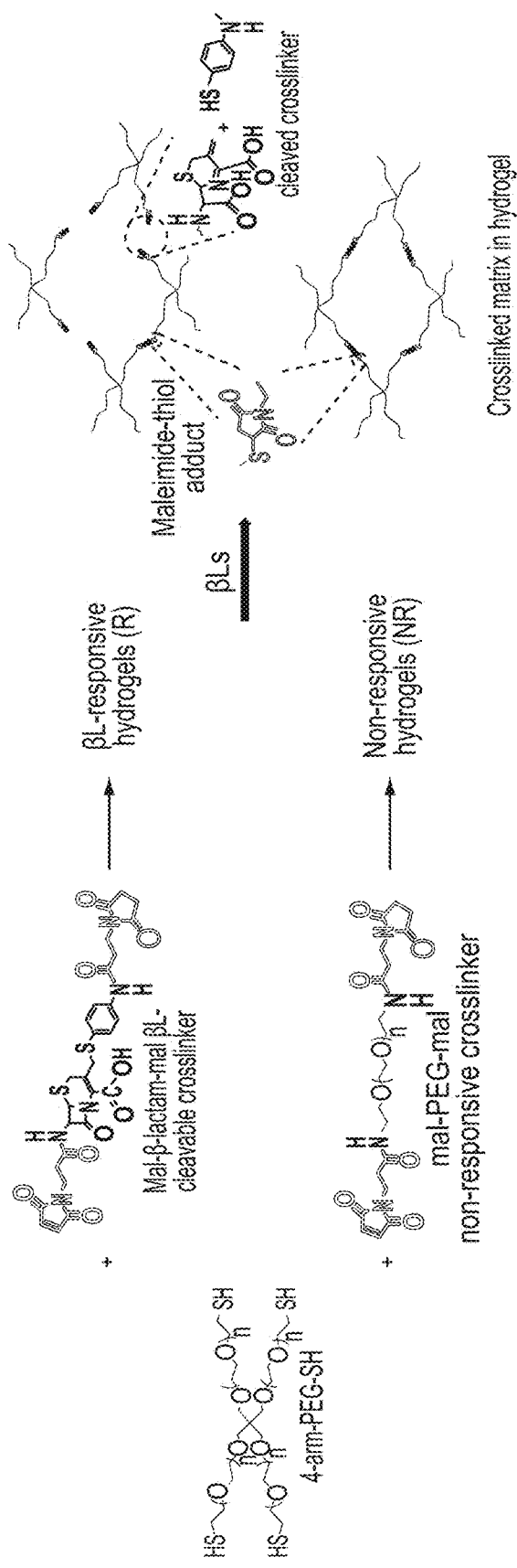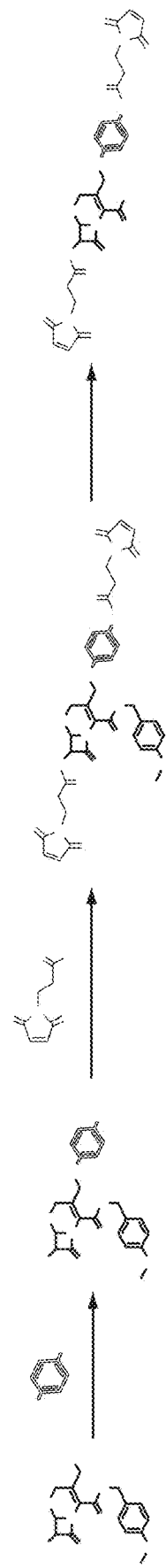
FIG. 8 (Scheme 2)
FIG. 9 (Scheme 3)

BACTERIAL BETA-LACTAMASE RESPONSIVE HYDROGELS

CROSS REFERENCE TO RELATED APPLICATIONS

This application is a national phase filing under 35 U.S.C. § 371 of International Application No. PCT/US20/57799 filed Oct. 28, 2020, which claims priority from U.S. Provisional Patent Application No. 62/926,957 filed Oct. 28, 2019, the entire contents of which are hereby incorporated by reference herein.

STATEMENT REGARDING FEDERALLY SPONSORED RESEARCH OR DEVELOPMENT

This invention was made with government support under grant no. N00014-17-2120, awarded by the Office of Naval Research. The government has certain rights in the invention.

FIELD OF THE INVENTION

This invention generally relates to determining the presence or kind of microorganism; the use of selective media for testing antibiotics or bacteriocides; and compositions containing a chemical indicator therefor.

BACKGROUND OF THE INVENTION

The continuous emergence and rapid spread of antibiotic resistant bacteria has caused serious environmental and public health issues worldwide due to increasing difficulty in treating infections. Since penicillin was discovered in 1928, β-lactam antibiotics have been used extensively for treating bacterial infections and their growing use has also led to the rapid development of β-lectern resistance. β-lactamase-mediated hydrolysis of β-lectern antibiotics (e.g., penicillins, cephalosporins, monobactams, and carbapenems) is the most common mechanism of resistance to this class of antibacterial agents clinically used for treating bacterial infections. See, Zhang et al., J. Am. Chem. Soc., 136, 4873-4876 (2014); Yang et al., J. Am. Chem. Soc., 129, 266-267 (2007). Because these antibiotics are preferred in the treatment of many infectious diseases, production of β-lactamases threatens the utility and efficacy of these vital therapeutics.

Smart supramolecular materials have gained popularity for a range of applications including sensing, drug delivery, and tissue engineering. Several polymeric materials have been developed inspired by these interactions including responsive or "smart" hydrogels that incorporate covalent bonds with a variety of noncovalent interactions (e.g., "host-guest" interactions, hydrogen bonding, electrostatic interactions, hydrophobic interactions, etc.). See Hauptstein et al., ACS Biomater. Sci. Eng., 4, 2733-2738 (2018); Kang et al., ACS Appl. Mater. Interfaces, 9, 4475-4484 (2017); Gates & Shukla, J. Polym. Sci. Pol. Phys., 55, 127-131 (2017); and Monteiro et al., J. Biomed. Mater. Res. A, 103, 330-340 (2015).

There remains a need in the biochemical art for supramolecular materials for use with bacteria that are resistant to β-lactam antibiotics.

SUMMARY OF THE INVENTION

In a first embodiment, the invention provides a "host-guest" supramolecular hydrogel. The hydrogel contains an AAm/NVP interpenetrating polymer network (IPN) with supramolecular cross-linkers assembled from β-lactam/adamantane-containing guest molecule with host polymer. An advantage of this hydrogel is that because of the molecular association of polymer and adamantane, the supramolecular hydrogels self-heal without any external stimuli after the hydrogels are severed. Degradation tests performed by the inventors showed that the self-healing behavior achieved through molecular association advantageously had no negative effect on the β-lactamase-responsive performance of the hydrogels.

In a second embodiment, the hydrogels exhibited or can exhibit β-lactamase-responsive degradation due to β-lactam ring hydrolysis causing cleavage of the guest molecules in the presence of or when contacted by β-lactamase enzyme. Hydrogels with a protecting group attached to a common β-lactamase recognition site on the guest exhibited a significantly slower degradation, confirming that hydrogel degradation is specific to β-lactamase cleavage of the guest molecule.

In a third embodiment, the hydrogels exhibited or can exhibit β-lactamase-responsive degradation due to β-lactam ring hydrolysis causing cleavage of the guest molecules in the presence of or when contacted by β-lactamase-producing bacteria. By contrast, the hydrogels remain stable w in the presence of or when contacted by non-β-lactamase-producing bacteria. The β-lactamase-responsive degradation was translated to bacteria, resulting in complete degradation of hydrogels incubated with cultures of β-lactamase-producing bacteria in approximately seventy-two hours, while those incubated with non-β-lactamase-producing bacteria remained stable over this time. Responsive hydrogels degraded and released nanoparticles in the presence of β-lactamase-producing bacteria strains of *Bacillus cereus, Pseudomonas aeruginosa, Escherichia coli, Enterobacter cloacae,* and *Klebsiella pneumoniae* but remained stable when incubated with a non-β-lactamase-producing strain of *Staphylococcus aureus.* Altogether, these hydrogels have the potential to be used as bacteria-triggered drug delivery systems to enhance infection treatment.

In a fourth embodiment, the hydrogels have poly-carboxymethyl-β-cyclodextrins (PCD) as the host polymer. Cyclodextrins are cyclic oligosaccharides known for their unique configuration with a hydrophobic inner cavity and a hydrophilic outer surface. Cyclodextrins can selectively encapsulate hydrophobic moieties, like adamantane, whose molecular size fits well into β-cyclodextrin's internal diameter (association constant, $K \sim 10^5 \, M^{-1}$. See Chen et al., NPG Asia Mat., 10, 788-799 (2018); Hu et al., ACS Chem. Res, 47, 2017-2025 (2014); and Harada et al., Nat. Chem., 3, 34-37 (2011).

In a fifth embodiment, the hydrogels have different degradation rates. The degradation rates can be tuned by varying hydrogel polymer density. Fluorescent polystyrene nanoparticles (NPs), encapsulated in the hydrogels as model cargo, were released at rates tracking hydrogel wet mass loss, indicating degradation-controlled cargo release. Hydrogels demonstrated an on-off response when β-lactamase were added or removed, respectively. Several degradation rates were observed when hydrogels were incubated with β-lactamase isolated from different bacteria, suggesting different strains may exhibit differing β-lactamase-substrate hydrolysis kinetic controlled degradation.

In a sixth embodiment, the invention provides a method of fabricating a "host-guest" supramolecular hydrogel. The method includes a step of combining a AAm/NVP interpenetrating polymer network with supramolecular cross-linkers assembled from β-lactam/adamantane-containing guest molecules with host polymer, which acts the host backbone of the hydrogel. The two adamantane moieties form cross-links between the polymer cavities. Because of the molecular association of polymeric cyclodextrin and adamantane, the resultant supramolecular hydrogels can self-heal without any external stimuli after they were severed To impart enzyme responsive degradation in addition to promoting hydrogel stability and self-healing capability, a new guest molecule was synthesized containing a β-lactam core flanked by an adamantane group on either side. "Host-guest" interactions between adamantane and polymeric cyclodextrin can facilitate self-healing of the hydrogel, while the 3L-cleavable core of the guest molecule allows for the selective β-lactamase-triggered degradation of the resulting supramolecular hydrogels. Free radical polymerization of acrylamide (AAm) and N-vinylpyrrolidinone (NVP) in the presence of the "host-guest" inclusion complex was used to form an interpenetrating polymer network (IPN) throughout the bulk hydrogel to enhance hydrogel strength and robustness.

In a seventh embodiment, the method of fabricating results in a β-lactamase-cleavable compound functionalized with maleimides on two termini, which participates as a crosslinker in thiol-ene Michael-type addition with multi-arm thiol-terminated PEG building blocks to form β-lactamase-degradable hydrogels (FIG. 8; Scheme 2). In the presence of β-lactamases, the β-lectern ring is hydrolysed leading to the expulsion of one half of the crosslinker and in turn, the cleavage of the matrix and degradation of the hydrogel. β-lactamase responsive hydrogels selectively degraded in the presence of β-lactamases and β-lactamase-producing bacteria. Fluorescent nanoparticles (NPs) loaded into the hydrogels as model cargo were released solely upon hydrogel degradation, indicating the potential use of this platform to control release of encapsulated antibacterial agents from prophylactic biomaterials (e.g., wound dressings) only when an infection arises. These results also infer how hydrogel composition (polymer density) and environmental factors such as β-lactamase concentration and specificity could influence the rate of hydrogel degradation.

In an eighth embodiment, the invention provides an acrylamide/N-vinylpyrrolidinone bifunctional guest molecule. The bifunctional guest complex is useful for formulating a "host-guest" supramolecular hydrogel. The guest molecule is useful for its molecular association with polymeric cyclodextrin (PCD). The guest molecule is useful for imparting hydrogels with a self-healing capability, but also providing a enzymatic cleavage site, the cleavage of which can usefully cause macroscale degradation of the hydrogel.

In a ninth embodiment, the bifunctional guest molecule is a β-lactamase-cleavable cephalosporin functionalized with maleimides on both termini and used as a crosslinker in the synthesis of hydrogels by end-crosslinked polymerization with multi-arm thiol terminated-PEG macromers via Michael-type addition. The β-lactamase-degradable hydrogels degraded in the presence of β-lactamase from three different bacteria, exhibiting a decrease in wet mass over time accompanied with the release of fluorescent polystyrene nanoparticles loaded into the hydrogels as model cargo. The nanoparticle release tracked hydrogel degradation rates/mass reduction indicating degradation-controlled release. Hydrogels incubated in collagenases, a common protease found in infected and non-infected wounds, did not degrade or release nanoparticles. Hydrogels lacking the responsive moiety also remained stable and did not release any detectable nanoparticles into the surrounding β-lactamase solution, suggesting selective degradation of the responsive hydrogels by β-lactamases. Responsive hydrogels also degraded in the presence of β-lactamase-producing bacteria but remained stable if they lacked the degradable motif or were incubated with non-β-lactamase-producing bacteria. Degradation rates differed based on bacteria strain (B. cereus versus P. aeruginosa) and growth conditions (in solution, on agar, or on ex vivo porcine skin), which is likely correlated to the types and concentrations of β-lactamase secreted. The degradable hydrogels also exhibited an on-off response when β-lactamases were added or removed, respectively, further highlighting their β-lactamase-triggered responsive nature. These hydrogels have the potential to be used as prophylactic biomaterials, such as bandages and in situ forming injectable hydrogels, allowing for bacteria triggered release of antibacterial therapeutics to reduce unnecessary exposure, localize delivery, reduce off-site toxicity, and potentially reduce susceptibility to antibiotic resistance development.

In a tenth embodiment, the invention provides a method of making the acrylamide/N-vinylpyrrolidinone bifunctional guest molecule. This acrylamide/N-vinylpyrrolidinone bifunctional guest complex is fabricated by incorporating two adamantane (AD) moieties on the guest precursor, which contains a β-lactam core. The β-lactam core is cleavable by bacterially-produced β-lactamases (βLs).

In an eleventh embodiment, the invention provides a method of diagnosis. Alternatively, the invention provides a hydrogel for use in the diagnosis of the presence of β-lactamase-producing bacteria. The supramolecular hydrogels developed in this work have two primary features: (1) molecular events can be readily visualized by eye as macroscopic changes such as self-healing and β-lactamase-responsive degradation, and (2) the newly synthesized bifunctional "host-guest" cross-linker can initiate both molecular association and degradation of "host-guest" cross-links. The supramolecular "host-guest" hydrogels of the invention are useful in applications of bacteria-responsive materials, including controlled delivery of diagnostics, in which a robust material, capable of self-healing is desirable. β-lactamase-responsiveness can be used to develop biomaterials that can detect and inhibit β-lactamases, which may ultimately improve treatment of antibiotic resistant bacterial infections. Examples of these materials include a β-lactamase responsive fluorescence resonance energy transfer probe that allows for selective imaging of class C β-lactamase (Chan et al., ACS Chem. Biol., 13, 1890-1896 (2018)).

In a twelfth embodiment, the invention provides a method of treatment. Alternatively, the invention provides a hydrogel for use in the treatment of a disease or condition caused by β-lactamase-producing bacteria. The supramolecular "host-guest" hydrogels of the invention are useful in applications of bacteria-responsive materials, including controlled drug delivery, in which a robust material, capable of self-healing is desirable. β-lactamase-responsiveness can be used to develop biomaterials that can detect and inhibit β-lactamases, which may ultimately improve treatment of antibiotic resistant bacterial infections. Examples of these materials include β-lactamase-triggered prodrugs (Yepuri et al., Chem. Commun., 49, 4791-4793 (2013)) and β-lactamase-degradable antibiotic loaded polymeric vesicles (Li et al., Angew. Chem. Int. Ed., 55, 1760-1764 (2016)) for on-demand and localized antibacterial treatment. Spatiotemporally controlled drug release can localize and concentrate the antibacterial agent at the site of infection enhancing its efficacy and reducing off-site toxicity to the microbiome, potentially lowering susceptibility to antibiotic resistance development. A β-lactamase-cleavable cephalosporin was functionalized with maleimides on both termini and served as a crosslinker in the synthesis of hydrogels through end-crosslinked polymerization with multiarm thiol-terminated poly(ethylene glycol) macromers via Michael-type addition. Only hydrogels containing the responsive moiety were degraded by β-lactamase as demonstrated by a decrease in wet mass over time, and furthermore showed specificity toward β-lactamase as no degradation occurred when incubated with collagenases. Smart biomaterials could control and improve drug delivery dynamics. For example, self-regulated release of antibacterials from bacteria-triggered biomaterials could localize antibiotic release to the site of infection and only when an infection arises, thus limiting unnecessary exposure. These biomaterials could be applied to infection prone regions, such as wounds and medical implant and surgical sites, as prophylactic treatments. This delivery approach would also enhance efficacy, reduce required dosage, and decrease off-site toxicity of antibacterial agents, which in turn could potentially reduce susceptibility towards bacterial antibiotic resistance development.

BRIEF DESCRIPTION OF THE DRAWINGS

FIG. 2 is a set of drawings showing effective crosslinking. FIG. 2(a) and FIG. 2(b) are schematic illustrations of covalent [FIG. 2(a)] and non-covalent [FIG. 2(b)] crosslinking of two types of hydrogels using Mal-functionalized or adamantane-functionalized β-lactam compounds, respectively, and the corresponding β-lactamase cleavage of the responsive crosslinker. FIG. 2(c) is a line graph showing the change in responsive (R) and non-responsive (NR) hydrogel wet weight (%) over time when incubated with β-lactamases from *Pseudomonas aeruginosa* (PA), *Enterobacter cloacae* (EC), and *Bacillus cereus* (BC). FIG. 2(d) is a line graph showing the mass changes of activated (Ac) and non-activated (NAc) hydrogels.

FIG. 3 also shows a schematic of interpenetrating polymer network hydrogel structure, "host-guest"+IPN supramolecular hydrogel structure, molecular self-healing, and β-lactamase responsive cleavage of guest molecule.

FIG. 4 shows a three-step synthesis of bifunctional adamantane-conjugated-β-lactam containing guest molecule, Ac-AD-P1. Next, FIG. 4 shows the free-radical polymerization of N-vinylpyrrolidinone and acrylamide in the presence of host and guest molecules for the preparation of "host-guest"+IPN supramolecular hydrogels.

FIG. 5 shows the self-healing behavior of the supramolecular PCD-p(NVP-co-Am)/Ac-AD-PI"host-guest"+IPN hydrogels.

FIG. 6 is a bar graph showing the initial tensile modulus of hydrogels versus healing time. Results are shown as mean±standard deviation. Statistical significance was examined using one-way ANOVA and Tukey's post-hoc analysis. Results shown compare tensile modulus between subsequent healing times; *$p<0.05$; $p<0.01$; *$p<0.001$; n=3.

FIG. 7(a) is a schematic of the mechanism of cleavage of Ac-AD-P1 incorporated in supramolecular hydrogels by Ls. FIG. 7(b) is a set of line graphs showing the percent wet mass remaining of two types of supramolecular "host-guest"+IPN hydrogels: activated PCD-p(NVP-ca-Am)/Ac-AD-P1 (left) and non-activated PCD-p(NVP-ca-Am)/AD-P1 (right) incubated in solutions of 1× phosphate-buffered saline (PBS), BC-βL (100 U/mL), or EC-βL (1 U/mL) at 37° C. over time. Results are shown as mean±standard deviation. Statistical significance was examined using two-way ANOVA and Tukey's post-hoc analysis between incubation conditions at each timepoint; dark and light blue asterisks indicate significance between hydrogels incubated in BC-βL or EC-βL in comparison to those incubated in phosphate-buffered saline, respectively; *$p<0.05$; $p<0.01$; *$p<0.001$; ****$p<0.0001$; n=3.

FIG. A5. Bacteria-responsive degradation of supramolecular PCD-p(NVP-co-Am)/Ac-AD-PI "host-guest"+IPN hydrogels. Representative images of "host-guest"+IPN hydrogels incubated in suspensions of β-lactamase-producing *B. cereus* 13061 and *P. aeruginosa* PA01, or non-β-lactamase-producing *S. aureus* 25923, or in tryptic soy broth (TSB) at 37° C. at different timepoints. Images are representatives of three repeats per condition.

FIG. 8 shows Scheme 2, a schematic of formation/gelation mechanism of OL responsive and non-responsive hydro-gels, and the cleavage of the hydrogel backbone due to the hydrolysis of the O-lectern and expulsion of the leaving group by OLs. Confocal microscopy images of blank or nanoparticle-loaded, swollen hydrogels (a4-arm-PEG-SH: thiol modified 4-arm-PEG; mal-PEG-mal: bismaleimide-PEG; βLs: β-lactamases.)

FIG. 9 shows Scheme 3, a synthesis scheme for the β-lactamase-cleavable crosslinker, mal-β-lactam-mal.

Figure 10:
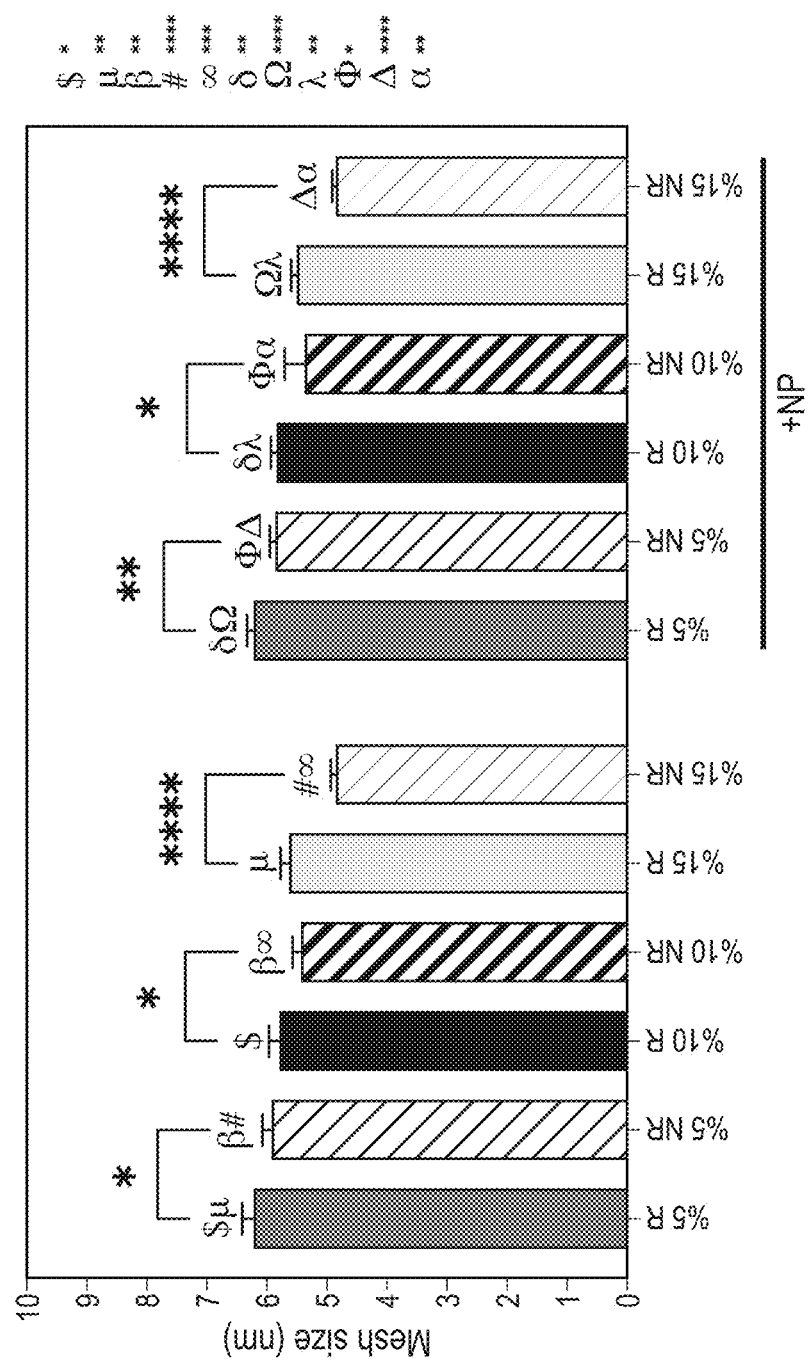

FIG. 10 is a bar graph showing the theoretical mesh size of responsive (R) and non-responsive (NR) hydrogels of different polymer densities (5%, 10%, or 15% w/v poly (ethylene glycol)) with (+) nanoparticle or without nanoparticles (NPS) encapsulated. The data are presented as average±standard deviation; n=4. Statistical significance was examined using unpaired, two-tailed Student's t-test comparing gels with and without nanoparticles for each formulation (5%, 10%, or 15%; responsive or non-responsive) and comparing responsive and non-responsive gels for each formulation (5%, 10%, or 15%; + or −nanoparticles). One-way ANOVA was used to compare gels with different % w/v PEG for each formulation (+NPs or −NPs; R or NR). Samples with the same symbol were statistically significantly different from each other; * $p<0.05$;  $p<0.01$; * $p<0.001$; **** $p<0.0001$.

Figure 11A:
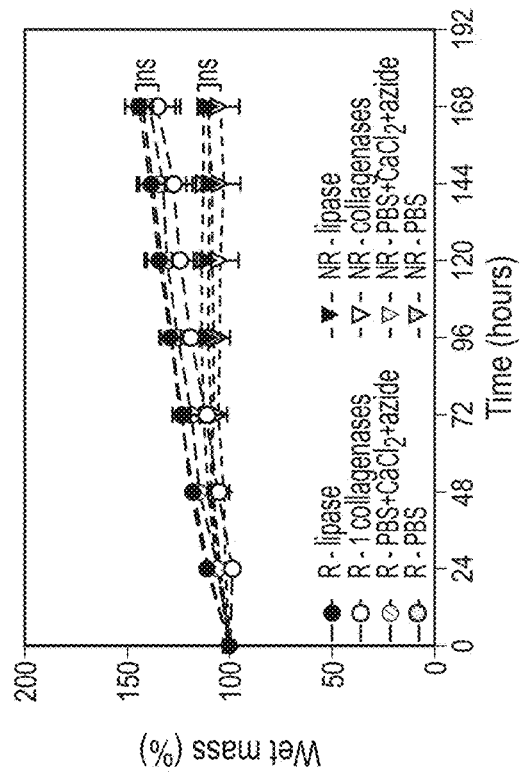
Figure 11B:
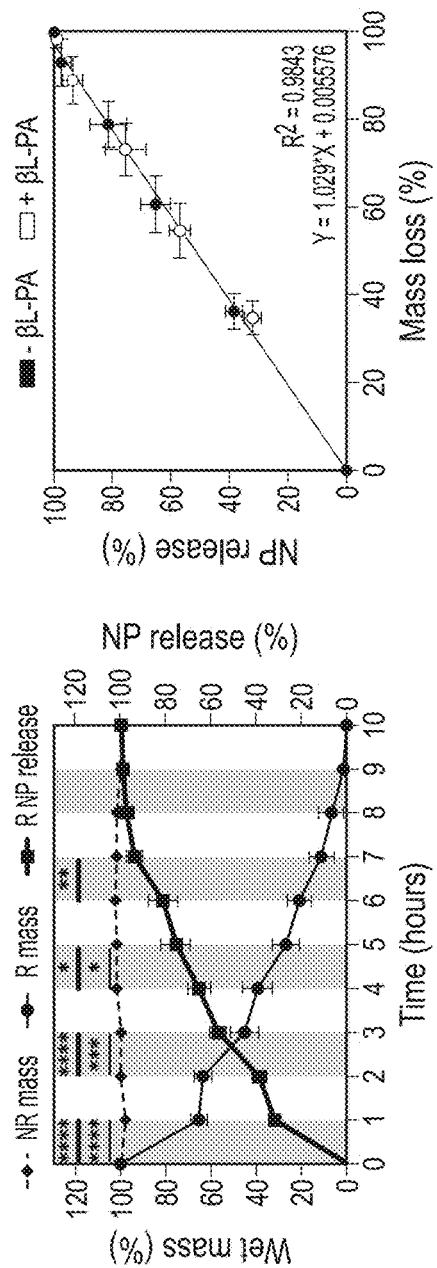

FIG. 11 shows the results of β-lactamase-triggered hydrogel degradation and nanoparticle release. FIG. 11(a) is a line graph showing normalized wet mass of R and NR hydrogels incubated with lipases, collagenases, 1× phosphate-buffered saline with 1 mM calcium chloride and 0.02% w/v sodium azide, or 1× phosphate-buffered saline over time. No nanoparticle release was detected under any of the conditions. FIG. 11(b)(left) is a line graph showing normalized wet mass and nanoparticle release from R and NR hydrogels with alternating incubation in solutions of 50 U/mL β-lactamase-PA (grey regions; +β-lactamase-PA) or in 1× phosphate-buffered saline only (white regions; β-lactamase-PA) for one hour per incubation. FIG. 11(b)(right) is a scatter plot with a line drawn showing normalized nanoparticle release as a function of normalized wet mass loss (each data point represents the same time point). The line indicates a linear fit of the data. Wet mass is normalized to initial mass after swelling and before addition of enzymes. Nanoparticle release at a particular time point is normalized to the fluorescence measured after complete hydrogel degradation. The data are presented as average±standard deviation; n=4. Statistical significance was tested using two-way ANOVA comparing (b) hydrogel incubation conditions at each time point (shown here for 146 hours) or (c) comparing consecutive time points; * $p<0.05$;  $p<0.01$; * $p<0.001$; **** $p<0.0001$.

Figure 12:
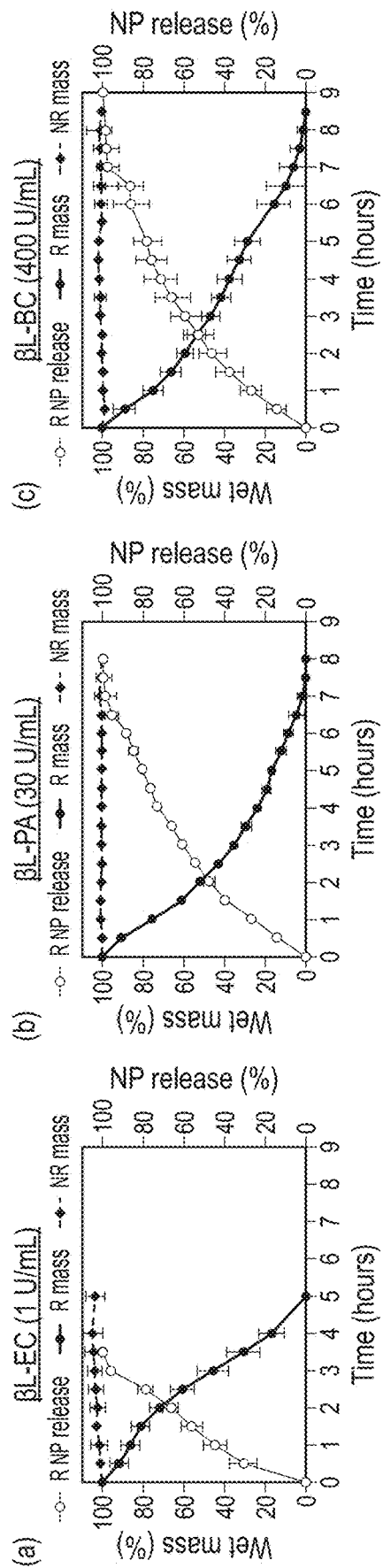

FIG. 12 is a set of line graphs showing hydrogel degradation and nanoparticle release by different β-lactamases. Normalized wet mass and nanoparticle release from 10% w/v responsive (R) and non-responsive (NR) hydrogels incubated with FIG. 12(a) β-lactamase-EC (1 U/mL), FIG. 12(b) β-lactamase-PA (30 U/mL), and FIG. 12(c) β-lactamase-BC (400 U/mL) over time. Wet mass is normalized to initial mass after swelling and before addition of enzymes. Nanoparticle release is normalized to the fluorescence measured in the solutions after complete hydrogel degradation. Data presented as average±standard deviation; n=4.

Figure 13:
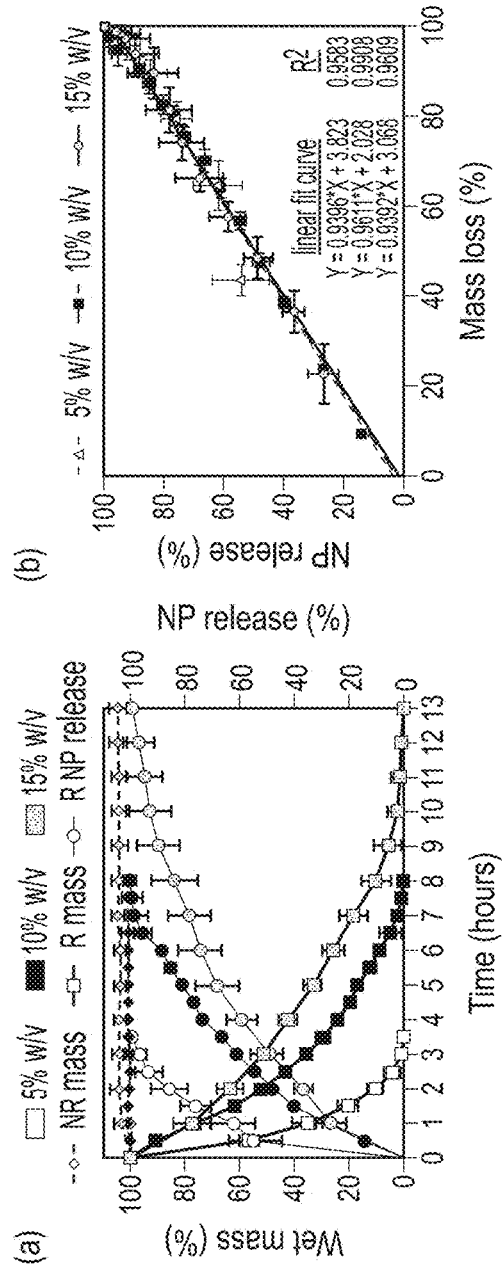

FIG. 13 is a pair of line graphs showing the effect of poly(ethylene glycol) content on hydrogel degradation rate. FIG. 13(a) shows the normalized wet mass and nanoparticle release from responsive (R) and non-responsive (NR) hydrogels with different PEG % w/v (5, 10, 15%) incubated with β-lactamase-PA (30 U/mL) over time. FIG. 13(b) shows the normalized nanoparticle release as a function of normalized wet mass loss (each data point represents one time point). Wet mass is normalized to initial mass after swelling and before addition of enzymes. Nanoparticle release is normalized to the fluorescence measured in the solutions after complete hydrogel degradation. Data presented as average±standard deviation; n=4.

Figure 14:
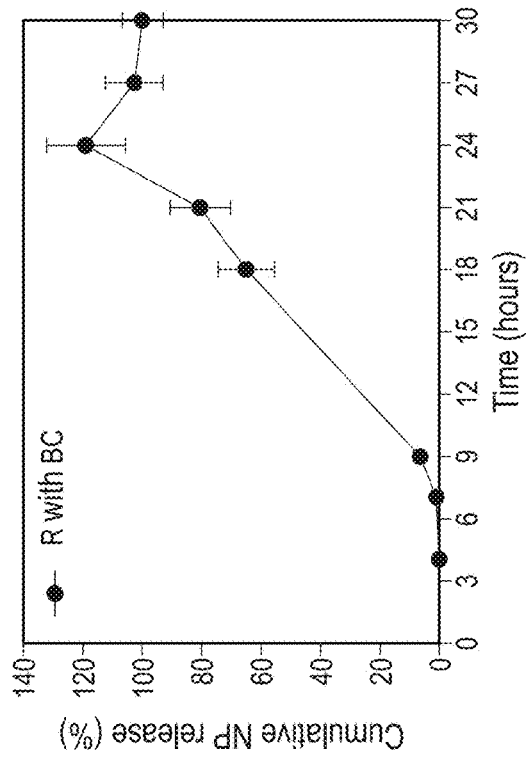

FIG. 14 shows the hydrogel degradation by β-lactamase-producing bacteria in solution. FIG. 14 is a graph showing the normalized nanoparticle release from responsive and non-responsive hydrogels incubated in solutions of *B. cereus* or *S. aureus*. Nanoparticles were only detectable in *B. cereus* solutions incubated with responsive hydrogels. Data is presented as average±standard deviation; n=3.

DETAILED DESCRIPTION OF THE INVENTION

Industrial Applicability

Antibiotic resistance is a major global health threat making bacterial infections increasingly difficult to treat and potentially lethal. A 2019 report by the United States Centers for Disease Control and Prevention (CDC) estimated over 2.8 million infections and over 35,000 deaths caused by antibiotic-resistant microbes annually in the US alone. Centers for Disease Control and Prevention, Antibiotic resistance threats in the United States; tech. rep.; (2019). Overuse and misuse of antimicrobials, including antibiotics, has been associated with increased risk of antibacterial resistance development as well as other adverse drug events. Llor & Bjerrum, Therapeutic advances in drug safety, 5, 229-241 (2014). As the prevalence of antibiotic resistant bacteria continuously increases and development of new therapeutics remains stagnant, there is a critical need for new strategies and technologies for infection control. See Bryan-Wilson, J. No time to wait; tech. rep. 10; 2016, pp 113-114; Aslam et al., Infection and Drug Resistance, 11, 1645-1658 (2018).

One of the major causes of resistance are β-lactamase (βLs), bacterial enzymes that hydrolyze the β-lactam ring present in highly prescribed antibiotics, including penicillins and cephalosporins, inactivating them.

The invention provides hydrogels that degrade specifically in the presence of β-lactamase and β-lactamase-producing bacteria to provide a platform for bacteria-triggered drug delivery, with the aim of limiting unnecessary exposure to antibacterial agents.

The invention demonstrates a new strategy to prepare smart hydrogels with dual molecular association and degradation functions. These materials may have utility in applications of bacteria-responsive materials, including infection diagnostics and therapeutics, that require the use of durable materials in a range of environments, where self-healing will be highly desirable. Furthermore, this approach can be adapted to develop self-healing "host-guest" materials that are responsive to other enzymes, expanding the potential of these supramolecular hydrogels for different applications.

Thus, these materials are useful in applications involving bacteria-triggered degradation.

Definitions

For convenience, the meaning of some terms and phrases used in the specification, examples, and appended claims, are listed below. Unless stated otherwise or implicit from context, these terms and phrases have the meanings below. These definitions are to aid in describing particular embodiments and are not intended to limit the claimed invention. Unless otherwise defined, all technical and scientific terms have the same meaning as commonly understood by one of ordinary skill in the art to which this invention belongs. A term's meaning provided in this specification shall prevail if any apparent discrepancy arises between the meaning of a definition provided in this specification and the term's use in the art.

"Comprises" and "comprising" refer to elements, components, or steps in a non-exclusive manner, indicating that the referenced elements, components, or steps may be present, used, or combined with other elements, components, or steps. The singular terms "a," "an," and "the" include plural referents unless context indicates otherwise. Similarly, the inclusive term "or" should cover the term "and" unless the context indicates otherwise. The abbreviation "e.g." means a non-limiting example and is synonymous with the term "for example."

"β-lactamases" (βLs) have the biochemical art-understood meaning of bacterial enzymes that are the most common cause of resistance to these antibiotics. βLs hydrolyze the β-lactam ring and cause subsequent deactivation of antibiotics, such as penicillins, cephalosporins, monobactams, and carbapenems. Drawz & Bonomo, Three decades of beta-lactamase inhibitors. Clinical Microbiology Reviews, 23, 160-201 (2010).

"Supramolecular hydrogel" has the biochemical art meaning of hydrogels held together by non-covalent interactions such as electrostatics, hydrogen bonding, and hydrophobic forces are among the most promising soft material platforms for modern biomedical applications. Because of their inherent reversibility and dynamism, they respond well to environmental stimuli and biochemical cues and can dissipate mechanical energy effectively. These important features are well suited for cell culture, tissue engineering, on-demand controlled release of therapeutics, tissue adhesion, and molecular sensing and as artificial gel substitutes in organs that are not easily achieved by permanently cross-linked covalent hydrogels.

"Host-guest interaction" has the biochemical art meaning of a host molecule forming a chemical compound with a guest molecule or ion. The two components of the compound are held together by non-covalent forces, most commonly by hydrogen-bonding. Binding between host and guest is usually highly specific to the two moieties concerned.

"Self-healing" has the biochemical art meaning of the spontaneous formation of new bonds when old bonds are broken within a material. The structure of the hydrogel along with electrostatic attraction forces drive new bond formation through reconstructive covalent dangling side chain or non-covalent hydrogen bonding.

"Enzymatic responsiveness" has the biochemical art meaning of a material that changes in response to the chemical activity of an enzyme.

"Bacteria-responsive materials" has the biochemical art meaning of a material that responds to the presence of or the chemical activity (such as the enzymic activity) of some bacteria.

Guidance from the Prior Art

A person of ordinary skill in the biochemical art can use these patents, patent applications, and scientific references as guidance to predictable results when making and using the invention:

European patent EP2285381B1 (General Hospital Corp.). Photoactivatable beta-lactamase substrates and analytical methods of using same. The invention provides photosensitizer compounds for use in detecting beta-lactamase activity. Methods and kits that use the photosensitizer compounds of the invention for the detection of, quantitation of, and classification or typing of microbial beta-lactamases are described.

Aimetti et al., Biomaterials, 30, 6048-6054 (2009).

Alamdamejad et al., Synthesis and characterization of thiolated carboxymethyl chitosan-graft-cyclodextrin nanoparticles as a drug delivery vehicle for albendazole. J. Mater. Sci.: Mater. Med., 24, 1939-1949 (2013).

Albright et al., Acta Biomaterialia, 61, 66-74 (2017).

Alkekhia & Shukla, Journal of Biomedical Materials Research—Part A 2019, 107, 1324-1339.

Aslam et al., Infection and Drug Resistance, 11, 1645-1658 (2018).

Bedar, A et al., Polysulfone-ceria mixed-matrix membrane with enhanced radiation resistance behavior. ACS Appl. Polym. Mater., 1, 1854-1865 (2019).

Bin Ihsan et al., Self-healing behaviors of tough polyampholyte hydrogels. Macromolecules, 49, 4245-4252 (2016).

Boateng et al., Wound healing dressings and drug delivery systems: A review (2008).

Bonenfant et al., UV-VIS and FTIR spectroscopic analyses of inclusion complexes of nonylphenol and nonylphenol ethoxylate with beta-cyclodextrin. Water Res., 43, 3575-3581 (2009).

Bottone, Bacillus cereus, a volatile human pathogen. Clin. Microbial. Rev., 23, 382 (2010).

Bryan-Wilson, J. No time to wait; tech. rep. 10, 113-114 (2016).

Bush & Bradford, Cold Spring Harbor Perspectives in Medicine, 6, a025247 (2016).

Bush, Antimicrobial Agents and Chemotherapy, 62, 01076-18 (2018).

Cado et al. Advanced Functional Materials, 23, 4801-4809 (2013).

Caló & Khutoryanskiy, European Polymer Journal 2015, 65, 252-267.

Canal & Peppas, Journal of Biomedical Materials Research, 23, 1183-1193 (1989).

Canaparo et al., Recent developments in antibacterial therapy: Focus on stimuli-responsive drug-delivery systems and therapeutic nanoparticles (2019).

Cars et al., Lancet 2001, 357, 1851-1853.

Centers for Disease Control and Prevention, Antibiotic resistance threats in the United States; tech. rep. (2019).

Chan et al., Unique fluorescent imaging probe for bacterial surface localization and resistant enzyme imaging. ACS Chemical Biology, 13, 1890-1896 (2018). This publication discloses the synthesis of β-lactam compound core, which one of ordinary skill in the biochemical art can also synthesize from ACLE and 4-aminothiophenol as an intermediate in the synthesis of the lactamase cleavable compounds or crosslinkers.

Chan et al., Unique fluorescent imaging probe for bacterial surface localization and resistant enzyme imaging. ACS Chemical Biology, 13, 1890-1896 (2018).

Chen et al., Analytical Chemistry, 88, 5605-5609 (2016).

Chen et al., beta-cyclodextrin-based inclusion complexation bridged biodegradable self-assembly macromolecular micelle for the delivery of paclitaxel. Plos One, 11 (2016).

Chen et al., Supramolecular hydrogels cross-linked by pre-assembled host-guest PEG cross-linkers resist excessive, ultrafast, and non-resting cyclic compression. NPG Asia Mat., 10, 788-799 (2018).

Cheng et al., Angewandte Chemie—International Edition, 53, 9360-9364 (2014).

Cheng et al., Science Translational Medicine, 10, eaar4470 (2018).

Cruise et al., Biomaterials, 19, 1287-1294 (1998).

Crupi et al., UV-VIS and FTIR-ATR spectroscopic techniques to study the inclusion complexes of genistein with beta-cyclodextrins. J. Pharm. Biomed. Anal., 44, 110-117 (2007).

da Silva et al., Annual Review of Biomedical Engineering, 21, 145-169 (2019).

Darling et al., Biomaterials, 101, 199-206 (2016).

Davin-Regli & Pages, Enterobacter aerogenes and Enterobacter cloacae; Versatile bacterial pathogens confronting antibiotic treatment. Frontiers in Microbiology, 6 (2015).

de Vries et al., Molecular recognition and immobilization of ligand-conjugated redox-responsive polymer nanocontainers. ACS Appl. Mater. Interfaces, 9, 41760-41766 (2017).

del Prado et al., Plant oil-based supramolecular polymer networks and composites for debonding-on-demand adhesives. ACS Appl. Polym. Mater., 1, 1399-1409 (2019).

Deng et al., Multifunctional stimuli-responsive hydrogels with self-healing, high conductivity, and rapid recovery through host-guest interactions. Chem. Mat., 30, 1729-1742 (2018).

Diener et al., Infection and Immunity, 7, 212-217 (1973).

Dissemond et al., Hautarzt, 54, 959-965 (October 2003).

Drawz & Bonomo, Three decades of beta-lactamase inhibitors. Clinical Microbiology Reviews, 23, 160-201 (2010). This publication discloses the synthesis of β-lactam compound core, which one of ordinary skill in the biochemical art can also synthesize from ACLE and 4-aminothiophenol as an intermediate in the synthesis of the lactamase cleavable compounds or crosslinkers.

duBose et al., Journal of Biomedical Materials Research—Part A, 74, 104-116 (2005).

Evans et al., Journal of Medicinal Chemistry, 62, 4411-4425 (2019).

Francesko et al., Acta Biomaterialia, 33, 203-212 (2016).

Garcia, Annals of Biomedical Engineering, 42, 312-322 (2014).

Gates & Shukla, Layer-by-layer assembly of readily detachable chitosan and poly(acrylic acid) polyelectrolyte multilayer films. J. Polym. Sci. Pol. Phys., 55, 127-131 (2017).

Han & Yan, Supramolecular hydrogel of chitosan in the presence of graphene oxide nanosheets as 2D crosslinkers. ACS Sustain. Chem. Eng., 2, 296-300 (2014).

Harada et al., Macroscopic self-assembly through molecular recognition. Nat. Chem., 3, 34-37 (2011).

Hauptstein et al., Supramolecular threading of peptide hydrogel fibrils. ACS Biomater. Sci. Eng., 4, 2733-2738 (2018).

Homing et al., Dynamic mechano-regulation of myoblast cells on supramolecular hydrogels cross-linked by reversible host-guest interactions. Sci. Rep., 8, Article number: 7660 (2018).

Hu et al., Cyclodextrin-based host-guest supramolecular nanoparticles for delivery: From design to applications. ACS Chem. Res, 47, 2017-2025 (2014).

Hu et al., Multistimuli-responsive intrinsic self-healing epoxy resin constructed by host-guest interactions. Macromolecules, 51, 5294-5303 (2018).

Jansen et al., Acta Biomaterialia, 70, 120-128 (2018).

Jeong et al., Triple-crosslinked beta-cyclodextrin oligomer self-healing hydrogel showing high mechanical strength, enhanced stability and pH responsiveness. Carbohydrate Polym., 198, 563-574 (2018).

Jia et al., $CO_2$-switchable self-healing host guest hydrogels. Macromolecules, 50, 9696-9701 (2017).

Jiao et al., Rigid and strong thermoresponsive shape memory hydrogels transformed from poly(vinylpyrrolidone-co-acryloxy acetophenone) organogels. ACS Appl. Mater. Interfaces, 1 32707-32716 (2018).

Johnson et al., Proceedings of the National Academy of Sciences of the United States of America, 115, E4960-E4969 (2018).

Kakuta et al., Preorganized hydrogel: Self-healing properties of supramolecular hydrogels formed by polymerization of host-guest-monomers that contain cyclodextrins and hydrophobic guest groups. Adv. Mater., 25, 2849-2853 (2013).

Kamaly et al., Chemical Reviews, 116, 2602-2663 (2016).

Kang et al., Reactive oxygen species and glutathione dual redox-responsive supramolecular assemblies with controllable release capability. ACS Appl. Mater. Interfaces, 9, 4475-4484 (2017).

Khan et al., BMC Microbiology, 14, 84 (2014).

Koetting et al., Materials Science and Engineering R: Reports, 93, 1-49 (2015).

Kong et al., Proceedings of the National Academy of Sciences of the United States of America, 107, 12239-12244 (2010).

Kostecki et al., Control of molecular recognition via modulation of the nanoenvironment. ACS Appl. Mater. Interfaces, 10, 41866-41870 (2018).

Lau et al., Infection and Immunity, 72, 4275-4278 (2004).

Lau et al., Trends in Molecular Medicine, 10, 599-606 (2004).

Lee et al., Clinical implications of cefazolin inoculum effect and beta-lactamase type on methicillin-susceptible Staphylococcus aureus bacteremia. Microb. Drug Resist., 20, 568-574 (2014).

Li et al., Enzyme-responsive polymeric vesicles for bacterial-strain-selective delivery of antimicrobial agents. Angew. Chemie Int. Ed., 55, 1760-1764 (2016). This publication discloses the synthesis of β-lactam compound core, which one of ordinary skill in the biochemical art can also synthesize from ACLE and 4-aminothiophenol as an intermediate in the synthesis of the lactamase cleavable compounds or crosslinkers.

Li et al., Recent developments in smart antibacterial surfaces to inhibit biofilm formation and bacterial infections. (2018).

Lin & Anseth, Pharmaceutical Research, 26, 631-643 (2009).

Lin & Metters, Advanced Drug Delivery Reviews, 58, 1379-1408 (2006).

Lin et al., One-pot synthesis of a double-network hydrogel electrolyte with extraordinarily excellent mechanical properties for a highly compressible and bendable flexible supercapacitor. ACS Appl. Mater. Interfaces, 10, 29684-29693 (2018).

Liu et al., Journal of Medicinal Chemistry, 61, 3845-3854 (2018).

Livermore, Clinical Microbiology Reviews, 8, 557-584 (1995).

Llor & Bjerrum, Therapeutic advances in drug safety, 5, 229-241 (2014).

Lutolf & Hubbell, Biomacromolecules, 4, 713-722 (2003).

Lutolf et al., Advanced Materials 2003, 15, 888-892.

Lutolf et al., Bioconjugate Chemistry, 12, 1051-1056 (2001).

Lutolf et al., Proceedings of the National Academy of Sciences of the United States of America, 100, 5413-5418 (2003).

Ma et al., Self-healing pH-sensitive poly[(methyl vinyl ether)-alt-(maleic acid)]-based supramolecular hydrogels formed by inclusion complexation between cyclodextrin and adamantane. Mat. Sci. Eng. C-Mater., 73, 357-365 (2017).

Macdougall et al., Biomacromolecules 2018, 19, 1378-1388.

Monteiro et al., Spray-assisted layer-by-layer assembly on hyaluronic acid scaffolds for skin tissue engineering. J. Biomed. Mater. Res. A, 103, 330-340 (2015).

Morandi et al., Nanomolar inhibitors of AmpC beta-lactamase. J. Am. Chem. Soc., 125, 685-695 (2003).

Nuttelman et al., Progress in Polymer Science (Oxford), 33, 167-179 (2008).

Nwomeh et al., Journal of Surgical Research, 81, 189-195 (1999).

Oefner et al., Nature, 343, 284-288 (1990).

Olives et al., PLoS ONE, 7 (2012), ed. by Kaufmann, G. F., e44326.

Page & Proctor, Journal of the American Chemical Society, 106, 3820-3825 (1984).

Paolino et al., Cyclodextrin-adamantane host-guest interactions on the surface of biocompatible adamantyl-modified glycodendrimers. Macromolecules, 46, 3215-3227 (2013).

Perez-lnestrosa et al., Cephalosporin chemical reactivity and its immunological implications. Curr. Opin. Allergy. Cl., 5, 323-330 (2005).

Perez-lnestrosa et al., Current Opinion in Allergy and Clinical Immunology, 5, 323-330 (2005).

Phelps et al., J. Advanced Materials, 24, 64-70 (2012).

Pornpattananangkul et al., Journal of the American Chemical Society, 133, 4132-4139 (2011).

Qin et al., Supramolecular interfacial polymerization of miscible monomers: fabricating supramolecular polymers with tailor-made structures. Macromolecules, 51, 1620-1625 (2018).

Rajbanshi et al., Study to probe subsistence of host-guest inclusion complexes of alpha and beta-cyclodextrins with biologically potent drugs for safety regulatory dischargement. Sci. Rep., 8, Article number: 13031 (2018).

Schaudinn et al., PLoS ONE, 12 (2017), ed. by Dague, E., e0186946.

Shao & Xing, Enzyme responsive luminescent ruthenium (II) cephalosporin probe for intracellular imaging and photoinactivation of antibiotics resistant bacteria. Chem. Commun., 48, 1739-1741 (2012).

Sheybani & Shukla, Highly sensitive label-free dual sensor array for rapid detection of wound bacteria. Biosens. Bioelectron, 92, 425-433 (2017).

Shukla & Shukla, Tunable antibiotic delivery from gellan hydrogels. J. Mater. Chem. B, 6, 6444-6458 (2018).

Shukla et al., Biomimetic surface patterning promotes mesenchymal stem cell differentiation. ACS Appl. Mater. Interfaces, 8, 21883-21892 (2016).

Smith, Antimicrobial Agents and Chemotherapy, 35, 237-241 (1991).

van Berkel et al., Assay Platform for clinically relevant metallo-beta-lactamases. J. Med. Chem., 56, 6945-6953 (2013).

van Dijk et al., Biomacromolecules, 11, 1608-1614 (2010).

Wang et al., A rapidly self-healing host-guest supramolecular hydrogel with high mechanical strength and excellent biocompatibility. Angew. Chem. Int. Ed., 57, 9008-9012 (2018).

Wei et al., Copillar[5]arene-based supramolecular polymer gel: controlling stimuli-response properties through a novel strategy with surfactant. Rsc Adv. 2015, 5, 60273-60278.

Wilke et al., β-lactam antibiotic resistance: A current structural perspective. (2005).

Xiao et al., Colloids and Surfaces B: Biointerfaces, 192, 110989 (2020).

Xiao et al., Dynamic hydrogels mediated by macrocyclic host-guest interactions. J. Mater. Chem. B, 7, 1526-1540 (2019).

Xiao et al., Novel fluorescent cephalosporins: Synthesis, antimicrobial activity and photodynamic inactivation of antibiotic resistant bacteria. Eur. J. Med. Chem., 59, 150-159 (2013).

Xie et al., Nature Chemistry, 4, 802-809 (2012).

Xiong et al., Advanced Materials, 24, 6175-6180 (2012).

Xiong et al., Journal of the American Chemical Society, 134, 4355-4362 (2012).

Yan et al., Quadruple H-bonding cross-linked supramolecular polymeric materials as substrates for stretchable, antitearing, and self-healable thin film electrodes. J. Am. Chem. Soc., 140, 5280-5289 (2018).

Yang & Yuan, Highly stretchable and transparent double-network hydrogel ionic conductors as flexible thermal-mechanical dual sensors and electroluminescent devices. ACS Appl. Mater. Interfaces, 11, 16765-16775 (2019).

Yang et al., Using beta-lactamase to trigger supra molecular hydrogelation. Journal of the American Chemical Society, 129, 266-267 (2007). This publication discloses the synthesis of β-lactam compound core, which one of ordinary skill in the biochemical art can also synthesize from ACLE and 4-aminothiophenol as an intermediate in the synthesis of the lactamase cleavable compounds or cross-linkers.

Yang et al., Wound Repair and Regeneration, 21, 704-714 (2013).

Yao et al., Platinum-incorporating poly(n-vinylpyrrolidone)-poly(aspartic acid) pseudo block copolymer nanoparticles for drug delivery. Biomacromolecules, 16, 2059-2071 (2015).

Yepuri et al., Chemical Communications, 49, 4791-4793 (2013).

Yepuri et al., Synthesis of cephalosporin-3'-diazeniumdiolates: biofilm dispersing NO-donor prodrugs activated by beta-lactamase. Chem. Commun., 49, 4791-4793 (2013).

Yu et al., ACS Applied Polymer Materials, 2, 55-65 (2020).

Yu et al., Facile access to versatile hydrogels via interface-directed frontal polymerization derived from the magnetocaloric effect. J. Mater. Chem. A 2015, 3, 17351-17358.

Yu et al., Robust self-healing host-guest gels from magnetocaloric radical polymerization. Adv. Funct. Mater., 24, 1235-1242 (2014).

Yu et al., Simultaneous covalent and noncovalent hybrid polymerizations. Science, 351, 497-502 (2016).

Zhang & Hao, The FASEB Journal, 25, 2574-2582 (2011).

Zhang et al., Antimicrobial metallopolymers and their bioconjugates with conventional antibiotics against multi-drug-resistant bacteria. J. Am. Chem. Soc., 136, 4873-4876 (2014).

Zhang et al., Autonomous chitosan-based self-healing hydrogel formed through noncovalent interactions. ACS Appl. Polym. Mater., 1, 1769-1777 (2019).

Zheng et al., Exploiting a bacterial drug-resistance mechanism: A light-activated construct for the destruction of MRSA. Angew. Chemie Int. Ed., 48, 2148-2151 (2009).

Zhu, Biomaterials, 31, 4639-4656 (2010).

Zhuk et al., ACS nano, 7733-7745 (2014).

Guidance from Materials and Methods

A person of ordinary skill in the biochemical art can use these materials and methods as guidance to predictable results when making and using the invention:

Materials. Acrylamide (AAm), N-vinylpyrrolidinone (NVP), N,N'-methylenebisacrylamide (M BAA), ammonium persulfate (APS), adamantanecarbonyl chloride (AD-Cl), N,N-dimethylformamide (DMF), anhydrous dichloromethane (DCM), ethyl acetate (EtAc), hexane, triethylamine (TEA), 4-methylmorpholine (NMM), 4-aminothiophenol (ATP), trifluoroacetic acid (TFA), anhydrous magnesium sulfate ($MgSO_4$), β-lactamase from *Bacillus cereus* (BC-βL), β-lactamase from *Enterobacter cloacae* (EC-βL), and Dulbecco's phosphate-buffered saline (1× phosphate-buffered saline (PBS), pH 7.4) were purchased from Millipore Sigma (Billerica, MA, USA) and used without any further purification. 7-Amino-3-chloromethyl-3-cephem-4-carboxylic acid p-methoxybenzyl ester hydrochloride (ACLE) was obtained from AK Scientific (Union City, CA, USA). Soluble carboxymethyl-β-cyclodextrin polymer (PCD) was purchased from Cyclolab (Budapest, Hungary) and used after being dialyzed in Spectra/Por dialysis tubing (10 kDa molecular weight cut-off, metal-free) from Spectrum Chemical (New Brunswick, NJ, USA) to remove low molecular weight polymeric cyclodextrin. Nitrocefin disks were obtained from Becton Dickinson (Franklin Lakes, NJ, USA).

DCM: dichloromethane; HATU: 1-[bis(dimethylamino) methylene]-$^1$H-1,2,3-triazolo[4,5-b]pyridinium 3-oxid hexafluorophosphate; and DIPEA: N,N-diisopropylethylamine are commercially available from Millipore Sigma (Billerica, MA, USA).

B. cereus 13061 and S. aureus 25923 were obtained from ATCC (Manassas, VA, USA). P. aeruginosa PA01 was generously donated by Walter Reed Army Institute of Research (Silver Spring, MD, USA).

Tryptic soy broth (TSB) was purchased from Fisher Scientific (Waltham, MA, USA).

Ultrapure water (18.2 MΩ·cm MilliQ, EMD Millipore, Taunton, MA, USA) was used in all experiments.

Room temperature (RT) is approximately 21° C.

Furthermore, Aminothiophenol (ATP), triethylamine (TEA), N-methylmorpholine (NMM), anhydrous dichloromethane (DCM), anhydrous dimethylformamide (DMF), hexanes, ethyl acetate (EtAc), dimethyl sulfoxide (DMSO), trifluoroacetic acid (TFA), anisole, 1-[Bis(dimethylamino) methylene]-$^1$H-1,2,3-triazolo[4,5-b]pyridinium 3-oxid hexaflu-orophosphate (HATU), N,N-disopropylethylamine (DIPEA), thin layer chromatography (TLC) Silica Gel 60 on glass plates, Luria Bertani (Lennox) Broth, β-lactamase from B. cereus (BC-βL; cat. #P0389, 28 kDa, 2817.8 U/mg protein, 4.72% protein), β-lactamase from P. aeruginosa (PA-βL; cat. #L6170, 30 kDa, 1080 U/mg protein, 1% protein), β-lactamase from E. cloacae (EC-βL; cat. #P4524, 20-26 kDa, 0.37 U/mg protein, 56.45% protein), collagenases from Clostridium histolyticum, phosphate buffered saline (PBS), calcium chloride dihydrate were acquired from Millipore Sigma (St. Louis, MO, USA). FluoSpheres carboxylate-modified microspheres (0.1 1 zm), silica gel, tryptic soy broth (TSB), agar, sodium azide (0.5% WA)), and SYLGARD 184 silicone elastomer kit were purchased from Thermo Fisher Scientific (Waltham, MA, USA). 4-arm-PEG-thiol was purchased from Laysan Bio, Inc (Arab, AL), Sigma, or JenKem (5 kDa). Bismaleimide-PEG3 (mal-PEG-mal) was purchased from Broad-Pharm (San Diego, CA). Deuterated acetone (acetone-d6) and chloroform (CDCl3) were obtained from Cambridge Isotope Laboratories (Andover, MA, USA). Staphylococcus aureus strains 25923, Bacillus cereus 13061, and Pseudomonas aeruginosa 27853 were purchased from ATCC (Manassas, VA). Ultra-high-purity nitrogen gas (99.999%; under N2) was obtained from Corp Brothers, Inc. (Providence, RI, USA).

Synthesis of quest molecule. FIG. 4(a) shows the guest molecule and the intermediates produced during the synthesis described in this specification.

Protected β-lactam core (P1) synthesis. P1, the protected β-lactam core, was synthesized following previous work. 33 ACLE (300 mg, 0.74 mmol) was added into anhydrous dichloromethane (9 mL, 0.141 mmol) and stirred at 0° C. for twenty minutes under $N_2$. Triethylamine (200 μL, 0.0014 mmol) was then added in three steps over twenty minutes. NMM (100 μL, 0.0009 mmol) and ATP (150 mg, 0.80 mmol in 1 mL of dichloromethane) were added sequentially. The resulting reaction mixture was stirred at 0° C. and 800 rpm for two hours and purified using column chromatography with 2% methanol in dichloromethane as eluent.

Adamantane-conjugated β-lactam core (AD-P1) synthesis. To conjugate adamantane to the P1, P1 (229 mg, 0.5 mmol) was first mixed with triethylamine (153 μL, 1.1 mmol) and THF (18 mL) at 0° C. under $N_2$. Adamantane-carbonyl chloride (220 mg, 1.1 mmol) was dissolved in THF (2 mL) and added dropwise into the mixture. After stirring at 0° C. for 2 hours, the reaction was left stirring overnight as the solution warmed to room temperature. The solvent was then removed under vacuum and the crude product was dissolved in dichloromethane followed by washing with water three times. The organic phases were collected and dried overnight by anhydrous $MgSO_4$. Finally, column chromatography was used to purify the product using EtAc/hexane (1:1 v/v) as eluent.

Activated quest (Ac-AD-PI) synthesis. To activate AD-P1 and render the β-lactam ring accessible by BLs, the p-methoxybenzyl protecting group must be removed. AD-P1 (129 mg, 0.17 mmol) was dissolved in anhydrous dichloromethane (40 mL). Anisole (8 mL) and trifluoroacetic acid (8 mL) were added into the stirring solution. After three hours at 0° C., the solvent was removed under reduced pressure and the compound was purified by column chromatography with a 4-to-10% v/v methanol in dichloromethane gradient as eluent.

Supramolecular hydrogel fabrication. To form the PCD-p(NVP-co-Am)/Ac-AD-P1 supramolecular hydrogels developed in this specification, polymeric cyclodextrin host and Ac-AD-P1 guest were combined in an $H_2O$/DMF (7:2 v/v) solution, stirring for twenty-four hours at room temperature.

To generate the copolymerized interpenetrating polymer network, the inventors introduced acrylamide, N-vinylpyrrolidinone, ammonium persulfate (initiator), and MBA (cross-linker) into the "host-guest" mixture. The composition used in the hydrogels was acrylamide/N-vinylpyrrolidinone=5:3 (mol/mol), PCD=8 wt %, Ac-AD-PI=1.6 wt %1, $H_2O$=35 wt %1, DMF=10 wt %, ammonium persulfate=0.2 wt % and N,N'-methylenebisacrylamide=0.15 wt %. After all the reagents were added and mixed homogenously, the final mixture was poured into cylinder molds (4.2 mm diameter, ~20 mm height) and placed at 35° C. without stirring, allowing free-radical polymerization to proceed and the hydrogels to set over twelve hours. The resulting hydrogels were thoroughly rinsed with water prior to use.

Variations of these hydrogels lacking certain components (e.g., the host or the interpenetrating polymer network) were formulated similarly with the required omission of components.

Characterizing synthesis products. Proton nuclear magnetic resonance ($^1$H NMR) spectroscopy, Fourier transform infrared spectroscopy (FTIR) and high-resolution mass spectra (HRMS) measurements were carried out to examine all of the synthesis products. HRMS were obtained with an Agilent Technologies 6530 Accurate-Mass Q-TOF mass spectrometer. Mass range 200-2000 m/z was used for high-resolution mode. NMR spectra were recorded using a Bruker Avance III Ultra-Shield Spectrometer (400 MHz for $^1$H) at 23° C. Chemical shifts are reported in ppm relative to the residual solvent signal (DMSO-d6: 2.50 ppm), coupling constants (J) are reported in Hz. A Bruker Alpha FTIR with platinum/diamond-ATR sampling module was used to collect measurements at room temperature. In all cases, thirty-two scans at a resolution of 4 cm$^{-1}$ were used to record spectra.

Self-healing behavior of supramolecular hydrogels. The self-healing behavior of the supramolecular hydrogels was examined by first severing a hydrogel sample in half using a razor blade. The two severed components were then pressed together for ten minutes and then left to self-heal for twenty-four hours at room temperature without any external stimuli. Finally, tensile tests were carried out to compare hydrogels as made and those that had undergone the self-healing process. The tensile strength of cylindrical supramolecular hydrogels (4 mm diameter) with an initial length of 15 mm was tested on an Instron Series 5942 Universal Testing System (Norwood, MA, USA). The samples were stretched at a rate of 5 mm/min while measuring the force with a 500 N load cell. The true stress and true strain were evaluated from the measured engineering stress and known engineering strain values. The slope of the initial linear portion of the true stress-true strain curve was taken as the tensile modulus.

Enzymatic degradation of supramolecular hydrogels. The enzymatic responsiveness of supramolecular hydrogels was examined using β-lactamases from $B.$ $cereus$ (BC-βL) and from $E.$ $cloacae$ (EC-βL). β-lactamase solutions were made up in 1× phosphate-buffered saline at 100 and 1 units (U)/mL for BC-βL and EC-βL, respectively (1 U hydrolyzes 1 μmol benzylpenicillin per minute at pH 7.0 at room temperature). Hydrogels were cut into several cubes (~50 mg) after reaching their swelling equilibrium in 1× phosphate-buffered saline. These hydrogel cubes were transferred to a 12-well plate (one cube per well) and incubated with BC-βL, EC-βL, or 1× phosphate-buffered saline (pH 7.4) shaking at 100 rpm at 37° C. Enzymatic degradation was monitored at the macroscale. Imaging via digital camera was utilized to track gross changes, and wet mass changes were quantified over time.

For hydrogel mass measurements, an initial mass was recorded (Mo) after the samples reached their swelling equilibrium. At predetermined timepoints, the hydrogels were removed, excess solution was gently blotted, and the hydrogels were weighed (Mt) and returned to the incubation medium. Percent wet mass remaining was calculated using equation (1).

$$\text{Wet Mass (\%)} = Mt/Mo \times 100\% \tag{1}$$

Bacteria-responsiveness of supramolecular hydrogels. Supramolecular hydrogels were incubated in cultures of β-lactamase-producing bacteria ($B.$ $cereus$ 13061 and $P.$ $aeruginosa$ PA01) and non-β-lactamase producing bacteria ($S.$ $aureus$ 25923) to assess the β-lactamase-responsive behavior of the hydrogels. Firstly, β-lactamase production or lack of production by these bacterial strains was confirmed using nitrocefin disks. Bacteria were cultured in tryptic soy broth for sixteen-eighteen hours at 37° C., then diluted 1:1000 v/v, and grown to mid-exponential growth phase. They were then diluted to a final concentration of $1 \times 10^7$ colony forming units (CFU)/mL. The hydrogels were sterilized under ultraviolet light in a Nuaire Class II Type A2 biosafety cabinet for thirty minutes, and then incubated in a 12-well plate with three mL of bacteria suspension rocking at 100 rpm at 37° C. Macroscopic changes of the hydrogels were monitored daily by digital camera imaging over three days.

Instrumentation. $^1$H-NMR was recorded on a Bruker DRX Avance 400 MHz spectrometer and reported with chemical shifts stated as δ in units of parts per million (ppm) relative to CDCl3 (7.26 ppm) or acetone-d6 (2.05 ppm). High resolution mass spectrometry (HRMS) electrospray ionization (ESI) was conducted on an Agilent 6530 liquid chromatography (LC)-MS. Fluorescent spectroscopy were performed using a BioTek® Cytation 3 microplate reader (Winooski, VT, USA), using 96-well black plates (Thermo Fisher Scientific, Waltham, MA, USA). Confocal images of fluorescent nanoparticles in swollen hydrogels were taken using a Nikon Eclipse Ti-A1R (Tokyo, Japan) equipped with a water immersion objective (25×, NA 1.1, WD 2 mm), a 561 nm laser, 570-620 nm filter, and NIS Elements software.

Synthesis and characterization of β-lactamase-responsive crosslinker, mal-β-lactam-mal. Synthesis of compound 1. The core of the β-lactamase-responsive crosslinker was synthesized similarly to Zheng et al., Angewandte Chemie—International Edition, 48, 2148-2151 (2009). ACLE (600 mg, 1.48 mmol) was dissolved in anhydrous DCM (20 mL) and stirred on ice under $N_2$. TEA (400 1 zL, 2.8 mmol) was slowly added in three portions over a 20-minute time period to the ACLE mixture. NMM (200 1 zL, 1.8 mmol) and ATP (300 mg, 2.4 mmol) were added sequentially thereafter.

The reaction was stirred on ice and monitored by TLC (30% EtAc/70% DCM). After one hour, the solvent was evaporated in vacuo, and the product was purified using column chromatography (silica gel, 20% to 80% gradient EtAC in DCM as eluent) to yield compound 1 as a white product (440 mg, 0.96 mmol, 65% yield). HRMS-ESI: Calculated for $C_{22}H_{23}N_3O_4S_2$ [M+H]: 458.1129; Found: 458.1199. $^1$H-NMR (400 MHz, CDCl3) δ (ppm): 7.31 (d, J=8.5, $^2$H), 7.15 (d, J=8.5, $^2$H), 6.88 (d, J=8.5, $^2$H), 6.52 (d, J=8.6, $^2$H), 5.10-4.94 (dd, J1=11.9 Hz, J2=43.1 Hz, $^2$H), 4.83 (d, J=4.9, $^1$H), 4.65 (d, J=4.9, $^1$H), 4.19-3.51 (dd, J1=13.3 Hz, J2=245.2 Hz, $^2$H), 3.80 (s, 3H), 3.72-3.27 (dd, J1=17.9 Hz, J2=143.8 Hz, $^2$H).

Synthesis of protected mal-β-lactam-mal, Compound 2. Compound 1 (100 mg, 0.22 mmol), 3-maleimidopropionic acid (130 mg, 0.76 mmol) and HATU (350 mg, 0.92 mmol) were dissolved in anhydrous DMF (3 mL). The mixture was stirred for fifteen minutes under $N_2$ at room temperature before adding DIPEA (227 1 zL, 1.3 mmol), then the reaction was allowed to proceed for another seventy-five minutes and was monitored by thin-layer chromatography (80% EtAc in DCM). The crude reaction was transferred to a separatory funnel and partitioned between DCM and water to separate the layers. The DCM fraction was washed again twice with water and once with brine, before it was dried over sodium sulfate, filtered, and concentrated in vacuo. The product was purified by flash chromatography (silica gel, 40-80% EtAc in DCM gradient) to afford a faint yellow product (132 mg, 0.17 mmol, 80% yield). HRMS-ESI: calculated for C36H33N5O10S2 [M+H]: 760.1678; Found: 760.1746. $^1$H-NMR (400 MHz, acetone-d6) 6 (ppm): 9.34 (s, $^1$H), 8.02 (d, J=8.5, $^1$H), 7.59 (d, J=8.7, $^2$H), 7.35-7.28 (dd, J1=8.6 Hz, J1=12.7 Hz, 4H), 6.91 (d, J=8.7, $^2$H), 6.85 (d, J=5.5, 4H), 5.71-5.66 (dd, J1=4.7 Hz, J2=Hz, 1H), 5.06-4.88 (dd, J1=12.0 Hz, J2=49.2 Hz, $^2$H), 5.03 (d, J=4.8, $^1$H), 4.29 (d, J=13.3 Hz, $^1$H), 3.86-3.72 (m, 9H), 3.51 (d, J=17.8 Hz, $^1$H), 2.71-2.60 (m, $^4$H).

Synthesis of mal-β-lactam-mal crosslinker. Compound 2 (125 mg, 0.16 mmol) was deprotected in a solution of TFA:anisole:DCM (forty-two mL total) at a 1:1:5 volumetric ratio under $N_2$ on ice for 1.5 hours and monitored by thin-layer chromatography (100% EtAc). Solvents were evaporated under reduced pressure. The deprotected crosslinker was dissolved in acetone and then precipitated in cold diethyl ether (8× volume) three times (centrifuged at 5,000 rpm for ten minutes at 4° C.) (57 mg, 0.09 mmol, 54% yield). HRMS-ESI: Calculated for $C_{28}H_{25}N_5O_9S_2$ [M+H]: 640.1083; Found: 640.1152. $^1$H-NMR (400 MHz, acetone-d6) 6 (ppm): 9.34 (s, $^1$H), 8.02 (d, J=8.5, $^1$H), 7.57 (d, J=8.6, $^2$H), 7.37 (d, J=8.6, $^2$H), 6.85 (d, J=5, $^4$H), 5.71-5.66 (dd, J1=4.7 Hz, J2=9 Hz, $^1$H), 5.03 (d, J=4.8, $^1$H), 4.28-3.89 (dd, J1=13.3 Hz, J2=136.6 Hz, $^2$H), 3.84-3.69 (m, 5H), 3.51 (d, J=17.7 Hz, $^1$H), 2.70-2.61 (m, $^4$H).

Hydrogel formation. The β-lactamase-degradable or non-degradable crosslinkers, mal-β-lactam-mal (639.11 Da) and mal-PEG-mal (494.5 Da), respectively, were dissolved in DMSO (4× concentration). 4-arm-PEG-thiol (20 kDa) was dissolved in 1×PBS pH 7 or in 0.1×PBS pH 4 (1.33× concentration) for responsive or non-responsive hydrogels, respectively. These buffer concentrations and pH values were chosen to achieve similar gelation times between the two types of hydrogels. The increase in volume due to the presence of PEG was considered. For loaded hydrogels, 100 nm carboxylate coated fluorescent polystyrene nanoparticles were briefly sonicated, vortexed, then added to the pre-gelation PEG solution at a final w/v concentration of 0.08% (1:20 dilution from stock solution), which is equivalent to approximately 135×10$^{10}$ nanoparticles/mL or ~6.75×10$^{10}$ nanoparticles per gel. Hydrogels were formed by mixing the crosslinker and PEG at 1:1 maleimide:thiol stoichiometric ratio with the resulting gel containing 25% w/w DMSO in PBS. PEG solutions were cooled on ice to aid in slowing the reaction initially and allow adequate mixing before transfer to the mold to increase uniformity of the hydrogels. The mixture was quickly vortexed and 50 1 zL was transferred into a 5 mm circular PDMS mold. Gelation occurred within minutes, but the solutions were left for 1.5 hours at 37° C. to ensure complete gelation. Hydrogels were swollen in 2 mL of 1×PBS (pH 7.4) shaking (100 rpm) at 37° C. overnight to ensure removal of DMSO and any surface bound nanoparticles, and to achieve equilibrium swelling before hydrogels were used in experiments.

Hydrogel equilibrium swelling and mesh size estimation. After hydrogels were formed, they were weighed as-made. The hydrogels were then swollen by incubation in two mL of 1×PBS pH 7.4 at 37° C. with shaking (100 rpm) for forty-eight hours, then pat dried and their wet mass was measured (Ww). The swollen gels were dried under vacuum at room temperature for three days, and the dry mass was weighed (Wd). The swelling ratio (Qs) was calculated using Equation (2). The swelling ratio was used to estimate the average mesh size using the Peppas-Miller expression based on the Flory-Rehner theory (see Canal & Peppas, Journal of Biomedical Materials Research, 23, 1183-1193 (1989)).

$$\Theta_s = \Omega_w - \Omega_d / \Omega_d \qquad (2)$$

Hydrogel degradation by βL enzymes and nanoparticle release. Swollen hydrogels were incubated with one mL of β-lactamase in 24-well plates shaking (100 rpm) at 37° C. For all β-lactamases tested, activity was reported by the vendor and one unit (U) was defined as hydrolyzing 1.0 1 zmole of benzylpenicillin per min at pH 7.0 at 25° C. At predetermined time points, hydrogels were removed from the solution, placed onto kimwipes to pat dry excess solution, then weighed. Simultaneously, 150 1 zL of the incubation solution was removed and fluorescence (excitation 580 nm, emission 607 nm) was measured to quantify the concentration of released nanoparticles. The solution was placed back into the incubation wells for continued degradation and release. Standard curves of the nanoparticles in PBS were produced to determine the concentration of nanoparticle released into the enzyme incubation solutions.

Hydrogel incubation with collagenases. To test non-specific degradation of hydrogels by collagenases, the inventors set up an experiment similar to the incubation with β-lactamase as described in this specification. However, 1 mM of calcium chloride (needed for collagenase activity) and 0.02% w/v sodium azide (to prevent bacteria growth during the longer experiment) were added to the 1×PBS, and the enzyme solutions were refreshed every 24 hours over the course of 1 week.

Hydrogel degradation by bacteria. Response of hydrogels was tested when incubated with β-lactamase-producing (*B. cereus* 13061 and *P. aeruginosa* 27853) and non-β-lactamase-producing (*S. aureus* 25923) bacterial strains. For all assays, swollen responsive and non-responsive hydrogels were sterilized via exposure to ultraviolet light in a Nuaire Class II Type A2 biosafety cabinet for fifteen minutes.

In solution. To test hydrogel degradation by bacteria in solution, nanoparticle loaded hydrogels were placed in 12-well plates and three mL of 1×10 colony forming units (CFU)/mL bacteria in tryptic soy broth (TSB) was added. Controls included solutions of bacteria only, media only, and hydrogels incubated in media only. Over time, digital images of the hydrogels in the wells were taken from the bottom of the plate, and subsequently 100 μL of the solution was removed and the fluorescence (excitation 580 nm, emission 607 nm) was measured to quantify nanoparticle release. Standard curves of the nanoparticles in TSB were produced to determine the concentration of nanoparticles in the bacterial incubation solutions. The determined concentration was multiplied by the volume of incubation solution remaining at each time point to calculate the mass of nanoparticles in the solution, and then that was normalized to the amount measured in the solutions after complete hydrogel degradation.

On agar. To test bacteria mediated degradation in a more static and dry environment, TSB agar plates were streaked three times with cotton swab dipped into a solution of 1×10$^8$ CFU/mL bacteria, then hydrogels were placed on the infected agar and incubated at 37° C. Digital images of the hydrogels were taken daily.

On ex vivo porcine skin. The inventors tested the triggered degradation of hydrogels on infected ex vivo porcine skin. Cleaned, shaved, and frozen porcine skin was purchased from a butcher. The tissue was thawed then sterilized by soaking in 70% ethanol for 30 minutes then soaked in fresh 1×PBS three times before it was streaked three times using a cotton swab dipped into a solution of 1×10 CFU/mL bacteria. The hydrogels were placed on the infected tissue and then incubated at 37° C. Digital images of the hydrogels were taken daily.

Statistical analysis. Results are reported as mean±standard deviation whenever appropriate. All experiments were repeated with at least three samples. Statistical significance was calculated using one-way and two-way analysis of variance (ANOVA; α=0.05) with Tukey's post-hoc analysis on GraphPad PRISM™ 8 (note, p<0.05 was considered statistically significant; *p<0.05, p<0.01, *p<0.001, ****p<0.0001).

Manufacture

Responsive materials, which undergo a change in material properties under specific stimuli, have been designed for different applications, such as diagnostics, tissue engineering, as well as drug delivery. Koetting et al., Materials Science and Engineering R: Reports, 93, 1-49 (2015). For antibacterial treatments, various material types have been developed to respond to external stimuli including temperature, light, and magnetic fields. Canaparo et al., Recent developments in antibacterial therapy: Focus on stimuli-responsive drug-delivery systems and therapeutic nanoparticles (2019). Alternatively, biomaterials that do not require external interference and can respond to the native bacterial microenvironment, have been explored as self-defensive systems. See Li et al., Recent developments in smart antibacterial surfaces to inhibit biofilm formation and bacterial infections. (2018); Xiao et al., Colloids and Surfaces B: Biointerfaces, 192, 110989 (2020). Among the most common examples in literature are pH responsive biomaterials that can respond to the local decrease in pH caused by various lactic and acetic acid producing bacteria. See Zhuk et al., ACS nano, 7733-7745 (2014); Albright et al., Acta Biomaterialia, 61, 66-74 (2017); and Smith, Antimicrobial Agents and Chemotherapy, 35, 237-241 (1991). There are also examples of material that respond to other triggers including bacterial toxins and enzymes, such as lipases, proteases, phosphatases and phospholipases, and hyaluronidases. Yet, some of these triggers are not necessarily bacteria specific. Acidic environments can be found in different locations in the body including uninfected wounds. Dissemond et al., Hautarzt, 54, 959-965 (October 2003). Some bacterial enzymes have mammalian analogs that cleave similar substrates, which are also typically found in wounds. β-lactamases (8Ls), on the other hand, are bacteria specific and are one of the major causes of antibiotic resistance. Bush, Antimicrobial Agents and Chemotherapy, 62, 01076-18 (2018). These enzymes, which are produced by various gram-positive and gram-negative bacteria, cleave the β-lactam ring present in antibiotics such as penicillins, cephalosporins, and carbapenems, inactivating the therapeutics. See Wilke et al., β-lactam antibiotic resistance: A current structural perspective. (2005); Zhang & Hao, The FASEB Journal, 25, 2574-2582 (2011). β-lactam antibiotics are among the most commonly prescribed antibiotics around the world. See Cars et al., Lancet 2001, 357, 1851-1853; Bush & Bradford, Cold Spring Harbor Perspectives in Medicine, 6, a025247 (2016). This underscores the importance of limiting their use, as well as the use of broad-spectrum late stage antibiotics, to preserve their efficacy.

The hydrogel of the invention remain stable at simulated physiological conditions (phosphate-buffered saline, pH 7.4, 37° C.), and degrade specifically in the presence of β-lactamases from *Bacillus cereus* and *Enterobacter cloacae* over twenty-eight to thirty-five hours.

The supramolecular "host-guest" hydrogels can advantageously regain an initial tensile modulus comparable to that of the as-formed hydrogels within ~twenty hours.

After confirming self-healing capability, tensile strength measurements were conducted to compare self-healed hydrogels and as made hydrogels, showing similar behavior for both. The stability of the hydrogels under physiological conditions was also confirmed and a comparison of the β-lactamase-triggered degradation of activated versus non-activated (i.e., access to β-lactamase recognition site on guest restricted) hydrogels was compared when incubated with β-lactamases. The full degradation of the hydrogels specifically by β-lactamase enzymes and even β-lactamase-producing bacteria, was attributed to the cleavage of the responsive guest molecule.

Method of Diagnosis

To demonstrate the enzyme-triggered degradation of the supramolecular hydrogels, the inventors developed a β-lactamase-responsive material given the biological importance of these enzymes.

Method of Treatment

An interesting characteristic of some cephalosporins is that hydrolysis of the amide bond in their β-lectern ring by β-lactamases triggers the spontaneous release of a leaving group attached at the 3'-position, if present. Page & Proctor, Journal of the American Chemical Society, 106, 3820-3825 (1984). This property has been exploited in the development of β-lactamase responsive prodrugs, such as compounds triggered by bacteria to release nitric acid or antibiotics, or to activate photosensitizers for targeted photodynamic therapy. Zheng et al., Angewandte Chemie—International Edition, 48, 2148-2151 (2009). Similar responsive compounds have also been synthesized for the detection of β-lactamase-producing bacteria utilizing luminescent ruthinium (i), fluorescent, or fluorescence resonance energy transfer based probes.38 In terms of β-lactamase responsive polymeric biomaterials, scientists have developed nanoparticles for the delivery of antibiotics and amphiphilic polymers for β-lactamase triggered hydrogelation as a detection mechanism. See Li et al., Angewandte Chemie—International Edition 2016, 55, 1760-1764; Yang et al., Journal of the American Chemical Society, 129, 266-267 (2007). This biomolecular mechanism achieves bacteria-triggered macroscopic changes in hydrogels or coatings that can be applied to larger surfaces, such as wounds or medical devices, to deliver encapsulated antibacterial agents selectively, only when an infection arises. The goal is to limit unnecessary exposure to antibiotics and to spatiotemporally localize their delivery to an infection site to improve efficacy, reduce toxicity, and potentially lower susceptibility to bacterial antibiotic resistance development. The inventors previously developed a self-healing, β-lactamase-degradable hydrogel formed via supramolecular "host-guest" interactions mediated by a β-lactamase-labile crosslinker with two adamantane moieties (guest) and polymeric cyclodextrin (host). Yu et al., ACS Applied Polymer Materials, 2, 55-65 (2020). These hydrogels were mechanically reinforced by incorporating an interpenetrating non-responsive network of acrylamide-N-vinylpyrrolidinone co-polymer, which we expect slowed down the degradation rate in response to β-lactamases. The inventors developed hydrogels that are covalently crosslinked, using only poly(ethylene glycol) (PEG) and a responsive crosslinker, anticipating a faster response to β-lactamases.

Hydrogels have been used extensively for a variety of biomedical applications, including treatment of wounds. Caló & Khutoryanskiy, European Polymer Journal 2015, 65, 252-267. Their high water content make them excellent candidates for hydrating the wound, enhancing autolytic debridement, absorbing exudate, filling deep and irregular wounds, and allowing gaseous exchange. These are all important factors for wound healing. Hydrogels can also be loaded with antibacterial agents to prevent development of infections which can delay the wound healing process and may lead to sepsis. Poly(ethylene glycol) is among the most commonly used synthetic polymers in the formulation of biomaterials, including hydrogels. Nuttelman et al., Progress in Polymer Science (Oxford), 33, 167-179 (2008). PEG-based hydrogels are inherently hydrophilic, bioinert, antiprotein fouling, and non-degradable by mammalian enzymes, with minimal toxicity and inflammation in vivo. Poly(ethylene glycol) hydrogels thus offer a blank slate for engineering dynamic biofunctionality, such as selective sensitivity to enzymes. Zhu, Biomaterials, 31, 4639-4656 (2010). The facile modification and versatility of poly(ethylene glycol) macromers has led to diversity in chemistries utilized to form hydrogels; the most common are free-radical polymerization and Michael-type addition. Nuttelman et al., Progress in Polymer Science (Oxford), 33, 167-179 (2008). The latter results in end-linking polymerization by simply mixing two components that carry reactive functional groups, providing better control over gelation and structure definition. Lin & Anseth, Pharmaceutical Research, 26, 631-643 (2009). Michael addition thiol-ene chemistry proceeds at near physiological pH and temperatures, with selective reactivity that prevents potential reaction with therapeutics loaded into the hydrogels and eliminates the need for radicals, light, or toxic crosslinkers or catalyzers, aiding in cargo preservation. Garcia, Annals of Biomedical Engineering, 42, 312-322 (2014). Studies have shown that the high efficiency of the maleimide-thiol reaction resulted in hydrogels with improved crosslinking kinetics and greater control over hydrogel mechanical properties. Scientists have rendered PEG hydrogels responsive to their environment by incorporating enzyme-cleavable moieties, most commonly peptides, into the matrix backbone. These biomaterials have been used for drug delivery (e.g., delivery of proteins) and tissue engineering applications (e.g., invasion and modulation of hydrogels by cells as their secreted enzymes cleave matrices).

Improvements

An advantage of the hydrogel of the invention is that because of the molecular association of polymeric cyclodextrin and adamantane, the supramolecular hydrogels self-heal without any external stimuli after the hydrogels are severed, while exhibiting tensile properties similar to those of the as-made hydrogels. However, the hydrogels of the invention exhibit β-lactamase-responsive degradation due to β-lactam ring hydrolysis causing cleavage of the guest molecules.

Several "host-guest" hydrogels have previously been reported that exhibit self-healing behavior that can either be triggered externally or induced internally by placing the edges of the damaged interfaces in close proximity to allow molecular association, and thus material repair. See Wang et al., Angew. Chem. Int. Ed., 57, 9008-9012 (2018); Xiao et al., J. Mater. Chem. B, 7, 1526-1540 (2019); and Jia et al., Macromolecules, 50, 9696-9701 (2017). β-cyclodextrin (β-CD) was modified with 2-isocyanatoethyl acrylate to serve as a host to form a "host-guest" monomer with a guest molecule containing an adamantane (AD) for polymerizing a supramolecular hydrogel. When the resulting hydrogel was cut, the host and guest molecules were able to rapidly recognize each other along the disrupted interface, leading to the visual self-healing of the material. See Wang et al., Angew. Chem. Int. Ed., 57, 9008-9012 (2018). Another example is the photothermally triggered healing by β-cyclodextrin-modified graphene crosslinked with acrylamidoazobenzene. The graphene converts near-infrared stimulation into thermal energy in situ to trigger "host-guest" interactions, achieving healing with high efficiency. Hu et al., Macromolecules, 51, 5294-5303 (2018).

The following EXAMPLES are provided to illustrate the invention and shall not limit the scope of the invention.

Example 1

Bacteria Responsive, β-Lactamase Degradable Hydrogels

To help limit unnecessary exposure to antibiotics to reduce associated toxicities and potentially reduce susceptibility to bacterial antibiotic resistance development, the inventors developed hydrogels that degrade in the presence of β-lactamase. These hydrogels can be exploited in developing biomaterials with on-demand, bacteria triggered release of antibiotics or for detecting β-lactamase. β-lactamase-mediated hydrolysis of the β-lactam amide present in cephalosporins containing a good leaving group at the 3'-position, leads to the expulsion of the leaving group. The inventors used β-lactamase-cleavable compounds modified with functional groups on both halves as responsive crosslinkers to form β-lactamase-degradable biomaterials.

Figure 1:
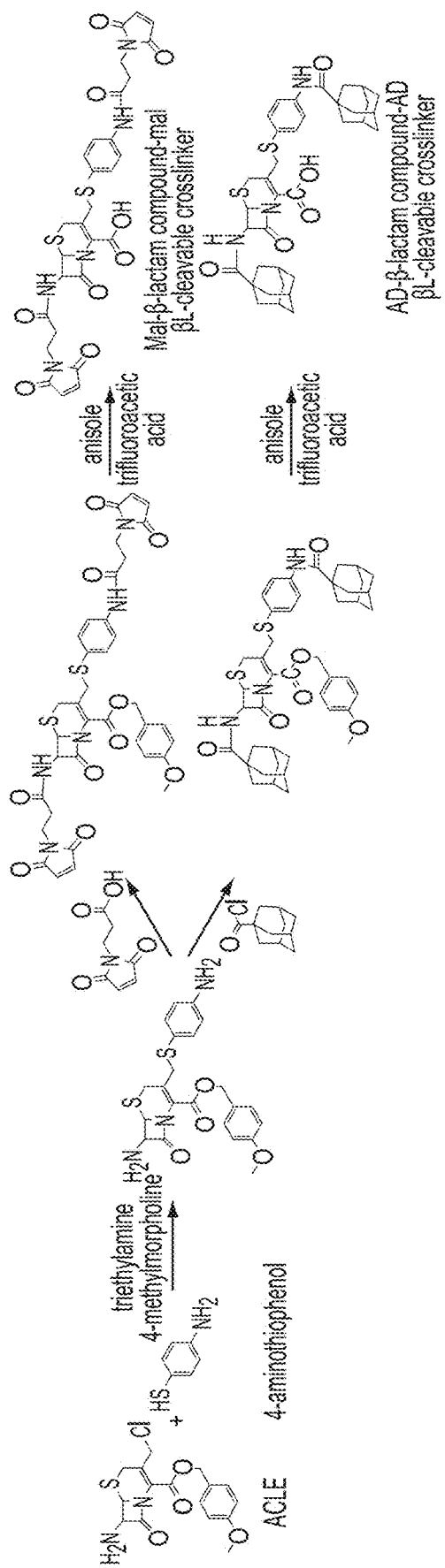
FIG. 1 is schematic diagram showing the synthetic route of two β-lactamase-cleavable compounds which can be used as crosslinkers to formulate covalently and non-covalently crosslinked hydrogels.
Figure 3:
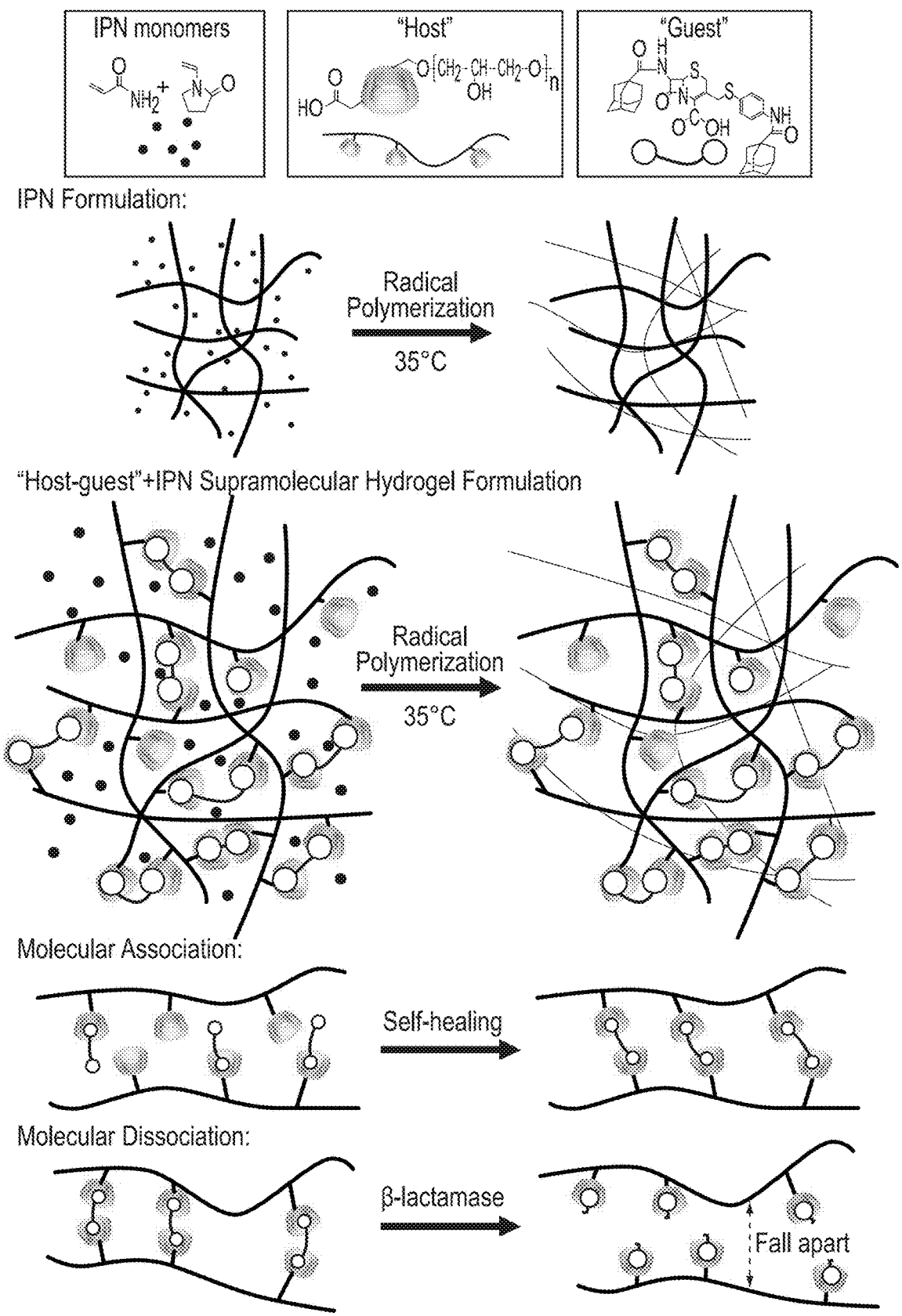
FIG. 3 is a description of Scheme 1, a method for producing self-healing and β-lactamase (βL) enzyme-responsive supramolecular hydrogels. The chemical structures of hydrogel components are shown: Interpenetrating polymer network (IPN) monomers of acrylamide (AAm) and N-vinylpyrrolidinone (NVP), poly-carboxymethyl-β-cyclodextrins (PCD) host polymer, and adamantane (AD) flanked β-lectern bifunctional guest molecule.

The inventors first successfully synthesized two β-lactamase-cleavable compounds with a similar β-lactam core flanked by two different functional groups on the either side. See the synthesis in FIG. 1. Maleimide (Mal) or adamantane (AD) groups were chosen to functionalize the β-lactam compound synthesized from ACLE (7-amino-3-chloromethyl-3-cephem-4-carboxylic acid P-methoxybenzyl ester hydrochloride) and 4-aminothiophenol. Characterization of the newly synthesized compounds was done using mass spectrometry (MS), nuclear magnetic resonance spectroscopy (NMR), and Fourier transform infrared spectroscopy (FTIR).

Two types of L-responsive hydrogels were formulated based on (1) covalent and (2) non-covalent interactions as shown in FIG. 2. For the covalently cross-linked hydrogels, 4-arm-poly(ethylene glycol)-thiol (4-arm-PEG-SH) was crosslinked via Michael-type addition between the PEG thiol groups and the maleim ides on Mal-β-lactam compound-Mal. As a control, Mal-PEG-Mal was used in place of the—cleavable crosslinker to form non-responsive hydrogels to test the specificity of the responsiveness to the β-lactamase-cleavable crosslinker. Representative non-responsive and responsive hydrogels incubated with β-lactamase produced by three different bacterial species were observed, as well as the change in mass over time during the incubation, demonstrating the decrease in size and mass of the hydrogels as they are degraded by the enzymes. The negative control non-β-lactamase-degradable hydrogels remained stable, maintaining their shape and mass.

For the non-covalently cross-linked hydrogel, acrylamide/1-vinyl-2-pyrrolidinone (AAm/NVP) was polymerized (via free radical polymerization) in the presence of supramolecular cross-linkers assembled from the β-lectern-AD-containing "guest" molecule with "host"-cyclodextrin polymer, forming an interpenetrated network. This polymeric material can be activated by removing the p-methoxybenzyl that protects ACLE's carboxylate (an enzyme-substrate recognition site) during chemical modification, yielding the activated product (AC-supramolecular hydrogel). The resultant supramolecular hydrogels also degraded in the presence of β-lactamase, showing a decrease in mass and size, but remained stable under physiologically relevant conditions (in phosphate-buffered saline, pH 7.4). See FIG. 2(d). Besides the bacterial responsiveness, these supramolecular hydrogels also exhibit self-healing behavior, resulting from the interaction between the host β-cyclodextrin and the guest adamantane.

Both types of hydrogels degraded specifically in the presence of β-lactamase-producing bacteria strains, *Pseudomonas aeruginosa* and *Bacillus cereus*, but remained stable in blank media or when incubated with a non-β-lactamase-producing strain of *Staphylococcus aureus*.

The inventors demonstrated that the responsive poly (ethylene glycol) hydrogels selectively degraded in β-lactamase-producing bacteria. The inventors incubated supramolecular hydrogels in 1× phosphate-buffered saline with or without β-lactamase from *P. aeruginosa* and from *E. cloacae* over time. They then incubated responsive and non-responsive PEG hydrogels with $10^7$ CFU/mL of β-lactamase-producing and non-β-lactamase-producing bacteria for twenty-four hours.

Advantages: Other β-lactamase-responsive biomaterial have been developed, such as nanoparticles that can disassemble and release antibiotics. Li et al., Angew. Chemie Int. Ed., 55, 1760-1764 (2016). β-lactamase-responsive biomaterial such as fluorescent probes that detect β-lactamase have also been developed. Chan et al., ACS Chemical Biology, 13, 1890-1896 (2018). β-lactamase-responsive biomaterial also includes polymers that gel in the presence of β-lactamase. Yang et al., Journal of the American Chemical Society, 129, 266-267 (2007). However, neither covalently nor non-covalently crosslinked hydrogels that degrade in the presence of β-lactamase have apparently been used. These hydrogels provide a macroscopic response to β-lactamase, which can help detect the presence of resistant bacteria, and can be used to release encapsulated antibacterial agents from prophylactic biomaterials (e.g., bandages) only in cases where an infection arises, limiting unnecessary exposure to antibiotics. This controlled, on-demand release could be advantageous in treating bacterial infections compared to other types of materials that might not be loaded with antibacterial agents or release loaded agents in an uncontrolled manner, potentially leading to unnecessary toxicity and higher susceptibility to resistance.

Included in the EXAMPLES below are additional data including bacteria-responsive assessment and self-healing demonstration of the supramolecular hydrogels.

Example 2

Supramolecular Hydrogel Synthesis

Figure 4:
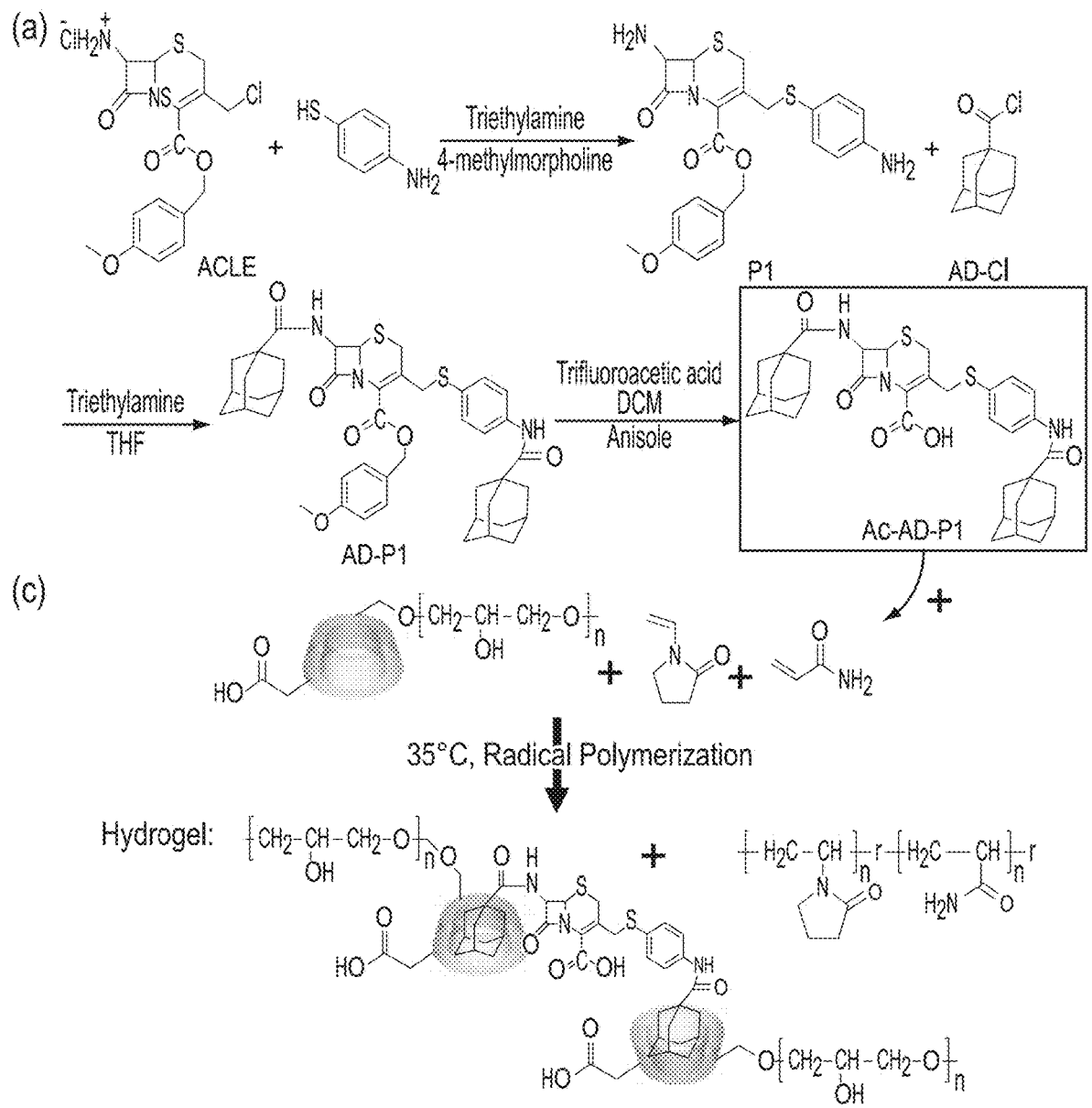
FIG. 4. Shows the synthesis of self-healing β-lactamase-responsive supramolecular hydrogels.

The inventors developed supramolecular hydrogels using "host-guest" interactions between polymeric cyclodextrin and a newly synthesized bifunctional β-lactamase-responsive guest molecule, with a poly(vinylpyrrolidone-ca-acrylamide) (p(NVP-co-AAm)) interpenetrating polymer network. To synthesize the bifunctional β-lactamase-responsive guest molecule, ACLE was selected as the starting material due to its intinsic β-lectern ring and free terminal amino group at the 7'-position. As shown in FIG. 4, ACLE was first modified (yielding P1) with 4-aminothiophenol to add another primary amine on a good leaving group at the 3'-position that is expelled when the β-lactam ring is hydrolyzed by β-lactamase. Following this modification, adamantane groups were introduced by reacting the carbonyl chloride on adamantanecarbonyl chloride with the amino groups on P1. Perez-lnestrosa et al., Cephalosporin chemical reactivity and its immunological implications. Curr. Opin. Allergy. Cl., 5, 323-330 (2005). This adamantane-conjugated P1 (AD-P1) was activated by removing the p-methoxybenzyl that protects ACLE's carboxylate (a substrate recognition site for some β-lactamases; Morandi et al., J. Am. Chem. Soc., 125, 685-695 (2003)) during chemical modification, yielding the activated bifunctional guest molecule (Ac-AD-P1). $^1$H NMR and HRMS spectroscopy demonstrated successful synthesis and purification of the final product.

FTIR spectroscopy was also used to confirm the chemical structure of the newly developed guest molecule. FTIR spectra of the various reactants, intermediates [adamantanecarbonyl chloride (AD-Cl), P1, and AD-P1], and the final guest molecule [Ac-AD-P1] were observed. FTIR spectra of polymeric cyclodextrin (PCD; red) and various hydrogels synthesized with different components: interpenetrating polymer network only (p(NVP-ca-Am)), host+IPN (PCD-p(NVP-ca-Am); green), guest+IPN (p(NVP-ca-Am)/Ac-AD-P1; blue), and "host-guest"+IPN (PCD-p(NVP-ca-Am)/Ac-AD-P1). FTIR spectra of different hydrogel formulations (upon drying) containing various components of the final supramolecular "host-guest"+IPN hydrogel. The characteristic absorption of adamantane is observed in the guest+IPN mixture without polymeric cyclodextrin, while a broad band at 1050 cm$^{-1}$ corresponding to the asymmetric glycoside vibration of cyclodextrin appears in the host+IPN mixture without Ac-AD-P1. When the adamantane of Ac-AD-PI are end-capped with polymeric cyclodextrin via the "host-guest" inclusion, the characteristic absorption of adamantane in the region of 2750-2950 cm$^{-1}$ weakens. The host restriction of adamantane vibration within the cavity of polymeric cyclodextrin may lower the energy of the encapsulated portion of Ac-AD-P1, thereby reducing the intensity of the corresponding absorption bands. 43-45 Moreover, the C=C stretching peak at 1550 cm$^{-1}$ of the exposed cyclic alkene near the β-lactam core appears with similar intensity as in the guest+IPN mixtures without the host, suggesting that adamantane is incorporated into the polymeric cyclodextrin hydrophobic pockets while the PI portion of the guest is likely excluded.

The three C—H stretching vibrations appearing in the range of 2750-2950 cm$^{-1}$ belong to the adamantane group of adamantanecarbonyl chloride. Multiple absorption bands around 3250-3500 cm$^{-1}$ can be observed due to the presence of the primary and aliphatic primary amines in P1. With the formation of amides during AD-P1 synthesis through the reaction of these amines with adamantanecarbonyl chloride a single broad peak is observed at 3350 cm$^{-1}$, which can be assigned to the amide secondary amines on both sides of the molecule. Meanwhile, the characteristic adamantane absorptions still appear, indicating successful conjugation of AD to P1. While P1 and AD-P1 both have the C=O ester stretching vibration at 1750 cm$^{-1}$, the vibration is completely absent from the Ac-AD-P1 spectra as expected, demonstrating successful removal of the p-methoxybenzyl protecting group from the guest molecule.

Polymeric cyclodextrin was used as the backbone of the polymer network due to the large number of β-cyclodextrin rings with their hydrophobic cavities and high affinity for adamantane. To enhance the mechanical strength of the hydrogels without compromising the hydrophilicity, an interpenetrating polymer network was introduced based on PVP. PVP is known for its biocompatibility, but the poor mechanical strength of purely PVP hydrogels limits their potential application. See Bedar, A et al., ACS Appl. Polym. Mater., 1, 1854-1865 (2019); Jiao et al., ACS Appl. Mater. Interfaces, 1 32707-32716 (2018); and Yao et al., Biomacromolecules, 16, 2059-2071 (2015). Thus, the inventors formed an interpenetrating polymer network by copolymerizing N-vinylpyrrolidinone and acrylamide, yielding p(NVP-co-Am) as previously described by Yang & Yuan, ACS Appl. Mater. Interfaces, 11, 16765-16775 (2019); Lin et al., ACS Appl. Mater. Interfaces, 10, 29684-29693 (2018). The inventors then characterized the final supramolecular PCD-p(NVP-co-Am)/Ac-AD-P1 hydrogel (i.e., "host-guest"+IPN hydrogel).

To investigate the importance of the guest molecule in formulating the hydrogel, a host+IPN (i.e., PCD-p(NVP-co-Am)) hydrogel was prepared using the same reaction conditions without the addition of the Ac-AD-P1 guest molecule. This polymerization resulted in the formation of a viscous hydrogel that was unstable; the gel dissolved in H$_2$O and phosphate-buffered saline over twelve hours at room temperature. In contrast, "host-guest"+IPN hydrogels were able to reach their swelling equilibrium in H$_2$O and phosphate-buffered saline at approximately twenty-four hours and remained stable for at least thirty-five hours at 37° C. (FIG. A4b).

Example 3

Self-Healing Behavior of Supramolecular Hydrogels

Given the successful "host-guest" interaction and stable hydrogel fabrication obtained for the "host-guest"+IPN hydrogel formulation, the inventors examined the self-healing response.

Previous reports described PCD-AD self-healing materials. See Jeong et al., Carbohydrate Polym., 198, 563-574 (2018); Ma et al., Mat. Sci. Eng. C-Mater., 73, 357-365 (2017); and Kakuta et al., Adv. Mater., 25, 2849-2853 (2013).

Figure 5A:
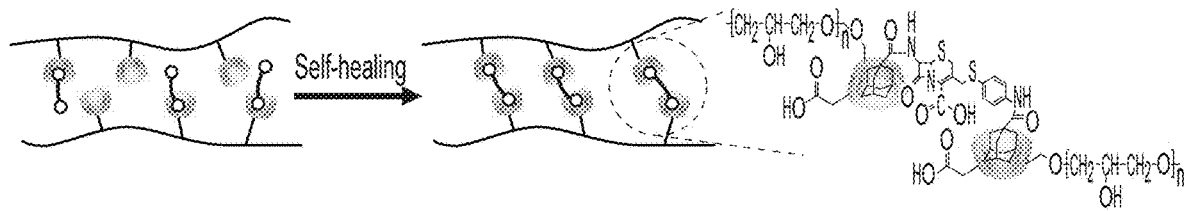
FIG. 5(a) is a schematic illustration of self-healing behavior occurring across the disrupted hydrogel interface.
Figure 5B:
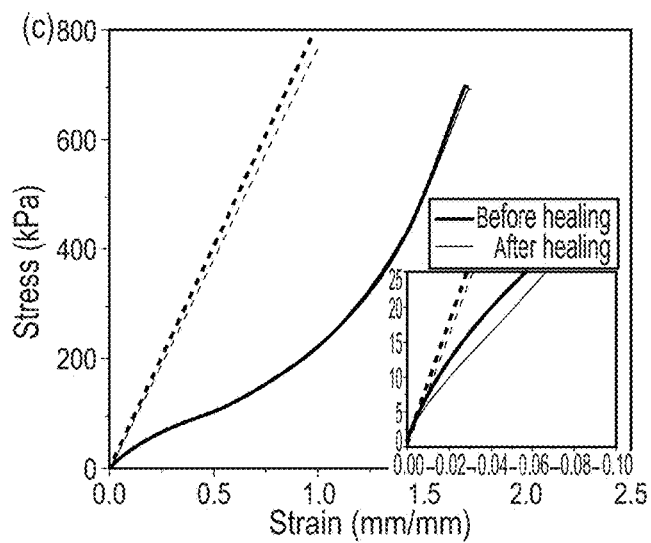
FIG. 5(b) shows a representative true stress versus true strain plot for supramolecular hydrogels before and after healing. Inset is zoomed into the initial linear region utilized to obtain the initial tensile modulus.

The hydrogels should exhibit self-healing behavior unhindered by the β-lactam core of the guest molecule. The self-healing ability of the supramolecular hydrogel was assessed in the absence of any external stimuli. As shown in the FIG. 5(a), the presence of free adamantane groups and unfilled polymeric cyclodextrin cavities caused by severing the hydrogel provides a driving force for self-repair via "host-guest" interactions, in contrast to purely covalent hydrogels.

The inventors observed the intrinsic self-healing behavior exhibited by these hydrogels. The "host-guest"+IPN hydrogel was cut into two sections and allowed to self-heal for twenty-four hours at room temperature, and then stretched to four times its initial length, demonstrating robust healing behavior (units on caliper is mm). The cylindrical sample (4 mm diameter) was completely severed. The two severed ends were pressed together manually and after twenty-four hours at room temperature in air, the resultant healed hydrogel was capable of stretching to at least four times its initial length without tearing. Similar extensibility was observed for other hydrogel samples treated similarly.

Next, the inventors compared the tensile properties of "host-guest"+IPN hydrogels before and after healing. See FIG. 5(c). The as-made hydrogels exhibited initial tensile moduli of ~815 kPa, which is among the strongest reported supramolecular hydrogels with healing ability. See Zhang et al., ACS Appl. Polym. Mater., 1, 1769-1777 (2019); Bin Ihsan et al., Macromolecules, 49, 4245-4252 (2016); and Wei et al., Rsc Adv. 2015, 5, 60273-60278.

Upon severing the hydrogels and healing for twenty-four hours, the initial tensile moduli was similar, at 785+40 kPa.

The inventors also quantified the percent elongation at break for twenty-four hours. Healed samples showed a maximum percent elongation of 446+21% was attainable. In fact, the break was not always observed at the healed interface between the severed hydrogels.

Figure 6:
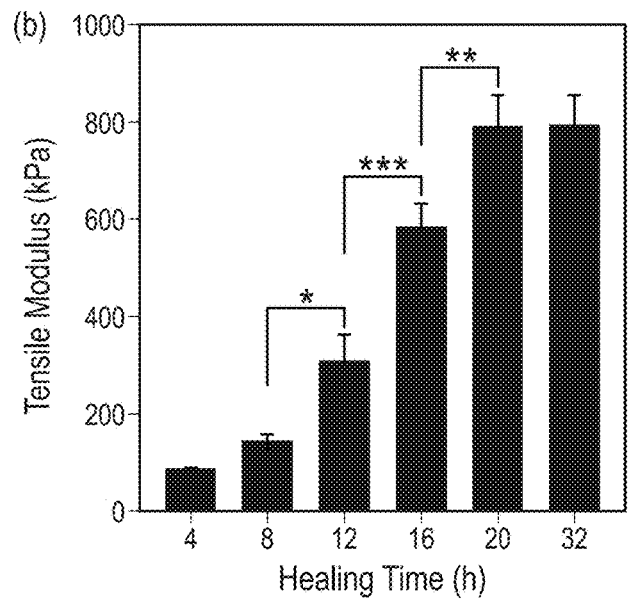
FIG. 6 shows the monitoring of the tensile properties of self-healed supramolecular PCD-p(NVP-ca-Am)/Ac-AD-P1 "host-guest"+IPN hydrogels.

Finally, the inventors examined the dependence of the initial tensile modulus of "host-guest"+IPN hydrogels on healing time, as shown in FIG. 6. Hydrogels were severed and then allowed to self-heal at room temperature for a given period of time, following which their tensile properties were examined. Tensile modulus increased over time, with no significant increase following twenty hours, at which point the initial modulus is comparable to that of the as-made hydrogels.

Example 4

Enzyme-Triggered Degradation of Supramolecular Hydrogels

Figure 7:
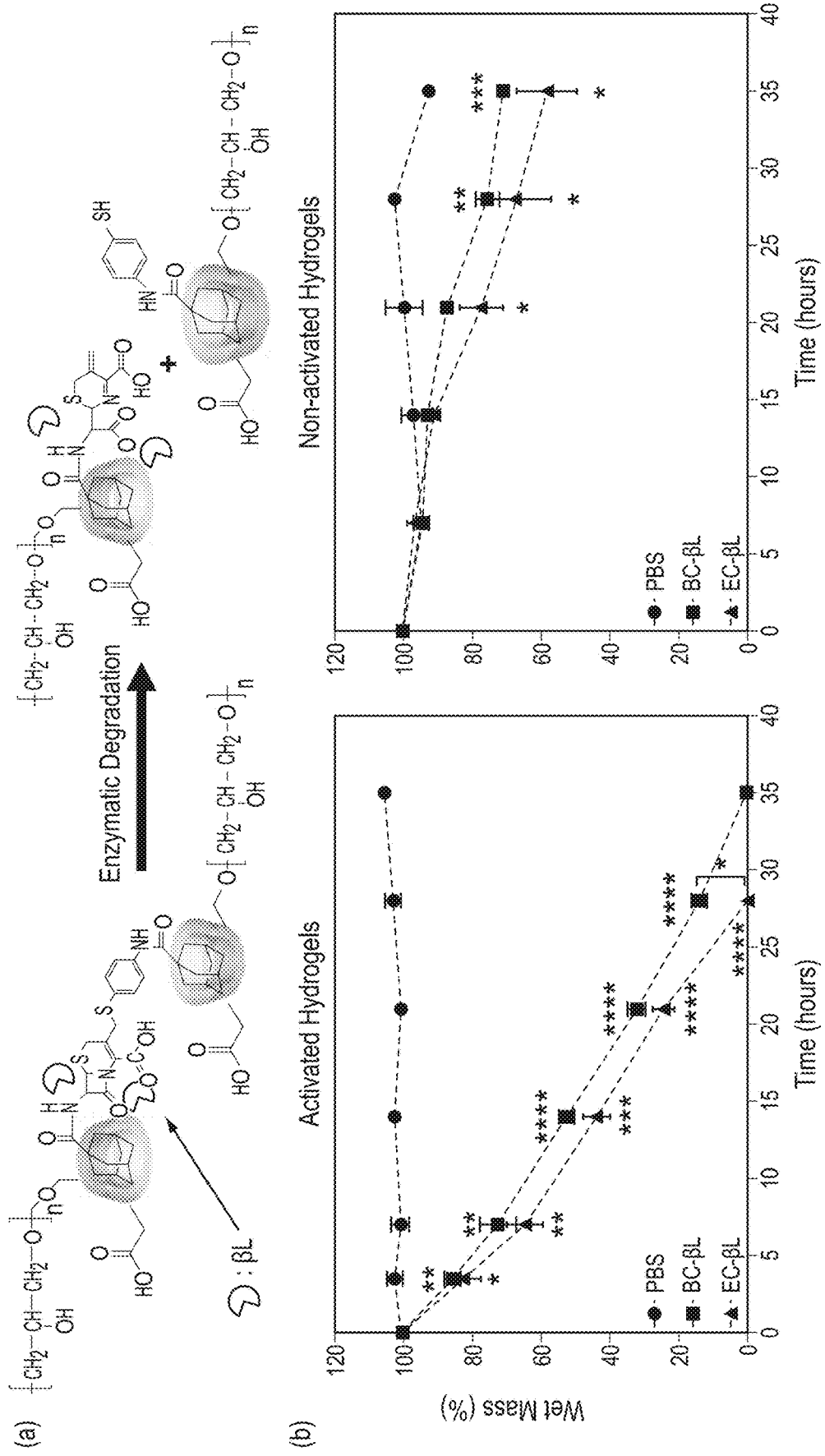
FIG. 7 shows the enzyme-triggered degradation of suprarnolecular hydrogels.

The inventors examined the ability of PLs to cause macroscopic degradation of the supramolecular "host-guest"+IPN hydrogel. The β-lactamase triggered hydrolysis of the guest Ac-AD-P1 molecule β-lactam ring yields the products shown in FIG. 7(a). With the cleavage of the guest, the majority of physical cross-links formed via "host-guest" interaction will be disrupted across the polymer network, which shouldould lead to hydrogel degradation, while the cavities of the polymeric cyclodextrin may still be occupied. The inventors incubated pre-swollen activated and non-activated (i.e., p-methoxybenzyl protected) supramolecular "host-guest"+IPN hydro gels with PL from B. cereus (BC-βL) or PL from E. cloacae (EC-βL) in 1× phosphate-buffered saline at 37° C. (mass change quantified in FIG. 7(b).

Morphology change were visualized of three replicates of activated and non-activated supramolecular "host-guest"+IPN hydrogels incubated in solutions of 1× phosphate-buffered saline, BC-βL (100 U/mL), or EC-βL (1 U/rnL) at 37° C. at different time points.

BC-βL and EC-βL were selected as β-lactamases from two prevalent pathogenic bacteria. See Davin-Regli & Pages, Frontiers in Microbiology, 6 (2015); Bottone, Clin. Microbial. Rev., 23, 382 (2010). FIG. A4b shows the percent of original hydrogel mass remaining over time under these conditions for activated (left) and non-activated (right) hydrogels. Both hydrogels remained stable in 1× phosphate-buffered saline over the thirty-five hours test period. On the other hand, activated "host-guest"+IPN hydrogels showed a linear decrease in hydrogel mass over time with β-lactamase incubation, with faster degradation observed with EC-βL compared to BC-βL, which may be attributed to potential difference in the exact β-lactamase composition, as different classes of β-lactamases are known to exhibit differences in their active sites. Chan et al., ACS Chem. Biol., 13, 1890-1896 (2018). For these hydrogels, a 50% loss in mass was seen at ~ten hours and ~fifteen hours, and complete degradation at ~twenty-eight hours and ~thirty-five hours, for EC-βL and BC-βL incubated samples, respectively. In contrast, non-activated supramolecular hydrogels showed no significant mass change over the first fifteen hours of incubation with PLs. Following this time, a gradual decrease in hydrogel mass was observed for these hydrogels; at thirty-five hours, 58% and 71% of the original hydrogel mass remained for non-activated samples in BC-βL and EC-βL, respectively.

The reduced susceptibility of non-activated hydrogels to β-lactamases is due to the p-methoxybenzyl protecting group on the guest molecule restricting access to the β-lactamase recognition site. Morandi et al., J. Am. Chem. Soc., 125, 685-695 (2003). The hydrogel degradation is a result of β-lactamase cleavage of the guest molecule core.

The β-lactamase-responsive "host-guest"+IPN hydrogels developed here have the potential to be used in a range of biomedical applications including triggered drug delivery and diagnostics. For these types of applications, maintaining enzyme responsiveness following material disruption and self-healing is desirable. As a preliminary investigation of this capability, the inventors incubated dried hydrogels as fabricated and hydrogels that had been severed and allowed to heal for twenty-four hours at room temperature, in BC-Vs, EC-βLs, or in 1× phosphate-buffered saline solution at 37° C. After a swelling equilibrium was reached at ~twenty-four hours, both hydrogels that had undergone self-healing and as made hydrogels, experienced similar degradation behavior over the next ~forty-eight to seventy-two hours in β-lactamase and no change in 1× phosphate-buffered saline, confirming that "host-guest"+IPN hydrogels are capable of exhibiting β-lactamase-responsive degradation both before and after the self-healing process.

Example 5

Bacteria-Responsive Degradation of Supramolecular Hydrogels

Having demonstrated the β-lactamase-responsive behavior of the supramolecular hydrogel, the inventors confirmed that these materials respond similarly to incubation with bacteria. The inventors incubated "host-guest"+IPN hydrogels with β-lactamase-producing bacteria (*B. cereus* 13061; Shao & Xing, Chem. Commun., 48, 1739-1741 (2012) and *P. aeruginosa* PA01; Chan et al., ACS Chem. Biol., 13, 1890-1896 (2018)), non-β-lactamase-producing bacteria (*S. aureus* 25923; Lee et al., Microb. Drug Resist., 20, 568-574 (2014)) or blank tryptic soy broth to examine bacteria specific degradation.

The inventors visually examined these hydrogels for degradation and representative images are shown for each condition over time in FIG. A5. The hydrogels remained stable in the blank tryptic soy broth. Morphologically, hydrogels incubated with non-β-lactamase-producing *S. aureus* over seventy-two hours remained stable and appeared similar to those incubated with blank tryptic soy broth. By contrast, hydrogels incubated with β-lactamase-producing *B. cereus* and *P. aeruginosa* completely degraded over the course of seventy-two hours, suggesting degradation specific to β-lactamase-producing bacterial cultures. Thus, these materials are useful for applications involving bacteria-triggered degradation.

Example 6

β-Lactamase Responsive Hydrogels: A Platform for Bacteria Triggered Antibacterial Drug Delivery. Synthesis and Characterization of βL-Responsive Hydrogels To engineer β-lactamase-degradable hydrogels, the inventors synthesized a β-lactamase-cleavable cephalosporin that is functionalized on two termini with maleimides (mal-β-lactam-mal) to be used as the crosslinker in thiol-ene mediated poly(ethylene glycol) hydrogel polymerization, thus incorporating the responsive moiety in the backbone of the hydrogel's matrix, as illustrated in Scheme 2. The β-lactamase-cleavable β-lactam compound 1 has been previously reported and incorporated as the core of different compounds for the detection or treatment of infections. Aminothiophenol (ATP), which is conjugated at the 3'-C site of 7-amino-3-chloromethyl-3-cephem-4-carboxylic acid p-methoxybenzyl ester (ACLE) (FIG. 9 Scheme 3), acts as a leaving group that is expelled in the presence of β-lactamases (as shown in FIG. 8; Scheme 2). The resulting compound has two amines on either end, when functionalized with maleimides by conjugating 3-maleimidopropionic acid via amidation, forming compound 2. Post-functionalization with maleimides, the carboxylic acid on the β-lactam, which is an enzyme-substrate recognition site for some β-lactamases, was deprotected by the removal of the p-methoxybenzyl protecting group, yielding the responsive crosslinker, mal-β-lactam-mal. $^1$H-NMR and HRMS confirmed the synthesis of the crosslinker (see Methods and FIGS. S1-S3). To fabricate non-β-lactamase-degradable control hydrogels, a short PEG chain functionalized with maleimides (mal-PEG-mal) was used as a crosslinker in place of the cephalosporin crosslinker. The molecular weight of mal-PEG-mal (494 Da) was chosen due to its similarity to that of mal-β-lactam-mal (639 Da) to achieve comparable mesh size and physical properties among the responsive and non-responsive hydrogels, reducing unintended differences between the two types of hydrogels, other than the designed degradability of mal-β-lactam-mal crosslinked hydrogels.

The hydrogels were formed by mixing an equimolar ratio of thiols to maleimides on the 4-arm-PEG-thiol macromers and on the mal-β-lactam-mal or mal-PEG-mal crosslinkers, respectively. However, the two types of hydrogels demonstrated different gelation rates, which should be due to differences in the reaction microenvironment for thiol end groups in the vicinity of the β-lectern versus PEG crosslinkers. Previous studies have shown that the pKa of the thiol could be modulated by placing positively or negatively charged amino acids in close proximity to the thiols in a peptide sequence, either to increase the rate of slow acrylate-thiol Michael-type reactions or to slow down the efficient maleimide-thiol reactions, respectively. The β-lactam compound's carboxylic acid likely increases the pKa of the thiols on the 4-arm-PEG-thiol macromers, reducing their reaction rate with the maleimides on the responsive crosslinker compared to the non-responsive crosslinker.

Other approaches to modulating the reactivity of thiols include changing buffer strength and pH. These parameters have been investigated as a means to slow down the highly efficient maleimide-thiol reaction enough to allow sufficient mixing of components in order to form uniform hydro-gels. Studies have shown that gelation conditions drastically influence properties of the resulting hydrogel, both microscopic and macroscopic such as swelling and stiffness; but unlike stoichiometric ratio and polymer density, pH and buffer concentration did not have as large of an effect on these properties. Decreasing the pH decreases the availability of the reactive species, the thiolates (deprotonated sulfhydryl group), based on the Henderson-Hasselbalch equation. However, too slow of a reaction rate could decrease crosslinking efficiency, leading to more defects, and consequently larger mesh size, higher swelling, and reduced mechanical integrity. The inventors empirically determined PBS concentration and pH for the two types of hydrogels individually to allow sufficient time for mixing and transfer to molds before gelation. The inventors dissolved the responsive and non-responsive hydrogel components in 1×PBS pH 7 and 0.1×PBS pH 3, respectively. To investigate the potential of this platform for selective, controlled antibacterial agent delivery, the inventors loaded the hydrogels with fluorescent nanoparticles (NPs) as model cargo. The inventors mixed 100 nm fluorescent polystyrene nanoparticles with the pre-polymer solution to physically entrap the nanoparticles into the hydrogel matrix during gelation, and then monitored their release as hydrogels were degraded by β-lactamases. Given that the nanoparticles would be larger than the mesh size, the nanoparticles should only be released upon matrix cleavage by β-lactamases.

To investigate potential differences between responsive and non-responsive hydrogels and potential effects of nanoparticle encapsulation of nanoparticles on hydrogel properties, the inventors measured the hydrogel swelling ratio and the estimated mesh size (see FIG. 10) using the Peppas-Miller modified expressions of the Flory-Rehner equation. See Canal & Peppas, Journal of Biomedical Materials Research, 23, 1183-1193 (1989). To study how polymer percent weight per volume (w/v %) affects these properties, the inventors developed 5%, 10%, 15% weight per volume (w/v) responsive and non-responsive hydrogels with and without nanoparticles incorporated. As shown with previous studies, a decrease in PEG w/v % led to an increase in swelling and mesh size, which is hypothesized to be caused by a decrease in crosslinking efficiency and increase in primary loop formation point during gelation when polymer concentration is reduced. For all formulations, the addition of the nanoparticles had no effect on the swelling ratio, suggesting that the presence of the nanoparticles did not significantly affect crosslinking efficiency. However, the responsive hydrogels had slightly larger average mesh sizes (and higher swelling ratios; FIG. S4). This difference between responsive and non-responsive hydrogels, although minimized by optimizing gelation buffer pH and concentration, should be due to slower and less efficient crosslinking of responsive hydrogels.

Example 7

β-Lactamase Triggered Hydrogel Degradation and Nanoparticle Release

To test the triggered degradation of hydrogels and release of nanoparticles, responsive and non-responsive nanoparticle-loaded hydrogels were incubated with β-lactamases from *Pseudomonas aeruginosa* (PA-βL). These hydrogels demonstrate the progression of degradation of a responsive hydrogel and no visible change in size or morphology of a non-responsive hydrogel, indicating selective cleavage of the β-lactam crosslinker by β-lactamases. To further investigate specificity of hydrogel responsiveness, the inventors incubated the hydrogels with other enzymes that could potentially be found in a wound environment. Collagenases, which cleave peptides in collagen, are produced by bacteria like *P. aeruginosa* as a virulence factor, but also by mammalian cells during tissue remodeling and wound healing (like matrix metalloproteinases).

Hydrogel wet mass and nanoparticle concentration in the incubation solutions were monitored over time to track hydrogel degradation and nanoparticle release, respectively. Neither responsive nor non-responsive hydrogels exhibited a decrease in wet mass when incubated with lipase or collagenases for a week, showing a β-lactamase-specific degradation response.

While non-responsive hydrogels demonstrated no change in wet mass, responsive hydrogels showed gradual swelling over time in all solutions, including buffer alone, which is likely due to their lower crosslinking efficiency, as explained above. Another difference between the two types of hydrogels is the presence of the β-lactam's carboxylate which might contribute to increased water uptake. Most importantly though, there were no nanoparticles detected in any of the solutions, indicating no uncontrolled release.

Regarding the feasibility of a triggered on-off response of these hydrogels, the degradation and cargo release should cease if the infection was cleared and β-lactamases were no longer present and would re-initiate if an infection reoccurred. Therefore, the inventors alternated incubating the hydrogels in solutions of PA-βL and blank 1×PBS every hour. Change in hydrogel wet mass and nanoparticle release were measured at each solution change. FIG. 11 shows the stability of the non-responsive hydrogels and no change in their wet mass throughout the experiment. Responsive hydrogels degraded in the presence of the β-lactamase, as demonstrated by the gradual decrease in wet mass over time. The hydrogels did exhibit an on-off response when the enzyme was introduced or removed, respectively, which has also been demonstrated in other enzyme degradable hydrogels. This effect was especially apparent in the earlier time points where changes in wet mass and nanoparticle release were occurring at a higher rate due to higher hydrogel surface area. During incubation in buffer alone, any change in mass or nanoparticle release that occurred was not statically significantly different from the previous β-lactamase incubation time point. Nanoparticle release from responsive hydrogels into the surrounding solution tracked hydrogel degradation rates, which is demonstrated clearly when the fractional nanoparticle release is plotted as a function of fractional mass loss in FIG. 11(*b*). These results indicate that nanoparticle release was solely degradation dependent. There was no detectable nanoparticle release from non-responsive hydrogels, further confirming the entrapment of nanoparticles within the hydrogel matrix and their release only upon degradation. Altogether, these results demonstrate the potential of this platform to prevent uncontrolled release and achieve enzyme-triggered release of antibacterial agents.

Hydrogel degradation rates of enzyme-responsive hydrogels are dependent on enzyme concentration, enzyme-substrate cleavage kinetics, concentration of the enzyme-labile moiety in the matrix, and polymer crosslinking density. An increase in β-lactamase concentration led to more rapid degradation of the β-lactamase responsive hydrogels, where 50 units and 30 units(U)/mL of PA-βL (one unit is defined as hydrolyzing one µmole of benzylpenicillin per min at pH 7.0 at 25° C.) resulted in complete degradation within approximately four and eight hours, respectively (FIG. S5). To probe the effect of enzyme specificity and efficiency in cleaving the β-lactam linker and degrading the hydrogel, the inventors incubated the hydrogels with β-lactamases isolated from two other bacteria, *Bacillus cereus* (BC-βL) and *Enterococcus cloacae* (EC-βL). Different concentrations of these enzymes in terms of their enzymatic activity towards benzylpenicillin were chosen to achieve complete hydrogel degradation in a few hours. The hydrogels degraded within five hours when incubated with 1 U/mL EC-βL, eight hours with thirty U/mL PA-βL, and nine hours with 400 U/mL with BC-βL See FIG. 12. Very different concentrations (in terms of their activity against benzylpenicillin) of the three β-lactamases were required to achieve complete degradation in these time scales. The different degradation rates could result from differences in enzyme access to the β-lactam ring based on enzyme active site properties or differences in hydrolysis catalytic efficiency. β-lactamases exhibit varying specificity and activity towards different antibiotics and β-lactam containing compounds. For example, some β-lactamases have a larger or more flexible substrate binding pocket compared to other classes of β-lactamases and could potentially accommodate polymers or bulky groups near the β-lectern ring.

For all degradation studies, an overall decrease in the rate of hydrogel degradation is observed over time, suggesting mass loss kinetics are proportional to the hydrogels' surface area, and in turn suggesting surface erosion of hydrogels as opposed to bulk degradation. Surface erosion is common in chemically degradable crosslinked poly(ethylene glycol) hydrogels where enzyme hydrodynamic diameter is typically on the order of magnitude of the hydrogels' mesh size, which prevents or slows down enzyme penetration and diffusion into the hydrogel. Based on crystallography studies, a class C 39 kDa β-lactamase was found to be ~6×5×4 nm in size, which is close to our hydrogels' estimated average mesh size of ~5 nm. Surface erosion can provide more controlled drug delivery compared to bulk degradation, where release in the case of the latter could be affected by the increased swelling over time, potentially leading to a delayed burst release due to hydrogel late-stage sudden dissolution.

Another parameter that one of skill in the biochemical art can use to facilely tune hydrogel degradation rate is polymer density. The inventors investigated the degradation of hydrogels assembled with 5%, 10%, or 15% w/v PEG. Higher PEG content led to slower degradation, with complete degradation by PA-βL achieved in approximately thirteen hours, eight hours, or 3.5 hours for 15%, 10%, or 5% w/v hydrogels, respectively. See FIG. 13(a). Similar decrease in hydrogel degradation rates with increase in PEG concentration has been reported for other enzyme degradable PEG hydrogels, and has been associated with higher crosslinking density, smaller mesh size and reduced swelling. As expected, change in polymer density affected hydrogel degradation rates but did not compromise the controlled, triggered nanoparticle release, as shown by the linear fit of fractional nanoparticle release plotted against fractional hydrogel mass loss in for the different PEG % w/v hydrogels. See FIG. 13(b).

Example 8

Bacteria Triggered Hydrogel Degradation and Nanoparticle Release

To test the triggered degradation of the hydrogels by β-lactamase-producing bacteria, both β-lactamase-degradable and non-degradable hydrogels loaded with fluorescent nanoparticles were incubated in solutions of β-lactamase-producing (*B. cereus* 13061 and *P. aeruginosa* 27853) and non-β-lactamase-producing (*S. aureus*) strains of bacteria in their logarithmic growth phase. The inventors observed over time the course of responsive (R) and non-responsive (NR) nanoparticle-loaded hydrogels incubated with solutions of *B. cereus* at 37° C. shaking at 100 rpm. The solution at 0 hours seemed clear because at 1×10⁷ CFU/mL, the media is not cloudy yet. The responsive hydrogels degraded when they were incubated with *B. cereus*, as demonstrated by their decrease in size and accumulation of nanoparticles released into the bacterial solutions over time. See FIG. 14. Responsive hydrogels also degraded when incubated with *P. aeruginosa*. Unlike in *B. cereus* solutions, nanoparticle release measurements were not possible due to the high viscosity of *P. aeruginosa* solutions and the bacteria's release of fluorescent metabolites, such as pyocyanine which could interfere with nanoparticle detection. On the other hand, there were no apparent changes in hydrogel size or morphology during incubation with a non-β-lactamase-producing strain of *S. aureus*, nor any nanoparticle release. Similarly, no changes were detected in non-responsive hydrogels incubated with any of these three bacteria strains. These results further demonstrate the selective degradation and cargo release from the responsive hydrogels by β-lactamase.

Next, the inventors investigated β-lactamase-triggered hydrogel degradation on infected agar to better resemble static and dry infections compared to incubating hydrogels shaking in solution. Similar to the results seen in bacterial solutions, responsive hydrogels degraded on agar inoculated with *B. cereus* and *P. aeruginosa*, while non-responsive hydrogels did not. The inventors observed the hydrogel degradation by β-lactamase-producing bacteria on agar. The inventors observed over time the course of unloaded responsive (R) and non-responsive (NR) hydrogels incubated on agar inoculated with *B. cereus, P. aeruginosa, K. pneumoniae, E. cloacae*, or *E. coli* at 37° C. Images are representative of three repeats. The slower degradation rates on agar than in solution since degradation seems to be via surface erosion and the degradation front would be limited to only one plane of the hydrogel. Static drier conditions would slow diffusion of enzymes and clearance of degradation products from the surface of hydrogels compared to incubation in solution with shaking. This slower degradation was evident with *P. aeruginosa* where hydrogel degradation was completed after ~eight days versus ~42 hours when incubated on agar or in solution, respectively. The green-blue color seen in the hydrogels is likely the pyocyanine and pyoverdine secreted by *P. aeruginosa*, which typically changes the color of media and agar, and here also seems to diffuse into the hydrogels. The inventors also incubated the gels on agar inoculated with other β-lactamase-producing strains, including *Enterobacter cloacae, Escherichia coli*, and two clinical isolates of *Klebsiella pneumoniae*. As controls, the inventors incubated hydrogels on sterile agar or agar inoculated with non-β-lactamase-producing *S. aureus* 25923 for a week and did not observe any changes in morphology or size.

To further test the translational potential of the hydrogels and closely mimic a superficial tissue infection, the inventors tested the degradation of hydrogels on infected ex vivo porcine skin, which is commonly used as a model to study wound infections. The inventors observed the hydrogel degradation by β-lactamase-producing bacteria on ex vivo pig skin. The inventors observed over time the course of unloaded responsive (R) and non-responsive (NR) hydrogels incubated on porcine ex vivo skin tissue inoculated with *B. cereus, P. aeruginosa*, or *K. pneumoniae* at 37° C. Again, only the responsive hydrogels degraded on porcine skin inoculated with the β-lactamase-producing *B. cereus, P. aeruginosa*, or *K. pneumoniae*; while the non-responsive hydrogels remained stable, demonstrating the selective degradability of the hydrogels by β-lactamase-producing bacteria even when grown under different conditions. Interestingly, degradation induced by *P. aeruginosa* was faster on skin (four days) than on agar (eight days). One reason for faster degradation by *P. aeruginosa* on skin may be higher growth rates of the bacteria, which has been observed on an ex vivo human skin model infected with *P. aeruginosa* PA01, potentially resulting in a higher concentration of β-lactamases. This high growth rate is hypothesized to be due to *P. aeruginosa*'s secretion of proteases such as collagenases, as mentioned earlier, that can cleave collagen abundant in the dermis and convert it into nutrients. The differences in hydrogel degradation rates based on the strain of bacteria and the culture conditions warrants further investigation and in vivo testing to better mimic wound infections in terms of bacterial density and growth rate and secreted β-lactamase types and concentrations.

LIST OF EMBODIMENTS

Specific compositions and methods of bacterial β-lactamase responsive hydrogels have been described. The scope of the invention should be defined solely by the claims. All claim terms should be interpreted in the broadest possible manner consistent with the context and the spirit of the disclosure. The detailed description in this specification is illustrative and not restrictive or exhaustive. This invention is not limited to the particular methodology, protocols, and reagents described in this specification and can vary in practice. When the specification or claims recite ordered steps or functions, alternative embodiments might perform the functions in a different order or substantially concurrently. Other equivalents and modifications besides those already described are possible without departing from the inventive concepts described in this specification, as those skilled in the art recognize. The inventive subject matter shall not be restricted except in.

All patents and publications cited throughout this specification are incorporated by reference to disclose and describe the materials and methods used with the technologies described in this specification. The patents and publications are provided solely for their disclosure before the filing date of this specification. All statements about the disclosure date of the patents and publications are based on the information available to the inventors. The inventors make no admission about the correctness of the disclosure dates or contents of these documents. If there is an apparent discrepancy between a disclosure date provided in this specification and the publishers actual publication date, the actual publication dates control. The inventors may antedate such disclosure because of prior invention or another reason. If there is an apparent discrepancy between a disclosure provided in a previous patent or publication and the disclosure provided in this specification, then the disclosure of this specification and these claims control.

When a range of values is provided, each intervening value, to the tenth of the lower limit unit, unless the context dictates otherwise, between the upper and lower limit of that range and any other stated or intervening value in that range of values.

We claim:

1. A B-lactamase responsive hydrogel that releases an antibiotic in the presence of a B-lactamase producing bacteria, the hydrogel comprising:
   (a) cross-linkers that are cross-linking a polymer, the crosslinkers including one or more molecules each comprising one or more β-lactams;
   (b) nanoparticles encapsulated in the polymer and held encapsulated therein by the cross-linking;
   (c) an antibiotic inside the nanoparticles;
   wherein the hydrogel exhibits a B-lactamase-responsive degradation when contacted by the B-lactamase producing bacteria;
   wherein the hydrogel does not degrade or is stable when contacted by a non-β-lactamase-producing bacteria;
   wherein the nanoparticles are released from the hydrogel upon said β-lactamase-responsive degradation; and upon the release of the nanoparticles, the nanoparticles are capable of releasing the antibiotic.

2. The hydrogel of claim 1, wherein the hydrogel exhibits the β-lactamase-responsive degradation due to β-lactam ring hydrolysis, causing cleavage of the crosslinker when contacted by β-lactamase enzyme.

3. The hydrogel of claim 1, wherein the hydrogel exhibits β-lactamase-responsive degradation due to β-lactam ring hydrolysis, causing cleavage of the crosslinker when contacted by β-lactamase-producing bacteria.

4. The hydrogel of claim 1, wherein the polymer comprises a poly-carboxymethyl-β-cyclodextrin (PCD) or poly(ethylene glycol).

5. A method of fabricating a β-lactamase responsive hydrogel that releases an antibiotic in the presence of a β-lactamase producing bacteria, the method comprising the step of combining a polymer with a cross-linker comprising β-lactam containing molecules, wherein the β-lactam containing molecules form cross-links between the host polymer; and
   providing one or more nanoparticles during said forming of cross-links, each of the one or more nanoparticles including an antibiotic, whereby each of the one or more nanoparticles are encapsulated in cross-linked polymer;
   wherein the hydrogel is operative to release the nanoparticles upon a 13 lactamase-responsive degradation of the hydrogel; and
   wherein the hydrogel is operative to retain the nanoparticles embedded therein when contacted by a non-S-lactamase-producing bacteria.

6. The hydrogel of claim 1, wherein the hydrogel is suitable for an application to a wound, and wherein the hydrogel is stable after the application to the wound until the hydrogel is contacted by the β-lactamase-producing bacteria.

7. The hydrogel of claim 1, wherein the hydrogel is suitable for a prophylactic wound dressing or a prophylactic skin dressing, the dressing operative to release an antibiotic when the dressing is contacted by a β-lactamase-producing bacteria.

8. The hydrogel of claim 1, wherein the hydrogel does not cause an antibiotic resistance in one or more bacteria that are contacted by the hydrogel when the antibiotic is not released from the hydrogel or when the one or more bacteria do not comprise bacteria that are β-lactamase-producing bacteria.

9. The hydrogel of claim 1, wherein the hydrogel will provide a complete degradation of the hydrogel when the hydrogel is incubated with a culture of a β-lactamase-producing bacteria in approximately seventy-two hours; and wherein the hydrogel will remain stable over this time of seventy-two hours when incubated with a non-β-lactamase-producing bacteria.

* * * * *